(12) United States Patent
Nakamura

(10) Patent No.: US 7,760,594 B2
(45) Date of Patent: Jul. 20, 2010

(54) DRIVE APPARATUS FOR PERFORMING A SEQUENTIAL RECORDING AND REPRODUCTION ON A WRITE-ONCE RECORDING MEDIUM, AND METHOD OF REPRODUCING SAME

(75) Inventor: Tadashi Nakamura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/595,129

(22) PCT Filed: Jun. 14, 2005

(86) PCT No.: PCT/JP2005/010888

§ 371 (c)(1),
(2), (4) Date: Jul. 8, 2008

(87) PCT Pub. No.: WO2005/124765

PCT Pub. Date: Dec. 29, 2005

(65) Prior Publication Data

US 2008/0259744 A1  Oct. 23, 2008

(30) Foreign Application Priority Data

| Jun. 15, 2004 | (JP) | ............... 2004-177661 |
| Jun. 15, 2004 | (JP) | ............... 2004-177662 |
| Jun. 15, 2004 | (JP) | ............... 2004-177663 |
| Jun. 15, 2004 | (JP) | ............... 2004-177664 |
| Jun. 15, 2004 | (JP) | ............... 2004-177666 |
| Jun. 25, 2004 | (JP) | ............... 2004-189013 |
| Sep. 2, 2004 | (JP) | ............... 2004-255440 |

(51) Int. Cl.
*G11B 15/52* (2006.01)
(52) U.S. Cl. .............. 369/47.14; 369/30.1; 369/275.3
(58) Field of Classification Search .................. None
See application file for complete search history.

(56) References Cited

U.S. PATENT DOCUMENTS

| 7,089,271 B1 * | 8/2006 | Kihara et al. ............... 707/205 |
| 2008/0304391 A1 * | 12/2008 | Gushima et al. .............. 369/94 |

FOREIGN PATENT DOCUMENTS

| JP | 06103577 | 4/1994 |
| JP | 10320924 | 12/1998 |

(Continued)

*Primary Examiner*—Paul Huber
(74) *Attorney, Agent, or Firm*—Snell & Wilmer L.L.P.

(57) ABSTRACT

A drive device includes a recording/reproducing unit and a drive control unit. The drive control unit compares the physical address corresponding to the logical address contained in the recording instruction to the next recording-enabled address. When the physical address corresponding to the logical address contained in the recording instruction is smaller than the next recording-enabled address, the drive control unit controls the recording/reproducing unit to record data at a particular position in the user data area which is other than the position indicated by the physical address corresponding to the logical address contained in the recording instruction. When the physical address corresponding to the logical address contained in the recording instruction is identical to the next recording-enabled address, the drive control unit controls the recording/reproducing unit to record data at a position indicated by the physical address corresponding to the logical address contained in the recording instruction.

3 Claims, 41 Drawing Sheets

FOREIGN PATENT DOCUMENTS

| | | |
|---|---|---|
| JP | 11339385 | 12/1999 |
| JP | 2000322835 | 11/2000 |
| JP | 2002163862 | 6/2002 |
| JP | 2005196903 | 7/2005 |
| WO | 2004049332 | 6/2004 |

* cited by examiner

Session management information 200

Track management information 210

Space bitmap management information 220

FIG.3

Disc structure information 1100

| General information 1101 |
|---|
| Replacement management information list location information 1102 |
| User area start location information 1103 |
| User area end location information 1104 |
| Spare area information 1105 |
| Recording mode information 1106 |
| Last recorded address information 1107 |
| Disc management information area information 1107b |
| Spare area management information 1108 |
| Session management information location information 1109 |
| Space bitmap management information location information 1110 |

Replacement management information list 1000

Replacement management information 1010

FIG.11

Replacement management information 1010B

| Status information 1011 | | | Original location information 1012 | Replacement location information 1013 | Type |
|---|---|---|---|---|---|
| Flag1 | Flag2 | Flag3 | | | |
| 0 | 0 | 00 | Defective cluster or Overwritten cluster location information | Replacement cluster location information (in Spare area) | (1) |
| 0 | 0 | 01 | Defective clusters or Overwritten clusters start location information | Replacement cluster start location information (in Spare area) | (2) |
| 0 | 0 | 10 | Defective clusters or Overwritten clusters end location information | Replacement cluster end location information (in Spare area) | (3) |
| 0 | 1 | 00 | Defective cluster or Overwritten cluster location information | Replacement cluster location information (in User data area) | (4) |
| 0 | 1 | 01 | Defective clusters or Overwritten clusters start location information | Replacement cluster start location information (in User data area) | (5) |
| 0 | 1 | 10 | Defective clusters or Overwritten clusters end location information | Replacement cluster end location information (in User data area) | (6) |
| 1 | 0 | 00 | Defective cluster location information | — | (7) |

Flag1
  For replacement: 0
  For defect: 1

Flag2
  Replace in Spare area or no replacement cluster: 0
  Replace in User data area: 1

Flag3
  Single cluster : 00
  Contiguous clusters (start location) : 01
  Contiguous clusters (end location) : 10

FIG. 13A

| PSN | Data |
|---|---|
| 100-131 | A1 |
| 132-163 | B |
| 164-195 | (Unrecorded) |
| 196-227 | (Unrecorded) |
| ... | ... |
| 1100-1131 | A |
| 1132-1163 | [Defective] |
| 1164-1195 | (Unrecorded) |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| 1336-1382 | (Unrecorded) |
| ... | ... |

| LSN | Data |
|---|---|
| 0-31 | A1 |
| 32-63 | B |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| 256-287 | (Unrecorded) |
| ... | ... |

Inner spare area 106
User data area 108
LRA 500A

| Status information | | | Original location | Replacement location | |
|---|---|---|---|---|---|
| 0 | 0 | 00 | 1100 | 100 | 511 |
| 0 | 0 | 00 | 1132 | 132 | 512 |

FIG. 14A

| PSN | Data |
|---|---|
| 100-131 | A1 |
| 132-163 | B |
| 164-195 | (Unrecorded) |
| 196-227 | (Unrecorded) |
| ... | ... |
| 1100-1131 | A |
| 1132-1163 | [Defective] |
| 1164-1195 | [Defective] |
| 1196-1227 | C |
| 1228-1259 | D |
| 1260-1291 | [Defective] |
| 1292-1323 | D1 |
| 1324-1355 | D2 |
| 1336-1382 | (Unrecorded) |
| ... | ... |

| LSN | Data |
|---|---|
| 0-31 | A1 |
| 32-63 | B |
| 64-95 | C |
| 96-127 | (Unrecorded) |
| 128-159 | D2 |
| 160-191 | (Unrecorded) |
| 192-223 | (Unrecorded) |
| 224-255 | (Unrecorded) |
| 256-287 | (Unrecorded) |
| ... | ... |

Inner spare area 106
User data area 108
LRA 501B
LRA 500B

| Status information | | | Original location | Replacement location | |
|---|---|---|---|---|---|
| 0 | 0 | 00 | 1100 | 100 | 511 |
| 0 | 0 | 00 | 1132 | 132 | 512 |
| 0 | 1 | 00 | 1164 | 1196 | 513 |
| 0 | 1 | 00 | 1228 | 1292 | 514 / 514A |
| 0 | 1 | 00 | 1228 | 1324 | 515 |
| 1 | 0 | 00 | 1260 | 0 | |

| Status information | | | Original location | Replacement location | |
|---|---|---|---|---|---|
| 0 | 0 | 00 | 1100 | 100 | 511 |
| 0 | 0 | 00 | 1132 | 132 | 512 |
| 0 | 1 | 00 | 1164 | 1196 | 513 |
| 0 | 1 | 00 | 1228 | 1324 | 514A |
| 0 | 1 | 01 | 1336 | x2 | 516 |
| 0 | 1 | 10 | x1 | x3 | 517 |
| 1 | 0 | 00 | 1260 | 0 | 515 |

1000C

LRA 500E

1000E

| Status information | | | Original location | Replacement location | |
|---|---|---|---|---|---|
| 0 | 0 | 00 | 1100 | 100 | 511 |
| 0 | 0 | 00 | 1132 | 132 | 512 |
| 0 | 1 | 00 | 1164 | 1196 | 513 |
| 0 | 1 | 00 | 1196 | 1336 | 518 |
| 0 | 1 | 00 | 1228 | 1324 | 514A |
| 1 | 0 | 00 | 1260 | 0 | 515 |

FIG. 18

DFL entry 2010

| Status 1 2011A | Defective cluster first PSN 2012 | Status 2 2011B | Replacement cluster first PSN 2013 |

FIG. 20A

| PSN | Data |
|---|---|
| ... | ... |
| 1000-1131 | A0 |
| 1132-1163 | (Unrecorded) |
| 1164-1195 | (Unrecorded) |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| ... | ... |
| x10-y10 | ... |
| ... | ... |

| LSN | Data |
|---|---|
| ... | ... |
| 0-31 | A0 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

LRA

User data area 108

Outer spare area 107

FIG. 20B

Header information 1001

FIG. 21A

| PSN | Data |
|---|---|
| ... | ... |
| 1000-1131 | A0 |
| 1132-1163 | A1 |
| 1164-1195 | (Unrecorded) |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| ... | ... |
| x10-y10 | ... |
| ... | ... |

| LSN | Data |
|---|---|
| 0-31 | A1 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

LRA

User data area 108

Outer spare area 107

FIG. 21B

| Header information 1001 | | | |
|---|---|---|---|
| 0000 | 1000 | 0000 | 1132 |

| PSN | Data |
|---|---|
| ... | ... |
| 1000-1131 | A0 |
| 1132-1163 | A1 |
| 1164-1195 | A2 |
| 1196-1227 | (Unrecorded) |
| 1228-1259 | (Unrecorded) |
| 1260-1291 | (Unrecorded) |
| 1292-1323 | (Unrecorded) |
| 1324-1355 | (Unrecorded) |
| ... | ... |
| x10-y10 | ... |
| ... | ... |

| LSN | Data |
|---|---|
| 0-31 | A2 |
| 32-63 | (Unrecorded) |
| 64-95 | (Unrecorded) |
| 96-127 | (Unrecorded) |
| 128-159 | (Unrecorded) |
| 160-191 | (Unrecorded) |
| 192-223 | (Unrecorded) |
| 224-255 | (Unrecorded) |
| ... | ... |

LRA

User data area 108

Outer spare area 107

FIG. 22B

| Header information 1001 | | | |
|---|---|---|---|
| 0000 | 1000 | 0000 | 1164 |

| PSN | Data |
|---|---|
| ... | ... |
| 1000-1131 | A |
| 1132-1163 | A1 |
| 1164-1195 | A2 |
| 1196-1227 | [Defective] |
| 1228-1259 | C0 |
| 1260-1291 | C0 |
| 1292-1323 | C0 |
| 1324-1355 | (Unrecorded) |
| ... | ... |
| x10-y10 | B0 |
| ... | ... |

| LSN | Data |
|---|---|
| 0-31 | A2 |
| 32-63 | (Unrecorded) |
| 64-95 | (Unrecorded) |
| 96-127 | B0 |
| 128-159 | C0 |
| 160-191 | C0 |
| 192-223 | C0 |
| 224-255 | (Unrecorded) |
| 256-287 | (Unrecorded) |
| 288-319 | (Unrecorded) |
| ... | ... |

LRA

User data area 108

Outer spare area 107

FIG. 23B

| Header information 1001 | | | |
|---|---|---|---|
| 0000 | 1000 | 0000 | 1164 |
| 0000 | 1196 | 0000 | x10 |

2100B
2101A

| Header information 1001 | | | | |
|---|---|---|---|---|
| 0000 | 1000 | 0000 | 1164 | 2100B |
| 0000 | 1196 | 0000 | x10 | 2101A |
| 0000 | 1228 | 0001 | 1324 | 2102A |
| 0000 | 1292 | 0010 | 1388 | 2103A |

FIG.36A
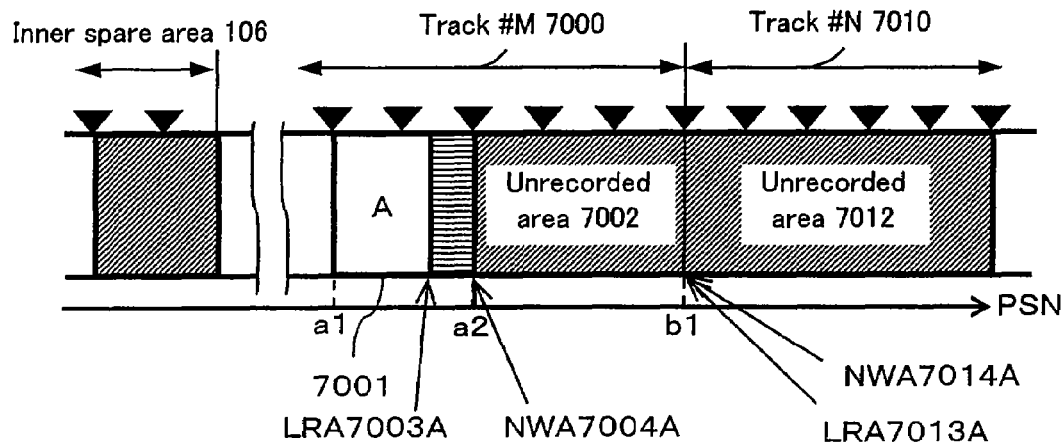
FIG.37A
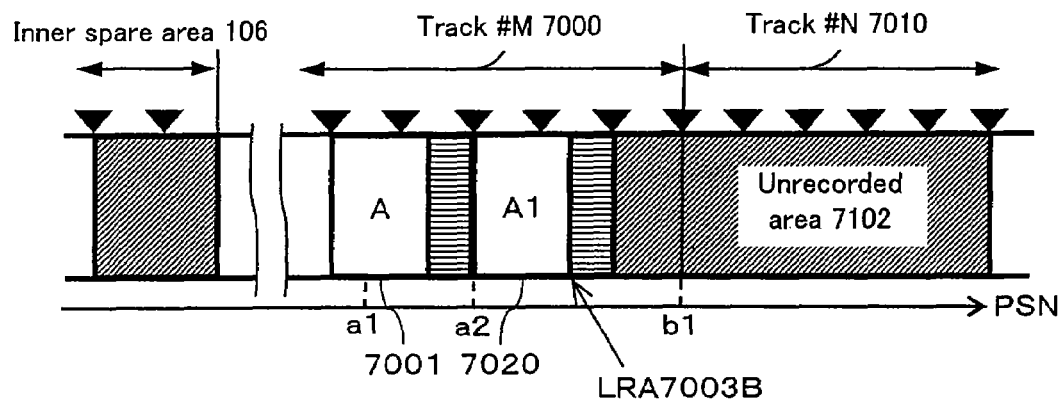
FIG.37B
| Status information | | | Original location | Replacement location |
|---|---|---|---|---|
| ... | | | | |
| 0 | 1 | 00 | a1 | a2 |
| 0 | 1 | 00 | a2 | 0 |
| ... | | | | |
7030
7031

FIG.38A
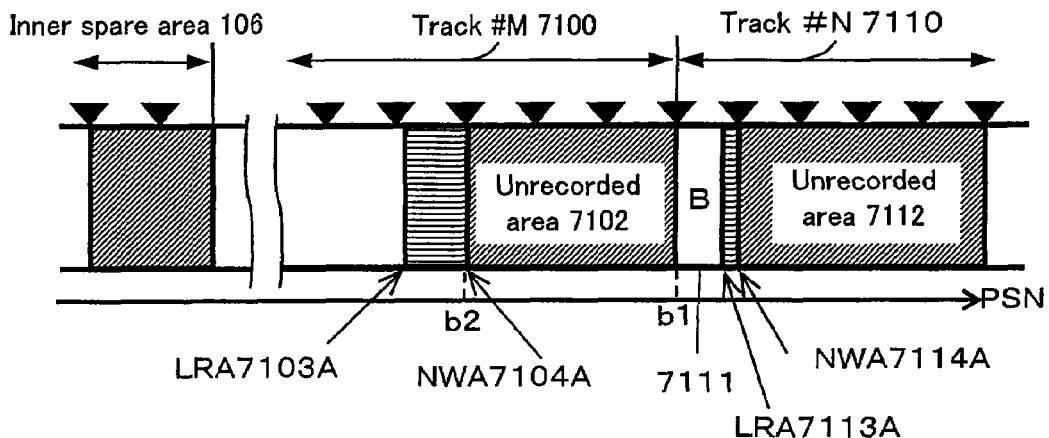
FIG.39A
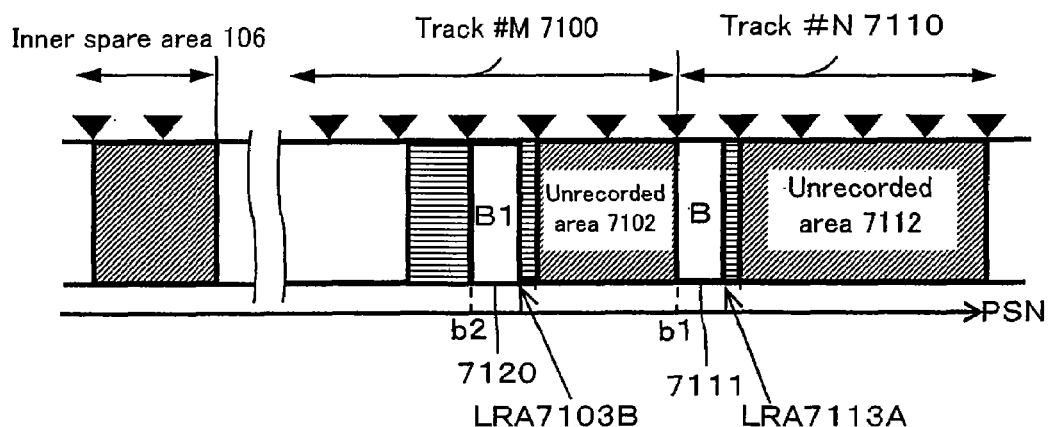
FIG.39B
| Status information | | | Original location | Replacement location |
|---|---|---|---|---|
| ... | | | | |
| 0 | 1 | 00 | b2 | 0 |
| 0 | 1 | 00 | b1 | b2 |
| ... | | | | |
7131
7130

FIG.41A
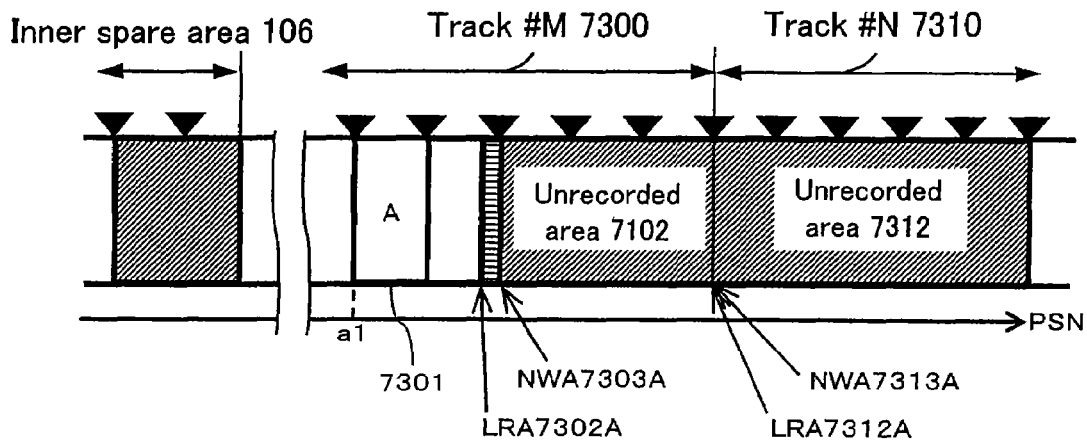
FIG.42A
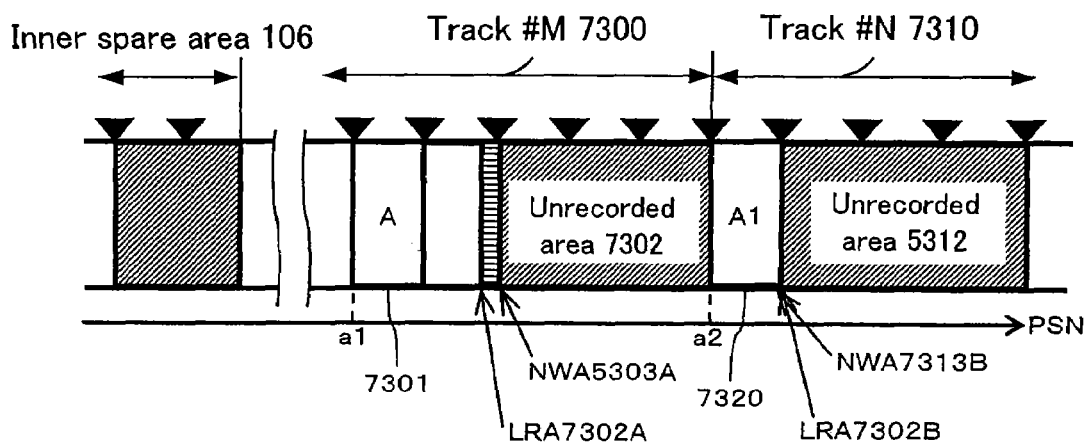
FIG.42B
| Status information | | | Original location | Replacement location |
|---|---|---|---|---|
| 0 | 0 | 00 | a1 | a2 |
7330

DRIVE APPARATUS FOR PERFORMING A SEQUENTIAL RECORDING AND REPRODUCTION ON A WRITE-ONCE RECORDING MEDIUM, AND METHOD OF REPRODUCING SAME

This application is a 371 of PCT/JP2005/010888, filed Jun. 14, 2005.

TECHNICAL FIELD

The present invention relates to a drive apparatus for recording data in an information recording medium and for reproducing the data recorded in the information recording medium.

BACKGROUND ART

Recently, various types of information recording mediums are used to record digital data. For example, a rewritable optical disc or a write-once optical disc is used. In the rewritable optical disc, data can be rewritten repeatedly at the same location. In the write-once optical disc, data can be written only once at the same location, while it is inexpensive.

As an example of rewritable optical discs, there are DVD-RAM discs and BD-RE (Blu-ray Disc Rewritable) discs and the like.

As an example of write-once optical discs, there are DVD-R discs and BD-R (Blu-ray Disc Recordable) discs and the like.

In the rewritable optical disc, a defective management mechanism is introduced to improve the reliability of data recorded on the disc.

The defective management mechanism includes a slipping replacement algorithm and a linear replacement algorithm.

The slipping replacement algorithm is mainly performed when the disc is formatted. In the slipping replacement algorithm, all of the ECC clusters in the user data area are checked for detecting a defective cluster. When the defective cluster is found, the location of the defective cluster is registered to a primary defect list (hereinafter, "PDL"). The logical cluster corresponding to the defective cluster is shifted such that the logical cluster corresponds to a physical cluster which is next to the physical cluster corresponding to the defective cluster.

Thus, when the user data is recorded, it is possible to avoid recording the user data in the defective cluster registered in the PDL. As a result, it is possible to improve the reliability of the data recording.

The linear replacement algorithm is performed when a user data is recorded.

After the user data is recorded, a verify process is performed. In the verify process, the recording result is verified. If the data recording has failed, the ECC cluster including the recording location is determined as a defective cluster. Then, the location of the defective cluster is managed by a secondary defect list (hereinafter, "SDL").

The user data is recorded in the spare area which is located at the inner-most periphery or the outer-most periphery on the disc, instead of the defective cluster in the user data area.

The verify process described above is performed during the replacement recording. If the data recording has succeeded, the location at which the user data is recorded is determined. An SDL entry which correlates the location of the defective cluster with an ECC cluster for replacement is generated. Then, the SDL entry is registered to the SDL.

The SDL entry is provided for each of the all ECC clusters included in the spare area. It is possible to manage whether or not each ECC cluster in the spare area is available as a replacement cluster. If the ECC cluster is an unrecorded area in the spare area, then the ECC cluster is available as a replacement cluster. If the ECC cluster is a recorded area in the spare area, then the ECC cluster is not available as a replacement cluster. The unrecorded area in the spare area is also called a spare cluster.

In the reproduction process, by referring to the PDL and the SDL, if necessary, the data is reproduced from the replacement cluster.

The PDL and the SDL are recorded in a defect management area (hereinafter, "DMA") provided in the lead-in area on the disc. In the DMA, information indicating the size of the spare area and the like is further recorded.

In the rewritable optical disc, the information on the defective management is updated by rewriting the DMA.

In the write-once optical disc, it is possible to introduce a defective management mechanism, for example, as described in the specification of U.S. laid-open patent publication No. 2004/0076096 (hereinafter, "reference 1").

FIG. 3 of the reference 1 shows a data structure of the disc. In the disc of the reference 1, the DMA is provided in the lead-in area and the lead-out area.

Further, a temporary defect management area (hereinafter, "TDMA") is provided in the lead-in area and the lead-out area.

In the write-once optical disc, the information on the defective management is updated by additionally recording defective information in the TDMA each time the defective information is updated.

When the disc is closed or finalized, the data in the latest TDMA is recorded in the DMA.

In the TDMA, temporary defect management information (hereinafter, "TDDS") and temporary defect information (hereinafter, "TDFL") are recorded.

FIG. 5B of the reference 1 shows a data structure of the TDDS. The TDDS includes pointer information to the TDFL. The TDFL can be recorded in the TDMA a plurality of times. The pointer information is recorded for the respective TDFLs.

In the TDDS, a last recorded address on the write-once optical disc is recorded. As shown in FIG. 5B of the reference 1, a single write-once optical disc can have a plurality of last recorded addresses.

In the TDDS, a last recorded replacement address on the write-once optical disc is recorded. As shown in FIG. 5B of the reference 1, a single write-once optical disc can have a plurality of last recorded replacement addresses.

FIG. 6 of the reference 1 shows a data structure of the TDFL.

The TDFL includes information regarding defect #1, #2, . . . and the like.

The information regarding defect includes status information, a pointer to the defective cluster and a pointer to the replacement cluster.

The information regarding defect has a data structure similar to the SDL entry included in the SDL. The information regarding defect performs a function similar to the SDL entry.

FIGS. 33A and 33B show a method for updating the TDFL disclosed in FIG. 9A and FIG. 9B of the reference 1.

FIG. 33A shows a data structure of the TDFL #0. The TDFL #0 includes the information regarding defect #1, #2 and #3 corresponding to the defects #1, #2 and #3.

After the TDFL #0 is recorded, it is assumed that the defects #4 and #5 are detected as a result of performing a new data recording. In this case, the TDFL #1 shown in FIG. 33B is recorded on the write-once optical disc.

The TDFL #1 is generated by maintaining the information regarding defect #1, #2 and #3 included in the TDFL #0 and adding the information regarding defect #4 and #5 corresponding to the defects #4 and #5.

FIG. 10 of the reference 1 shows a data structure of the information regarding defect.

The information regarding defect includes status information. The status information includes information indicating that the defective area is a continuous defect block or a single defect block.

The information regarding defect further includes a pointer to the defective area (the location of the defective area on the disc).

The information regarding defect further includes a pointer to the replacement area corresponding to the defective area.

When the defective area is a continuous defect block, the status information indicates that a pointer to the defective area designates a start location of the continuous defect block or an end location of the continuous defect block. In this case, the status information further indicates that a pointer to the replacement area designates a start location of the replacement block or an end location of the replacement block.

By using these data structures, the defective management mechanism can be implemented in the write-once optical disc.

Further, by using the defective management mechanism described above, it is possible to implement a pseudo-overwrite recording for the write-once optical disc.

With reference to FIGS. 31 and 32, the pseudo-overwrite recording for the write-once optical disc will be described.

As described above, in the defective management mechanism, by using the replacement information such as the information regarding defect or the SDL entry, the physical address at which the data is actually recorded is mapped to another location which is previously allocated, without changing the logical address at which the data is recorded.

When it is instructed to record data at a logical address at which the data has already been recorded on the write-once optical disc, the data is recorded in a sector located at a physical address which is different from the physical address corresponding to the logical address, and the replacement information is updated to maintain the logical address. According to this process, it is possible to overwrite data in a pseudo manner. Hereinafter, such data recording is referred to as a pseudo-overwrite recording.

FIG. 31 shows a data structure after directories and files are recorded in the information recording medium 1 which is a write-once optical disc. In the state shown in FIG. 31, it is assumed that the pseudo-overwrite recording has not been performed.

In the write-once optical disc, the user data area on the disc is managed as a unit of track or session.

In FIG. 31, the user data recorded in the user data area is managed by a file system. A space managed by the file system is referred to as a volume space 2.

In the description below, it is assumed that information recorded in the information recording medium 1 as the volume/file structure of the file system (e.g. descriptor, pointer, metadata partition and metadata file) has a data structure defined in the ISO/IEC 13346 standard or the UDF (Universal Disc Format) specification, unless it is explicitly described on the contrary.

In FIG. 31, a volume structure area 3 and a physical partition 4 are recorded in the volume space 2.

In the physical partition 4, metadata partitions 5a, 5b defined by version 2.5 of the UDF specification are included.

In the physical partition 4, metadata file 6a and metadata mirror file 6b which is the duplication of the metadata file 6a are recorded.

FE (metadata file) 7a and FE (metadata mirror file) 7b, each being a file entry (FE) indicating the recording location in the physical partition 4, are recorded. Further, data file (File-a) 8 and data file (File-b) 9 are also recorded.

All information on the file structure such as a file entry and directory file is allocated in the metadata partition, i.e. the metadata file.

In the data structure defined in the UDF specification, the respective recording locations of the metadata partition 5a and the file set descriptor (FSD) 12 are recorded in the volume structure area 3.

By retrieving the file structure from the ROOT directory using the FSD 12 as a start point, it is possible to access data file (File-a) 8, for example.

Next, in the state shown in FIG. 31, it is assumed that the pseudo-overwrite recording for data file (File-c) is performed.

FIG. 32 shows a data structure after the pseudo-overwrite recording for data file (File-c) is completed.

Herein, it is assumed that the data file (File-c) is recorded immediately under the ROOT directory on the information recording medium 1.

During recording the data file (File-c), the required information on the file structure is updated or generated in order to add the data file (File-c). Specifically, FE (ROOT) 13 is updated and FE (File-c) 14 is generated, for example.

The data file (File-c) 15 is recorded in an unrecorded area shown in FIG. 31. FIG. 32 shows a state at this time.

When the FE (File-c) 14 is recorded, the FE (File-c) 14 is recorded in the unrecorded area 11a in the metadata partition 5a (i.e. the metadata file 6a).

Next, the pseudo-overwrite recording is performed as if the FE (ROOT) 16 would be overwritten on the FE (ROOT) 13.

In this case, as shown in FIG. 32, the data for the FE (ROOT) 16 is recorded in the spare area 17.

Further, the replacement information included in the disc management information 2 is updated such that the FE (ROOT) 13 is mapped to the FE (ROOT) 16.

After performing the recording process for files, a reproduction operation for reproducing the data file (File-c) 15 will be described.

The location information of FE (metadata file) 7a and the location information of FSD 12 are obtained from the volume structure area 3 of the information recording medium 1.

Next, the file structure is reproduced. In order to reproduce the file structure, the FSD 12 is reproduced based on the location information of FE (metadata file) 7a and the location information of FSD 12.

The location information of the FE (ROOT) 13 is obtained as a logical address from the reproduced FSD 12.

The FE (ROOT) 13 is reproduced based on the location information of the FE (ROOT) 13.

By referring to the replacement information, the FE (ROOT) 16, to which the FE (ROOT) 13 is mapped, is reproduced.

The FE (ROOT) 16 includes the latest ROOT directory file. Accordingly, the FE (ROOT) 16 includes the location information of the FE (File-c) 14.

The data file (File-c) 15 is reproduced using the location information of the data file (File-c) 15 which is obtained from the FE (File-c) 14.

Thus, in the write-once optical disc, it is possible to perform a pseudo-overwrite recording using the defective management mechanism.

However, according to the pseudo-overwrite recording for the write-once optical disc described above, there is a problem that if there is no unrecorded area in the spare area, it is not possible to further perform the data recording even if there is an unrecorded area in the user data area. This is because it is not possible to update file system information.

In particular, in the write-once optical disc, the size of the spare area is fixed at the time when the disc is formatted (initialized), unlike the rewritable optical disc in which the size of the spare area can be extended if required.

It is difficult to determine the size of the spare area appropriately in view of the pseudo-overwrite recording which may be performed in the future.

If the size of the spare area is determined as a relatively large size, the size of the user data area must be reduced. If the size of the spare area is determined as a relatively small size, a problem may be caused. The problem is that it is not possible to further perform the data recording even if there is an unrecorded area in the user data area. In either case, it is not possible to effectively utilize the user data area of the write-once optical disc.

The present invention is intended to solve the problem described above. One of the purposes of the present invention is to provide a drive apparatus capable of utilizing the user data area without any loss in the pseudo-overwrite recording for the write-once optical disc.

According to the present invention, it is possible to provide a drive apparatus capable of utilizing the user data area without any loss in the pseudo-overwrite recording for the write-once optical disc.

DISCLOSURE OF THE INVENTION

According to one aspect of the invention, a drive apparatus is provided for performing a sequential recording for a write-once recording medium, wherein the write-once recording medium includes a data area and a disc management information area, the data area includes a spare area and a user data area, disc management information for managing the write-once recording medium is recorded in the disc management information area, a plurality of physical addresses are assigned to the data area, a plurality of logical addresses are assigned to the user data area, at least one track is allocated in the user data area, the disc management information includes track management information for managing the at least one track, and the track management information includes a last recorded address indicating a location at which data is last recorded in a track. The drive apparatus includes: a recording/reproduction section for performing a recording operation or a reproduction operation for the write-once recording medium; and a drive control section for controlling the recording/reproduction section, wherein the drive control section performs a process including: reading the disc management information from the disc management information area; determining a primary logical address-physical address mapping indicating a corresponding relationship between the plurality of logical addresses and the plurality of physical addresses based on the disc management information; receiving a recording instruction including a logical address indicating location at which data is to be recorded; translating the logical address included in the recording instruction into a physical address in accordance with the primary logical address-physical address mapping; determining a track of the at least one track based on the physical address corresponding to the logical address included in the recording instruction and the track management information; determining a physical address indicating a location at which data can be recorded next in the determined track as a next writable address, based on the last recorded address in the determined track; comparing the physical address corresponding to the logical address included in the recording instruction with the next writable address; when the physical address corresponding to the logical address included in the recording instruction is smaller than the next writable address, performing a process including: controlling the recording/reproduction section to record the data at a specific location in the user data area, the specific location being a location other than the location indicated by the physical address corresponding to the logical address included in the recording instruction; generating new disc management information including replacement management information for mapping the physical address corresponding to the logical address included in the recording instruction to the physical address indicating the specific location and the last recorded address updated by recording of the data; and controlling the recording/reproduction section to record the new disc management information in the disc management information area; when the physical address corresponding to the logical address included in the recording instruction is equal to the next writable address, performing a process including: controlling the recording/reproduction section to record the data at location indicated by the physical address corresponding to the logical address included in the recording instruction; generating new disc management information including the last recorded address updated by recording of the data; and controlling the recording/reproduction section to record the new disc management information in the disc management information area.

In one embodiment of the invention, the write-once recording medium includes a plurality of ECC clusters, each of the plurality of ECC clusters includes a plurality of sectors, the plurality of physical addresses are assigned to the plurality of sectors, and the next writable address is an physical address of a first sector included in an ECC cluster next to an ECC cluster including the last recorded address.

In one embodiment of the invention, the determined track is an open track, and the specific location in the user data area is determined as a location indicated by a next writable address in the determined track.

In one embodiment of the invention, the determined track is an open track, the specific location in the user data area is determined as a location indicated by a next writable address in an open track which is different from the determined track, the next writable address in the open track indicates a location which is closest to the location indicated by the physical address corresponding to the logical address included in the recording instruction.

According to another aspect of the invention, a drive apparatus is provided for reproducing data recorded in a write-once recording medium, wherein the write-once recording medium includes a data area and a disc management information area, the data area includes a spare area and a user data area, disc management information for managing the write-once recording medium is recorded in the disc management information area, a plurality of physical addresses are assigned to the data area, a plurality of logical addresses are assigned to the user data area, the disc management information includes a replacement management information list including a plurality of replacement management information, each of the plurality of replacement management information maps a physical address indicating a location of the user data area to a separate physical address. The drive apparatus includes: a recording/reproduction section for performing a recording operation or a reproduction operation for the write-once recording medium; and a drive control section for controlling the recording/reproduction section, wherein the drive control section performs a process including: reading the disc management information from the disc management information area; determining a primary logical address-physical address mapping indicating a corresponding relationship between the plurality of logical addresses and the plurality of physical addresses based on the disc management information; receiving a reproduction instruction including a logical address indicating location at which data is to be reproduced; translating the logical address included in the reproduction instruction into a physical address in accordance with the primary logical address-physical address mapping; determining whether or not the physical address corresponding to the logical address included in the reproduction instruction is not mapped as an original location of a separate physical sector and it is mapped as a replacement location of a separate physical sector; when it is determined that the physical address corresponding to the logical address included in the reproduction instruction is not mapped as an original location of a separate physical sector and it is mapped as a replacement location of a separate physical sector, outputting a predetermined data without reproducing data from the physical address corresponding to the logical address included in the reproduction instruction.

In one embodiment of the invention, the predetermined data is data reproduced from the physical address corresponding to the logical address included in the reproduction instruction.

BRIEF DESCRIPTION OF THE DRAWINGS

FIG. 3 is an illustrative diagram showing an exemplary data structure of the disc structure information 1110 according to an embodiment of the present invention.

FIG. 11 is an illustrative diagram showing an exemplary data structure of the replacement management information 1010B according to an embodiment of the present invention.

FIG. 13A is an illustrative diagram showing a replacement recording according to an embodiment of the present invention.

FIG. 13B is an illustrative diagram showing a replacement management information according to an embodiment of the present invention.

FIG. 14A is an illustrative diagram showing a replacement recording according to an embodiment of the present invention.

FIG. 14B is an illustrative diagram showing a replacement management information according to an embodiment of the present invention.

FIG. 18 is an illustrative diagram showing an exemplary data structure of the DFL entry 2010 which is an example of the replacement management information according to an embodiment of the present invention.

FIG. 20A is an illustrative diagram showing a replacement recording according to an embodiment of the present invention.

FIG. 20B is an illustrative diagram showing a replacement management information according to an embodiment of the present invention.

FIG. 21A is an illustrative diagram showing a replacement recording according to an embodiment of the present invention.

FIG. 21B is an illustrative diagram showing a replacement management information according to an embodiment of the present invention.

FIG. 22A is an illustrative diagram showing a replacement recording according to an embodiment of the present invention.

FIG. 22B is an illustrative diagram showing a replacement management information according to an embodiment of the present invention.

FIG. 23A is an illustrative diagram showing a replacement recording according to an embodiment of the present invention.

FIG. 23B is an illustrative diagram showing a replacement management information according to an embodiment of the present invention.

FIG. 36A is an illustrative diagram showing a replacement recording according to an embodiment of the present invention.

FIG. 37A is an illustrative diagram showing a replacement recording according to an embodiment of the present invention.

FIG. 37B is an illustrative diagram showing replacement management information according to an embodiment of the present invention.

FIG. 38A is an illustrative diagram showing a replacement recording according to an embodiment of the present invention.

FIG. 39A is an illustrative diagram showing a replacement recording according to an embodiment of the present invention.

FIG. 39B is an illustrative diagram showing replacement management information according to an embodiment of the present invention.

FIG. 41A is an illustrative diagram showing a replacement recording according to an embodiment of the present invention.

FIG. 42A is an illustrative diagram showing a replacement recording according to an embodiment of the present invention.

FIG. 42B is an illustrative diagram showing replacement management information according to an embodiment of the present invention.

Figure 1A:
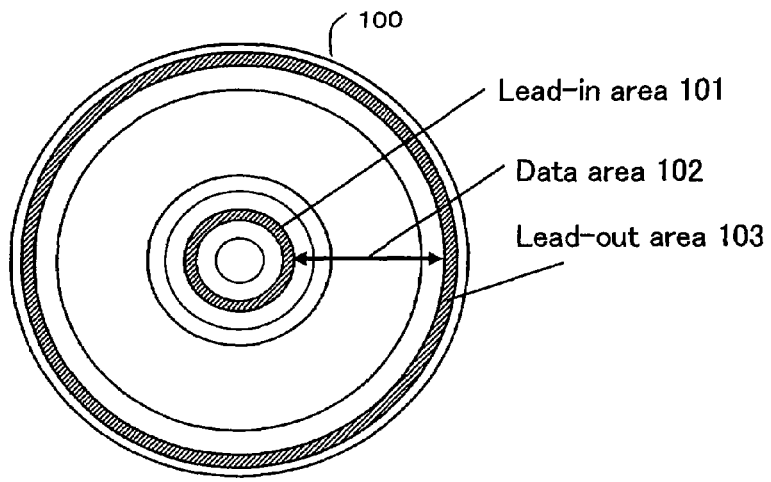
FIG. 1A is an illustrative diagram showing an appearance of information recording medium 100 according to an embodiment of the present invention.

100, 100*b* information recording medium
101 lead-in area
102, 102*a* data area
103 lead-out area
103*b*, 103*a* outer area
104, 105 disc management information area
104*a*, 105*a* disc management information area
106, 106*a* inner spare area
107, 107*a* outer spare area
108, 108*a* user data area
109 volume space
122 unrecorded area
120, 121 LRA
210 track management information
211 session start information
212 track start location information
213 last recorded address information within track (LRA)
300 information recording/reproduction apparatus
301 system control section
302 memory circuit
303 I/O bus
304 magnetic disc apparatus
310 drive apparatus
311 drive control section

BEST MODE FOR CARRYING OUT THE INVENTION

Embodiment 1

1-1. Write-Once Recording Medium

FIG. 1A shows an appearance of information recording medium 100 according to an embodiment of the present invention.

A lead-in area 101 is located in an inner-most periphery of the information recording medium 100. A lead-out area 103 is located in an outer-most periphery of the information recording medium 100. A data area 102 is located between the lead-in area 101 and the lead-out area 103 of the information recording medium 100.

In the lead-in area 101, reference information necessary for an optical pickup included in the recording/reproduction section 314 which will be described below to access the information recording medium 100, information for identifying from other recording media, and the like are recorded. In the lead-out area 103, similar information as those in the lead-in area 101 is recorded.

A plurality of physical sectors are assigned to the lead-in area 101, the data area 102 and the lead-out area 103. Each physical sector is a minimum access unit. Each physical sector is identified by an address information such as a physical sector number (hereinafter, "PSN").

The data recording/reproduction is performed for each ECC cluster (or each ECC block) including a plurality of physical sectors. An ECC cluster (or an ECC block) is a minimum unit for the data recording/reproduction.

Figure 1B:
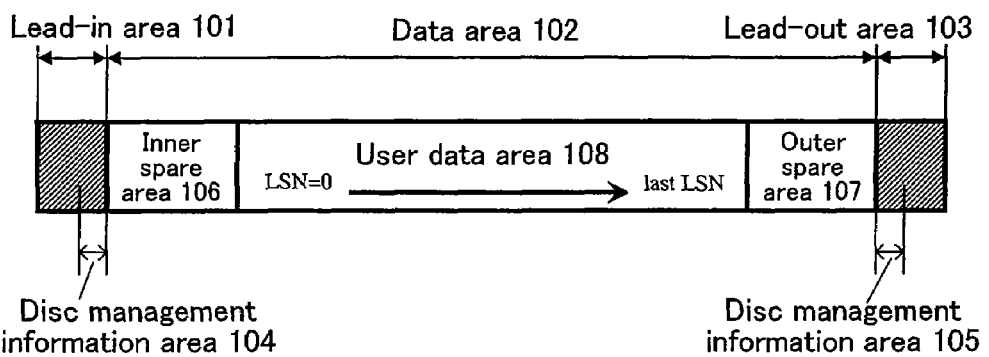
FIG. 1B is an illustrative diagram showing an exemplary data structure of the information recording medium 100 according to an embodiment of the present invention.

FIG. 1B shows a data structure of the information recording medium 100. In FIG. 1B, the lead-in area 101, the data area 102 and the lead-out area 103 are shown in a lateral arrangement, although they are actually arranged in a concentric circular manner as shown in FIG. 1A.

The lead-in area 101 includes a disc management information area 104. The lead-out area 103 includes a disc management information area 105. Disc management information is recorded in each of the disc management information areas 104 and 105. The disc management information includes replacement management information, session management information, and space bitmap management information. This information will be described below. The disc management information areas 104 and 105 are used as an area for updating the disc management information. The area for updating the disc management information is also referred to as a temporal disc management information area.

In a case where the present invention is applied to the BD-R specification, the term "disc management information area" in the present specification should be read as a "Disc Management Area (DMA)", the term "temporal disc management information area" in the present specification should be read as a "Temporal Disc Management Area (TDMA)", the term "disc management information" in the present specification should be read as a "Disc Management Structure (DMS)" and the term "temporal disc management information" in the present specification should be read as a "Temporal Disc Management Structure (TDMS)".

The data area 102 includes an inner spare area 106, a user data area 108 and an outer spare area 107.

The user data area 108 is an area used for recording a user data.

Figure 1C:
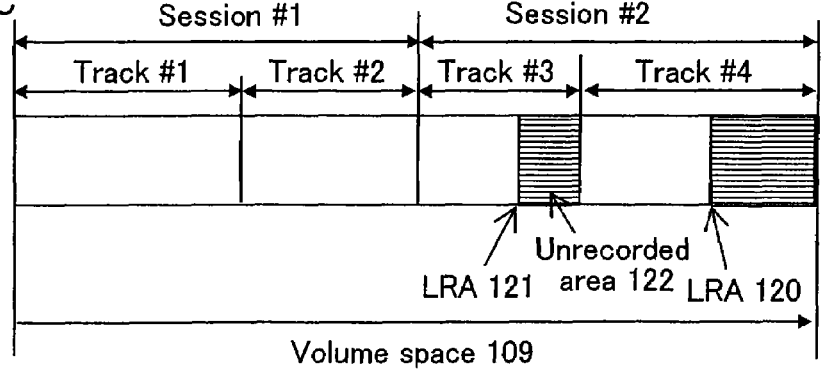
FIG. 1C is an illustrative diagram showing an exemplary data structure of the user data area 108 shown in FIG. 1B.

FIG. 1C shows a data structure of the user data area 108.

The user data area 108 includes a plurality of sessions. Each session includes a plurality of tracks.

Each track is a contiguous area on the information recording medium 100. Each track is managed by track management information which will be described below.

In a case where the present invention is applied to the BD-R specification, the term "track" in the present specification should be read as a "Sequential Recording Range" (hereinafter, "SRR").

Each session includes a plurality of tracks which are contiguously allocated on the information recording medium 100. Each session is managed by session management information which will be described below.

Figure 2A:
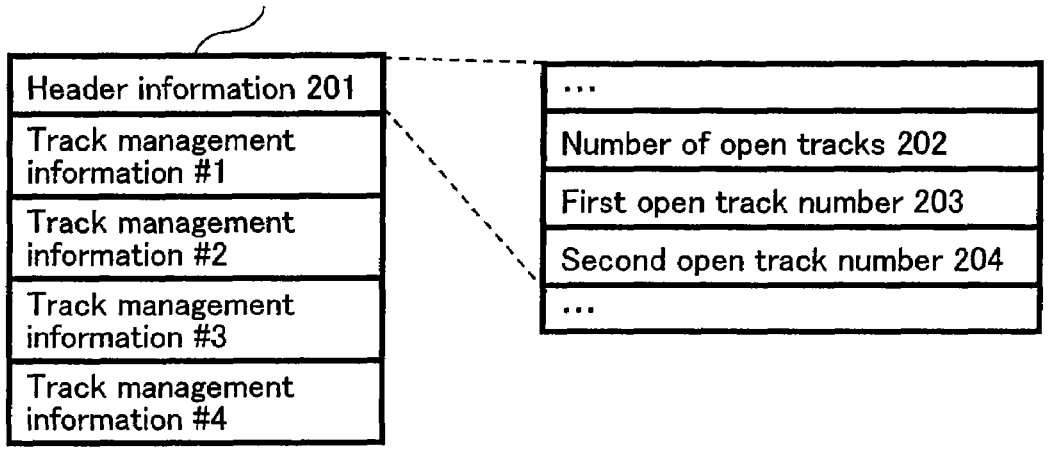
FIG. 2A is an illustrative diagram showing an exemplary data structure of the session management information 200 according to an embodiment of the present invention.

FIG. 2A shows a data structure of the session management information 200 for managing the session. The session management information 200 is included in the disc management information.

The session management information 200 includes header information 201 and a plurality of track management information.

Figure 2B:
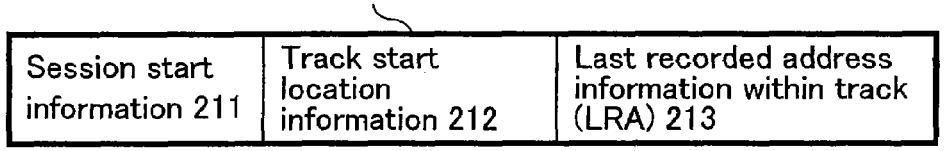
FIG. 2B is an illustrative diagram showing an exemplary data structure of the track management information 210 according to an embodiment of the present invention.

The header information 201 includes general information such as an identifier of the session management information 200 and the number of the track management information 210 shown in FIG. 2B.

The track management information #N contains information corresponding to the track #N shown in FIG. 1C, where N denotes an integer greater than or equal to 1.

FIG. 2B shows a data structure of the track management information 210 for managing the track. The track management information 210 is included in the disc management information.

The track management information 210 includes session start information 211 which indicates whether or not the track is a leading track of the session, track start location information 212 which indicates a start location of the track, and last recorded address information within track 213 which indicates a location at which data has been lastly recorded within the track. Hereinafter, the last recorded address information within track 213 is referred to as LRA 213.

If the track managed by the track management information is 210 located at a leading position of the session, a value (e.g. "1") indicating that the track is located at a leading position of the session is set to session start information 211. Otherwise, a different value (e.g. "0") is set to session start information 211.

The track start location information 212 includes a physical address indicating a start location of the track.

The LRA 213 includes a physical address indicating a location at which valid data has been lastly recorded within the track. Valid data may be, for example, user data supplied from the host apparatus 305. The LRA 120 and the LRA 121 shown in FIG. 1C are an example of the LRA 213.

In the case where the present invention is applied to the BD-R specification, the term "track management information" in the present specification should be read as a "Sequential Recording Range Entry (SRR Entry)" and the term "session management information" in the present specification should be read as a "Sequential Recording Range Information".

In the case where the data recording is performed for each ECC cluster as a minimum unit on the information recording medium 100, the location indicated by the LRA 213 does not always match the boundary of ECC clusters.

In general, the size of data specified by the recording instruction does not match multiple integral of the size of one ECC cluster. In this case, the LRA 213 indicates an address of the last physical sector among the physical sectors in which the data specified by the recording instruction is recorded.

If the location indicated by the LRA 213 does not match the boundary of ECC clusters, padding data is recorded after the valid data so that the end of the recorded data can match the boundary of ECC clusters.

In the present embodiment, the data recording can be performed for each track. In this case, the recording of new data is started from a leading position of each track, and the new data is contiguously recorded within the track (a sequential recording). When the data recording is performed for a track, the location at which the data has been lastly recorded within the track is reflected to the LRA 213.

When the data recording is restarted within the track, a value of the LRA 213 is checked. By checking the value of the LRA 213, it is possible to determine a next writable address within the track.

In the case where no data is recorded within the track (e.g. immediately after the track is allocated), a predetermined value (e.g. "0") indicating such a status can be set to the LRA 213.

In general, a next writable address (hereinafter, "NWA") indicates a location of a physical sector which is next to the physical sector indicated by the LRA 213. Alternatively, in the case where the data recording is performed for each ECC cluster as a minimum unit on the information recording medium 100, the NWA indicates a location of a leading position of an ECC cluster which is next to the ECC cluster including the physical sector indicated by the LRA 213.

The location of the NWA is calculated according to Expression (1) below.

(a) When LRA≠0
NWA=N×(Floor (LRA/N)+1)
N: the number of the physical sectors included in each ECC cluster (for example, N=32).
(b) When LRA=0
NWA=(start location of the corresponding track)
where Floor(x) represents the largest integer number=x
Hereinafter, it is assumed that the NWA indicates a leading position of the ECC cluster.

A track where it is possible to record data is referred to as an open track.

The track number of the open track is included in the header information 201 of the session management information 200 shown in FIG. 2A (for example, a first open track number 203, a second open track number 204, etc.).

Any track other than the open track is referred to as a closed track.

For example, a track which does not include any unrecorded area or a track designated by a user can be a closed track.

Unlike the open track, the track number of the closed track is not stored in the header information 201 of the session management information 200.

The data recording to any closed track is prohibited.

In the case where the present invention is applied to the BD-R specification, the term "open track" in the present specification should be read as an "Open SRR" and the term "closed track" should be read as a "Closed SRR".

By checking the open track number and the LRA 213 in the track management information 210, it is possible to determine an unrecorded area on the information recording medium 100.

By managing the recorded clusters for the write-once type of the information recording medium 100, it is possible to perform a kind of random recording (i.e. recording data at an arbitrary location (physical address) on the information recording medium 100).

In order to realize such a random recording, it is necessary to manage unrecorded areas on the information recording medium 100 and to manage the last recorded address.

Figure 2C:
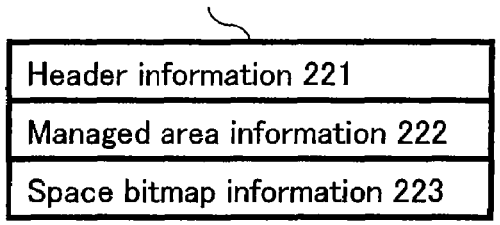
FIG. 2C is an illustrative diagram showing an exemplary data structure of the space bitmap management information 220 according to an embodiment of the present invention.

In the present embodiment, these managements are realized by utilizing the space bitmap management information 220 shown in FIG. 2C and the disc management information recorded in the disc management information area 104 and 105.

When the random recording is performed, the space bitmap management information 220 shown in FIG. 2C is recorded in the disc management information area 104.

FIG. 2C shows a data structure of space bitmap management information 220. The space bitmap management information 220 includes header information 221, managed area information 222 and space bitmap information 223.

The header information 221 includes general information such as an identifier of the space bitmap management information 220.

The managed area information 222 includes information which specifies an area in the user data area 108, wherein the recorded/unrecorded status of a sector included in the area is managed by the space bitmap management information 220. For example, the managed area information 222 includes a start location of the area and a length of the area.

The space bitmap information 223 includes information indicating whether each ECC cluster included in the area to be managed is a recorded ECC cluster or an unrecorded ECC cluster. For example, a single bit data is assigned to each ECC cluster, a predetermined value (e.g. "0") is set to the single bit data when the ECC cluster is an unrecorded ECC cluster, and a predetermined value (e.g. "1") is set to the single bit data when the ECC cluster is a recorded ECC cluster. This makes it possible to manage unrecorded areas for all ECC clusters in the area to be managed.

The disc management information recorded in the disc management information area 104 includes disc structure information 1100 shown in FIG. 3. The disc structure information 1100 includes last recorded address information 1107. The last recorded address information 1107 includes a physical address indicating a location at which data has been lastly recorded within the user data area 108.

The disc structure information 1100 further includes general information 1101 concerning an entire disc structure information 1100, replacement management information list location information 1102 which indicates location information of the latest replacement management information list 1000 within the disc management information area 104, 105, user area start location informations 103 which indicates a start location of the user data area 108, user area end location information 1104 which indicates an end location of the user data area 108, disc management information area size 1107b, and spare area information 1105 and spare area management information 1108 which indicates the size of the inner spare area 106 and the outer spare area 107 and an area available for replacement.

By using the disc management information area size 1107b, it is possible to change the size of the disc management information area for each information recording medium. Further, by using the disc management information area size 1107b, it is possible to change the temporal disc management information area described above in the inner spare area 106 and the outer spare area 107.

By using the spare area information 1105, it is possible to change the size of the spare area for each information recording medium. For example, it is possible to set the size of the inner spare area 106 or the size of the outer spare area 107 to zero.

The spare area management information 1108 includes next available location information indicating a next available location in the inner spare area 106 and the outer spare area 107.

In each spare area, a sequential recording is performed in the same way in each track. The next available location in each spare area performs the similar function as the NWA in each track. The recording of new data to each spare area is performed sequentially from the location indicated by the next available location information.

The disc structure information 1100 further includes session management information location information 1109 which indicates location information of the latest session management information 200 in the disc management information areas 104 and 105, and space bitmap management information location information 1110 which indicates location information of the latest space bitmap management information 220 in the disc management information areas 104 and 105.

As described above, by using the session management information 200 or the space bitmap management information 220, it is possible to manage the status of unrecorded physical sectors on the information recording medium 100. Accordingly, it is possible to selectively use one of the session management information 200 and the space bitmap management information 220 for its purposes. Alternatively, it is possible to use both information. The information concerning a method for managing unrecorded areas is included in the recording mode information 1106 of the disc structure information 1100.

The disc management information area 105 is an extended area which is used to record duplication of the disc management information recorded in the disc management information area 104 or is used to record the information which cannot be recorded in the disc management information area 104 in updating the disc management information. Hereinafter, the detailed description of the disc management information area 105 will be omitted. This is similar to the temporal disc management information recorded in the spare area.

In the example shown in FIG. 1C, the user data recorded in the user data area 108 is managed by a file system. A space managed by the file system is referred to as a volume space 109.

A plurality of logical sectors are assigned to the volume space 109. Each logical sector is identified by address information such as a logical sector number (hereinafter, "LSN").

In the description below, it is assumed that information recorded in the information recording medium 100 as the volume/file structure of the file system (e.g. descriptor, pointer, metadata partition and metadata file) has a data structure defined in the ISO/IEC 13346 standard or the UDF (Universal Disc Format) specification, unless it is explicitly described on the contrary. Of course, it is possible to use a file system other than those described above.

The information recording medium 100 shown in FIGS. 1A to 1C is described as an information recording medium having a single recording layer. However, the information recording medium 100 may have two or more recording layers.

Figure 4:
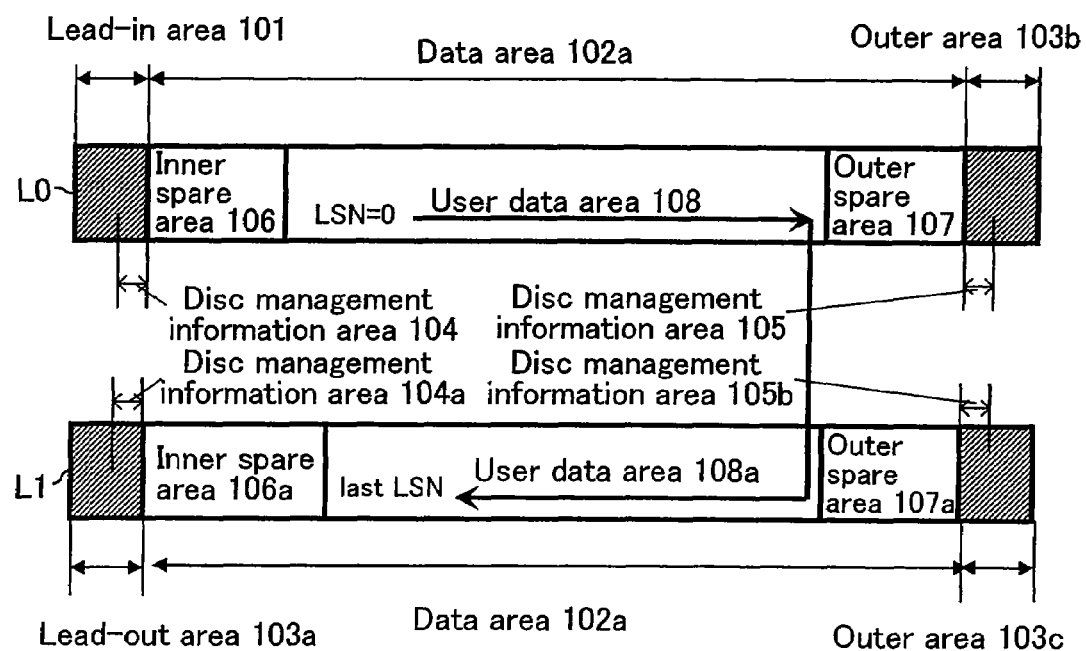
FIG. 4 is an illustrative diagram showing an exemplary data structure of the information recording medium 100b according to an embodiment of the present invention.

FIG. 4 shows a data structure of an information recording medium 100b having two recording layers.

In FIG. 4, L0 denotes a first layer and L1 denotes a second layer. Each of the first and second layers has almost the same structure as the information recording medium 100. Specifically, the lead-in area 101 is located in an inner-most periphery of the first layer and the lead-out area 103a is located in an inner-most periphery of the second layer. Further, the outer area 103b is located in an outer-most periphery of the first layer and the outer area 103c is located in an outer-most periphery of the second layer. The lead-in area 101, the outer area 103b, the lead-out area 103a and the outer area 103c includes a disc management information area 104, 105, 104a and 105a, respectively.

Further, as shown in FIG. 4, the spare areas 106, 106a, 107 and 107a are provided. As described above, it is possible to change the size of each spare area for each information recording medium. It is also possible to provide an additional temporal disc management information area in each spare area. The user data areas 108 and 108a are logically treated as a single volume space having contiguous logical addresses.

Thus, it is possible to logically treat an information recording medium having a plurality of recording layers as an information recording medium having a single recording layer. Hereinafter, an information recording medium having a single recording layer is described. It is possible to apply the description of the information recording medium having a single recording layer to an information recording medium having a plurality of recording layers. Therefore, an information recording medium having a plurality of recording layers is referred to only when a special description is required.

1-2. Pseudo-Overwrite Recording

The replacement information is described with reference to FIGS. 5A and 5B.

The replacement information is defined as a replacement management information list (or a defect list) including replacement management information (or a defect list entry). The replacement management information (or the defect list entry) includes original location information indicating a location of a cluster in which a defect occurs on the information recording medium (i.e. a defective cluster) and replacement location information indicating a location of a replacement cluster which is used instead of the defective cluster.

The present invention enables recording a replacement cluster in the user data area.

Further, the present invention realizes a pseudo-overwrite recording on a write-once information recording medium using the replacement information.

As shown in FIG. 1B, the data area 102 includes the inner spare area 106, the user data area 108 and the outer spare area 107.

At least a part of the inner spare area 106 and the outer spare area 107 is used as an area for replacement recording of the data to be recorded in the user data area 108.

For example, when there exists a defective cluster in the user data area 108, at least a part of the inner spare area 106 and the outer spare area 107 is used as an area for recording a replacement cluster with which the defective cluster is replaced.

Alternatively, at least a part of the inner spare area 106 and the outer spare area 107 can be used as an area for recording the updated data in the pseudo-overwrite recording described below.

The replacement recording, which is the combination of the replacement information with the spare area, is performed as well as a verify process.

The verify process is a process including the steps of reproducing data immediately after the data is recorded, comparing the reproduced data with the recorded data and determining whether or not the data is recorded correctly based on the comparison result. Such a process including these steps is called a verify-after-write process.

When an error occurs during the verify process (i.e. it is determined that the data is not recorded correctly), a replacement recording is performed. Specifically, the defective cluster is replaced by a replacement cluster and the data is recorded in the replacement cluster.

The replacement cluster is recorded in the inner spare area 106 (or the outer spare area 107) or the user data area 108.

The pseudo-overwrite recording is defined as a method for mapping a physical address at which the data is actually recorded to another physical address, such that it can be seen as if the logical address at which the data is recorded is not changed.

When the overwrite of new data is instructed to a logical address at which data is recorded, a physical address corresponding to the logical address is replaced by a separate physical address and the new data is written into an ECC cluster on the separate physical address. Then, the ECC cluster before overwrite is mapped to the ECC cluster (replacement cluster) in which the new data is recorded.

The replacement cluster used in the pseudo-overwrite recording is recorded in the spare area or the user data area.

Figure 5A:
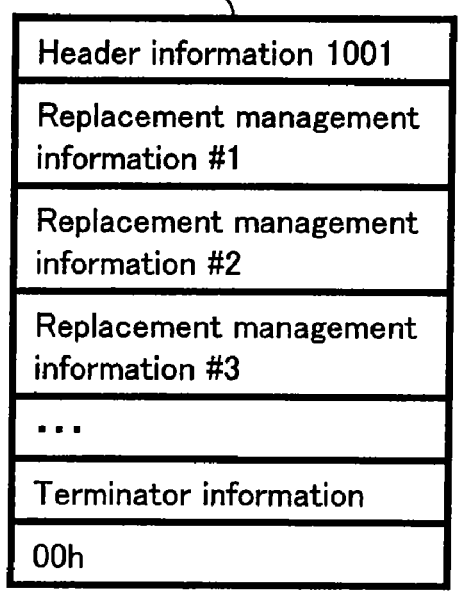
FIG. 5A is an illustrative diagram showing an exemplary data structure of the replacement management information list 1000 according to an embodiment of the present invention.

As the replacement information for performing such a mapping process, the replacement management information list 1000 shown in FIG. 5A is used.

By performing such a mapping process, it is possible to realize that it can be seen as if the data is overwritten, although the data is not actually overwritten. Hereinafter, this recording method is referred to as a pseudo-overwrite recording.

FIG. 5A shows a data structure of a replacement management information list 1000 which is replacement information according to the present invention. The replacement management information list 1000 is used to map the location of the defective cluster to the location of the replacement cluster. The replacement management information list 1000 includes header information 1001 and a plurality of replacement management information 1010 (e.g. replacement management information #1, #2, #3 . . . ).

The header information 1001 includes the number of the replacement management information included in the replacement management information list 1000. The replacement management information includes information indicating the mapping described above.

Figure 5B:
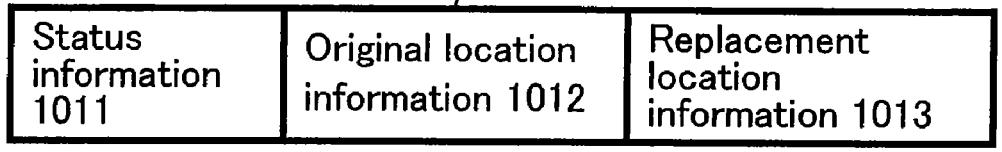
FIG. 5B is an illustrative diagram showing an exemplary data structure of the replacement management information 1010 according to an embodiment of the present invention.

FIG. 5B shows a data structure of the replacement management information 1010. The replacement management information 1010 includes status information 1011, original location information 1012 and replacement location information 1013.

The status information 1011 includes status information concerning the mapping described above. For example, the status information indicates a type or an attribute of the replacement management information 1010, the valid/invalid status of the original location information 1012 and the replacement location information 1013 and like.

The original location information 1012 indicates a location of original information (e.g. a defective cluster).

The replacement location information 1013 indicates a location of replacement information (e.g. a replacement cluster).

In the pseudo-overwrite recording, the location of the ECC cluster before overwrite is indicated by the original location information 1012, and the location of the ECC cluster after overwrite is indicated by the replacement location information 1013. Thus, the location of the ECC cluster before overwrite is mapped to the location of the ECC cluster after overwrite.

Herein, the original location 1012 and the replacement location information 1013 registered in the replacement management information 1010 may be represented by a physical address (e.g. PSN) of the first sector in the corresponding ECC cluster. This is because a mapping is performed as a unit of ECC cluster in the defective management and the pseudo-overwrite recording.

In the conventional linear replacement method, the replacement cluster is recorded in the spare area. Accordingly, in every case, the information indicating a location of the ECC cluster in the spare area is set to the replacement location information 1013.

On the other hand, in the present invention, the location at which the replacement cluster can be recorded is not limited to the location in the spare area. It is possible to record the replacement cluster in the user data area. Accordingly, the information indicating a location of the ECC cluster in the spare area or the information indicating a location of the ECC cluster in the user data area may be set to the replacement location information 1013.

Thus, the replacement location information 1013 may indicate a location of the ECC cluster recorded in one of two areas (i.e. the spare area and the user data area). In order to determine whether the replacement location information 1013 indicates a location of the ECC cluster in the spare area or a location of the ECC cluster in the user data area, information indicating one of the two cases may be defined. Such information may be incorporated into the status information 1011.

1-3. Recording/Reproduction Apparatus

Figure 6:
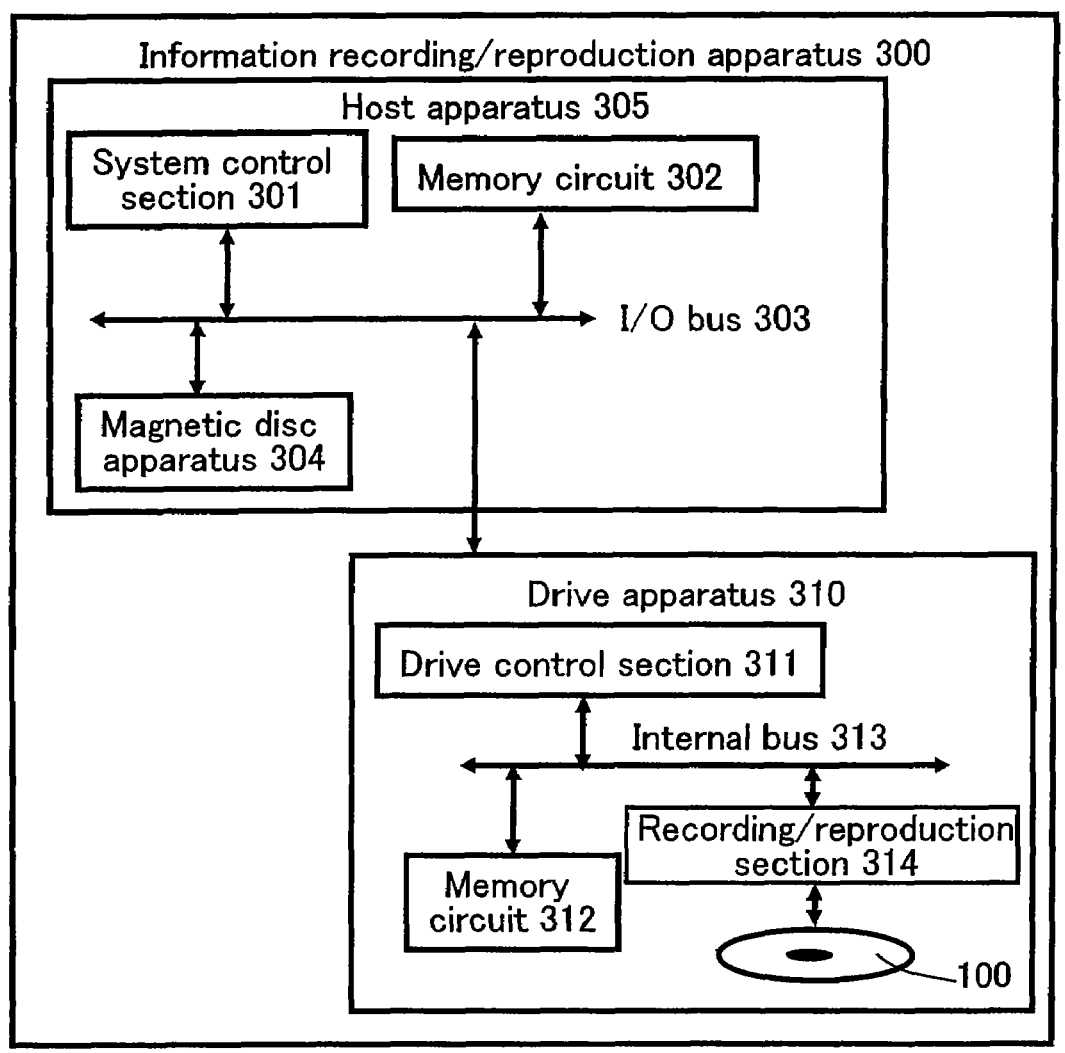
FIG. 6 is a block diagram showing an exemplary configuration of the information recording/reproduction apparatus 300 according to an embodiment of the present invention.

FIG. 6 shows a configuration of an information recording/reproduction apparatus 300 according to an embodiment of the present invention.

The information recording/reproduction apparatus 300 includes a host apparatus 305 and a drive apparatus 310.

The host apparatus 305 can be, for example, a computer system or a personal computer.

The drive apparatus 310 can be, for example, any one of a recording apparatus, a reproduction apparatus and a recording/reproduction apparatus. The information recording/reproduction apparatus 300 as a whole also can be called any one of a recording apparatus, a reproduction apparatus and a recording/reproduction apparatus.

The host apparatus 305 includes a system control section 301 and a memory circuit 302. The host apparatus 305 may further include magnetic disc apparatus 304 such as a hard disc drive. The components in the host apparatus 305 are connected to each other via an I/O bus 303.

The system control section 301 can be implemented, for example, by a microprocessor including a system control program and a memory for operation. The system control section 301 controls various processes and performs various operations such as recording/reproduction of a volume structure/file structure of a file system, recording/reproduction of a metadata partition/file structure described below, recording/reproduction of files and recording/reproduction of the lead-in/lead-out areas.

The memory circuit 302 is used to operate information such as a volume structure, a file structure, a metadata partition/file structure and files, and is used to temporarily store them.

The drive apparatus 310 includes a drive control section 311, a memory circuit 312, and a recording/reproduction section 314. The components in the drive apparatus 310 are connected to each other via an internal bus 313.

The drive control section 310 can be implemented, for example, by a microprocessor including a drive control program and a memory for operation. The drive control section 310 controls various processes and performs various operations such as recording/reproduction of the disc management information area and the spare area and the pseudo-overwrite recording/reproduction.

The system control section 301 and drive control section 310 shown in FIG. 6 can be implemented by a semiconductor integrated circuit such as an LSI. Alternatively, they can be implemented by a general processor and a memory (e.g. a ROM).

A program is stored in the memory (e.g. a ROM). The program is executable by a computer (e.g. a general processor). This program may represent a reproduction process and/or a recording process according to the present invention described above or described below. A computer (e.g. a general processor) performs the reproduction process and/or the recording process according to the present invention in accordance with the program.

The memory circuit 312 is used to operate data concerning the disc management information area and the spare area and data transferred to the drive apparatus 310, and is used to temporarily store them.

1-4. Procedure of Recording Process (1)

Figure 7:
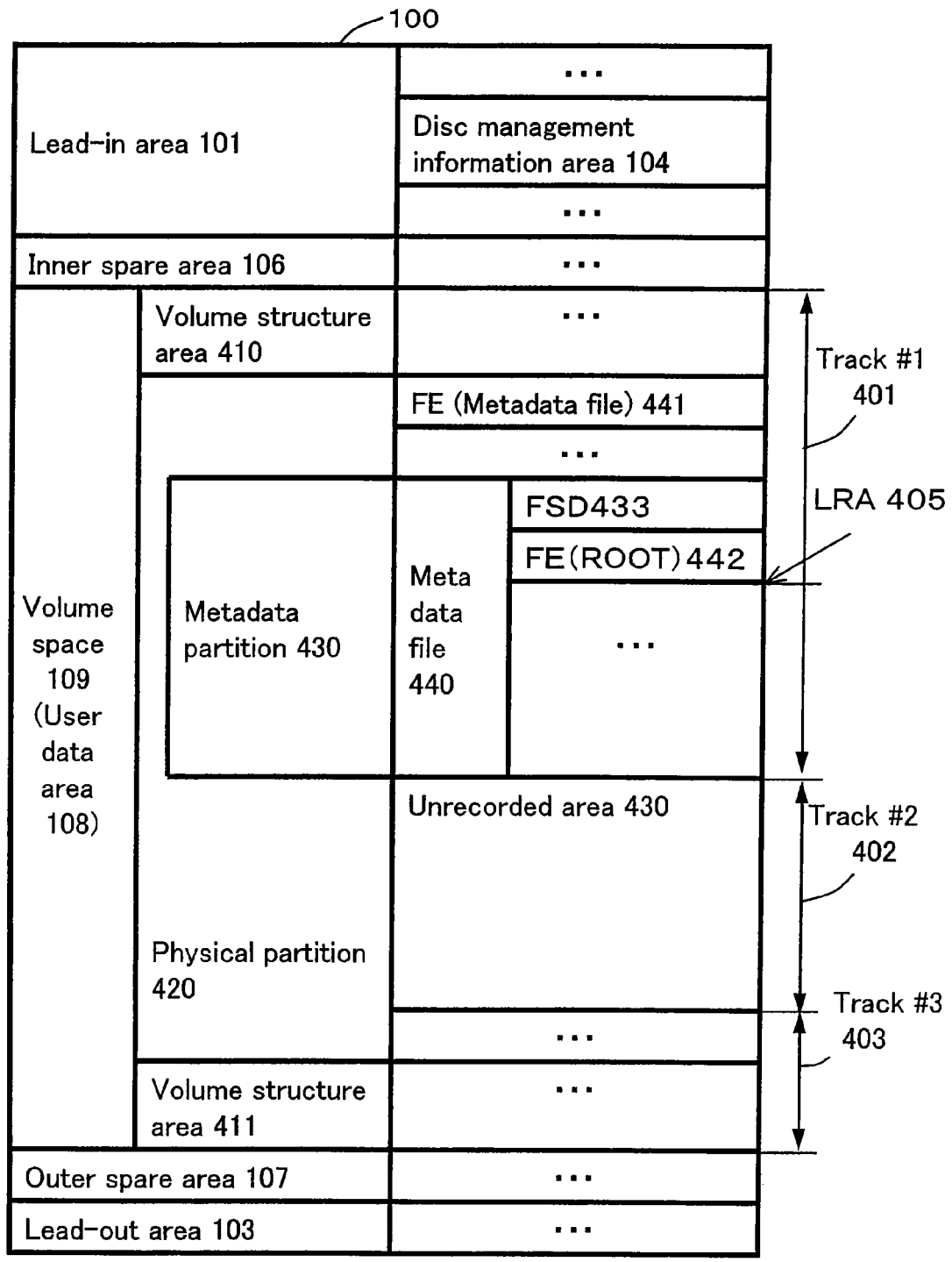
FIG. 7 is an illustrative diagram showing an exemplary data structure of the information recording medium after the formatting process according to an embodiment of the present invention.

With reference to FIG. 7, the data structure of the information recording medium 100 after performing a format process according to the present embodiment of the invention will be described below.

Track #1 401, track #2 402 and track #3 403 are allocated in the user data area 108.

A volume space 109 is allocated in the user data area 108. A volume structure area 410, a physical partition 420 and a volume structure area 411 are allocated in the volume space 109.

In the physical partition 420, a metadata partition 430 is included. The metadata partition 430 is defined in a pseudo-overwrite method in version 2.5 or higher version of the UDF specification.

In the metadata partition 430, a metadata file 440 is recorded. In order to simplify the description, the description of a metadata mirror file is omitted below. The metadata mirror file is a duplication of metadata file 440. The metadata mirror file can be also recorded.

A FE (Metadata file) 441 is recorded. The FE (Metadata file) 441 is a file entry (FE) indicating a recording location of the metadata file 440 in the physical partition 420.

The information on the file structure such as a file entry (FE) indicating a recording location of a user data file or a directory, is located in the metadata partition 430 (i.e. the metadata file 440).

In FIG. 7, only the ROOT directory is recorded. In the metadata file 440, only a file set descriptor 433 FE and an FE (ROOT) 442 are recorded. In order to simplify the description, it is assumed that a directory file is included in each FE.

It is assumed that the state shown in FIG. 7 is a state in which any replacement recording has not been performed yet. The management of unrecorded areas in the metadata partition 430 may be performed using a metadata bitmap (not shown) as defined in version 2.5 of the UDF specification.

Alternatively, it is possible to perform the management of unrecorded areas in the metadata partition 430 by the LRA 405 in the track #1 while maintaining unrecorded areas in the metadata partition 430 unrecorded.

The method for allocating tracks is not limited to the method shown in FIG. 7. For example, more tracks can be allocated. It is possible to add a new track when it is required, while maintaining the state of the last track in the user data area such that the new track can be added to the last track.

Next, with reference to a flowchart shown in FIG. 8A, the procedure of the data recording process will be described below.

Herein, a case where a data file (File-a) is to be recorded in the information recording medium 100 is described as an example.

A plurality of physical addresses are assigned to the data area 102 of the information recording medium 100. A plurality of logical addresses are assigned to the user data area 108 of the information recording medium 100. It is assumed that a corresponding relationship between the plurality of logical addresses and the plurality of physical addresses is predetermined.

Each of the plurality of logical addresses is represented by a logical sector number (LSN) or a logical block address (LBA). Each of the plurality of physical addresses is represented by a physical sector number (PSN) or physical block address (PBA). Further, it is assumed that at least one track is allocated in user data area 108.

(Step S101) Prior to recording the data file (File-a), the drive control section 311 performs a preparation process for the data recording. Such a preparation process for the data recording is performed, for example, when the information recording medium 100 is loaded into the drive apparatus 310.

For example, the drive control section 311 reads the latest disc management information from the disc management information area 104 (or the disc management information area 105) of the information recording medium 100.

The drive control section 311 obtains the user area start location information 1103, the user area end location information 1104, the spare area information 1105 and like from the disc management information in order to determine a primary logical address-physical address mapping indicating the corresponding relationship between the plurality of logical addresses and the plurality of physical addresses assigned to the user data area 108.

Hereinafter, the drive control section 311 performs translation between the logical address and primary physical address in accordance with the primary logical address-physical address mapping.

The drive control section 311 obtains track management information included in the disc management information area 104.

(Step S102) The drive control section 311 receives a recording instruction from the host apparatus 305. The recording instruction includes a logical address indicating a location at which data is to be recorded. This logical address is represented, for example, by a logical sector number (LSN) or a logical block address (LBA). The recording instruction may include a single logical address indicating a location at which single data is to be recorded, or it may include a plurality of logical addresses indicating a plurality of locations at which a plurality of data are to be recorded respectively.

The logical address included in the recording instruction is determined, for example, by the host apparatus 305 based on a logical address indicating a location at which data is to be recorded the next time (i.e. a logical next writable address (a logical NWA)).

The logical NWA is output from the drive apparatus 310 to the host apparatus 305 in response to a request from the host apparatus 305 to the drive apparatus 310, for example.

The logical NWA is obtained by translating the NWA determined by Expression (1) described above in accordance with the primary logical address-physical address mapping. This translation is performed by the drive control section 311. The procedure for determining the NWA and the logical NWA will be described later in detail in embodiment 2 of the invention.

The system control section 301 of the host apparatus 305 generates and updates file system information as necessary in order to record data file (File-a). For example, the system control section 301 generates an FE (File-a) for the data file (File-a) and updates the ROOT directory which is a parent directory of the data file (File-a) using the memory circuit 302.

The generated FE (File-a) for the data file (File-a) and the updated ROOT directory are recorded in the information recording medium 100 by outputting the recording instruction from the host apparatus 305 to the drive apparatus 310. Thus, the latest file system information is reflected on the information recording medium 100.

If necessary, the host apparatus 305 inquires the drive apparatus 310 using a predetermined command as to whether or not there is any remaining unrecorded area for performing a replacement recording.

The instructions from the host apparatus 305 to the drive apparatus 310 may be a standardized command such as a SCSI multi-media command.

For example, a request for the logical NWA may be a READ TRACK INFORMATION command, and a recording instruction may be a WRITE command.

(Step S103) The drive control section 311 translates the logical address included in the recording instruction received in step S102 into a physical address in accordance with the primary logical address-physical address mapping.

(Step S104) The drive control section 311 determines a track (an open track) of the at least one track allocated in the user data area 108 based on the physical address corresponding to the logical address included in the recording instruction and the track management information 210 (FIG. 2B) included in the disc management information.

The drive control section 311 determines a physical address indicating a location at which data is to be recorded the next time (i.e. NWA) within the determined track, based on LRA 213 within the determined track. This NWA is a next writable address determined in accordance with Expression (1) described above.

The NWA may be determined in step S104. Alternatively, the NWA may be determined in other steps other than step S104 (e.g. in the preparation process for the data recording described above).

By calculating the NWA using the LRA, it is not necessary to hold the information on the NWA in the track management information. As a result, it is possible to simplify the data structure of the track management information.

(Step S105) The drive control section 311 determines whether or not the physical address corresponding to the logical address included in the recording instruction is less than the NWA.

When it is determined that the physical address corresponding to the logical address included in the recording instruction is less than the NWA, the recording instruction is determined as a recording instruction for the recorded area in the user data area 108. In this case, the process proceeds to step S106. Otherwise, the process proceeds to step S108.

(Step S106) The drive control section 311 determines data to be recorded. When the data recording is performed as a unit of ECC cluster in the information recording medium 100, the drive control section 311 determines the data specified by the recording instruction as the data to be recorded. For example, if the recording location and the size of the data specified by the recording instruction match a boundary of the ECC clusters, then an entire ECC cluster is rewritten. In this case, the drive control section 311 determines the data itself specified by the recording instruction as the data to be recorded.

If it does not match any boundary of the ECC clusters, then the drive control section 311 performs a read-modify-write process described below. In this case, the drive control section 311 determines the data as a unit of ECC cluster which is obtained during the read-modify-write process as the data to be recorded.

(Step S107) The drive control section 311 determines the recording location of the data determined in step S106. Specifically, the drive control section 311 determines a specific location in the user data area 108, which is other than the location indicated by the physical address corresponding to the logical address included in the recording instruction, as the recording location of the data determined in step S106.

The specific location maybe the NWA within the track determined in step S104.

Alternatively, the specific location may be a location indicated by an NWA within an open track which is different from the track determined in step S104. In this case, it is preferable that the NWA within the open track is an NWA which indicates a location which is closest to the location indicated by the physical address corresponding to the logical address included in the recording instruction.

(Step S108) The drive control section 311 determines whether or not the physical address corresponding to the logical address included in the recording instruction is equal to the NWA.

When it is determined that the physical address corresponding to the logical address included in the recording instruction is equal to the NWA, the recording instruction is determined as a recording instruction to the location indicated by the NWA. That is, the data recording instructed by the recording instruction is determined as an appending recording (a new recording). In this case, the process proceeds to step S109. Otherwise, the process proceeds to step S111.

(Step S109) The drive control section 311 determines data to be recorded. Specifically, the drive control section 311 determines the data specified by the recording instruction as the data to be recorded.

Then, the drive control section 311 determines whether or not the end of the data specified by the recording instruction matches a boundary of the ECC clusters. If it does not match the boundary of the ECC clusters, padding data (e.g. data consisting of one or more "00" h) is inserted such that the end of the data after insertion matches the boundary of the ECC clusters. In this case, the drive control section 311 determines the data after insertion as the data to be recorded.

(Step S110) The drive control section 311 determines the recording location of the data determined in step S106. Specifically, the drive control section 311 determines the location indicated by the physical address corresponding to the logical address included in the recording instruction (i.e. the location indicated by the NWA), as the recording location of the data determined in step S106.

(Step S111) The drive control section 311 performs an error process.

(Step S112) The drive control section 311 performs a recording process for the determined recording location.

When the determination result in step S105 is "Yes", the drive control section 311 controls the recording/reproduction section 314 to record the data determined in step S106 at the recording location determined in step S107.

When the determination result in step S108 is "Yes", the drive control section 311 controls the recording/reproduction section 314 to record the data determined in step S109 at the recording location determined in step S110.

Further, the drive control section 311 performs a verify process for the recorded data to determine whether or not the data recording has succeeded. If the data recording has succeeded, then the process proceeds to step S113.

If the data recording has failed, then an unrecorded area in the spare area (e.g. the inner spare area 106) or the user data area 108 is allocated as a replacement cluster, and the data is recorded in the replacement cluster.

After the data recording has finally succeeded, the process proceeds to step S113.

For example, the processes of step S106 and step S112 described above is performed as a read-modify-write process (hereinafter RMW process).

According to the RMW process, firstly, the drive control section 311 controls the recording/reproduction section 314 to reproduce the data recorded in the ECC cluster including a physical sector at a location indicated by the physical address corresponding to the logical address included in the recording instruction, and it stores the data reproduced from the ECC cluster in the memory circuit 312 (i.e. "read" process).

There is a possibility that the ECC cluster to be reproduced is replaced with a replacement cluster at the time when the reproduction process is performed. The drive control section 311 refers to the replacement management information list 1000, and, if necessary, it controls the recording/reproduction section 314 to reproduce the data recorded in the replacement cluster. The procedure of the data reproduction referring to the replacement management information list 1000 will be described later.

Secondly, the drive control section 311 replaces the data recorded in the physical sector at the location indicated by the physical address corresponding to the logical address included in the recording instruction among the data reproduced from the ECC cluster with the data included in the recording instruction (i.e. "modify" process). As a result, the data to be recorded in the replacement cluster is obtained.

The drive control section 311 performs a read process and a modify process in step S106.

Figure 8A:
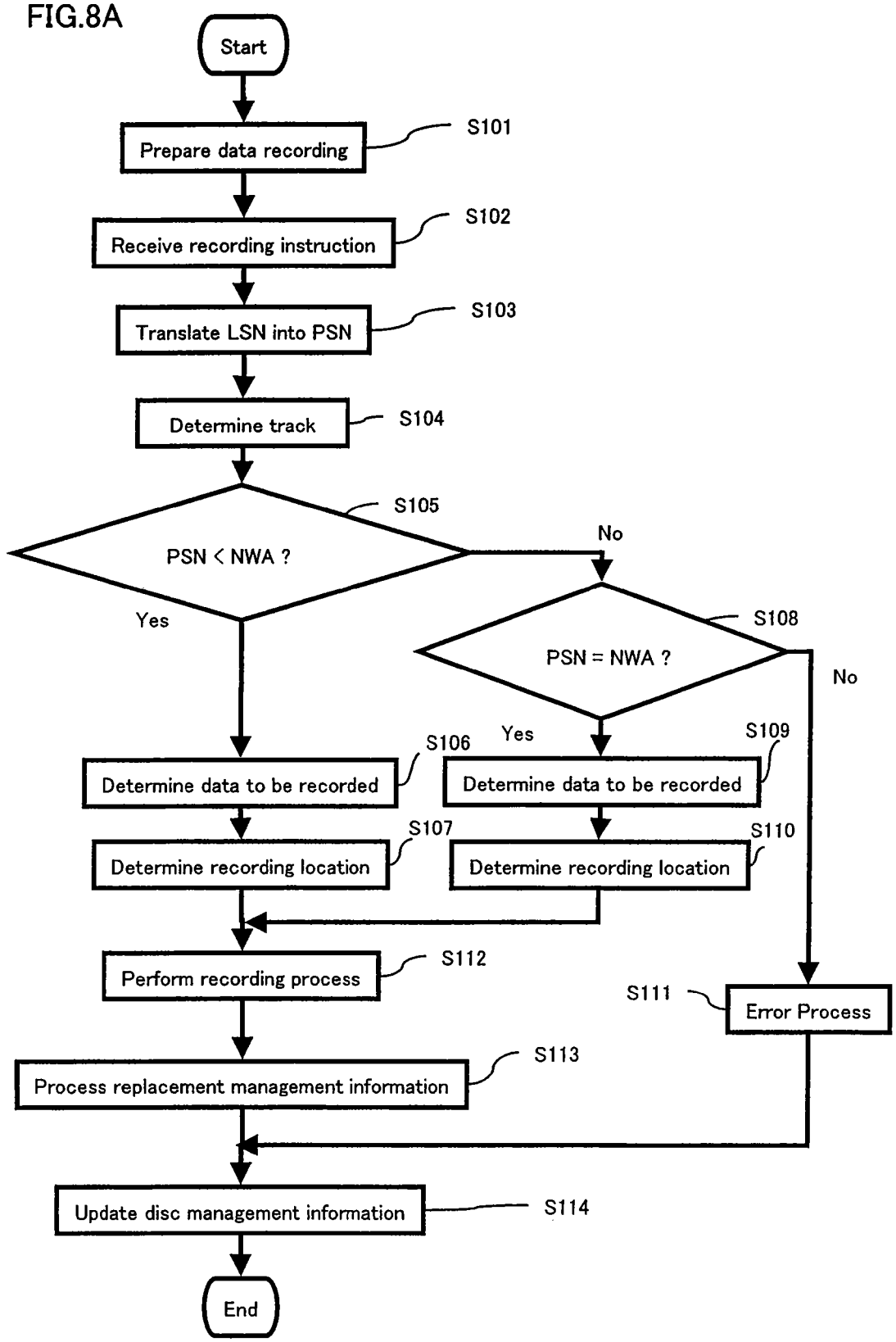
FIG. 8A is a flowchart showing a recording process according to an embodiment of the present invention.
Figure 8B:
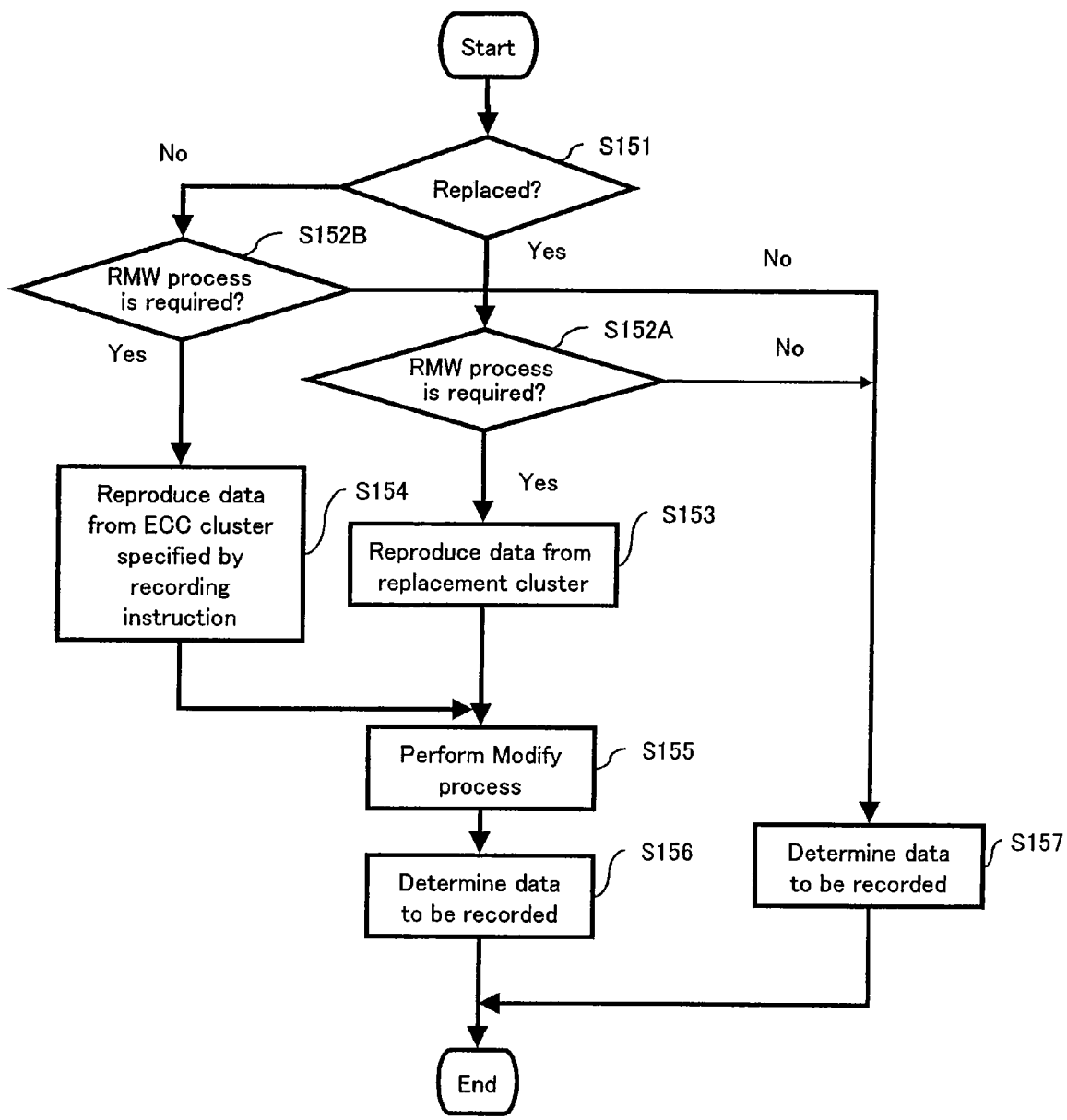
FIG. 8B is a flowchart showing a RMW process according to an embodiment of the present invention.

FIG. 8B shows the steps performed when the read process and the modify process are performed in step S106 shown in FIG. 8A. Each step shown in FIG. 8B is performed by the drive control section 311 of the drive apparatus 310.

(Step S151) The drive control section 311 determines whether or not the ECC cluster including the location specified by the recording instruction has been already replaced by an replacement cluster. Such a determination is made, for example, by retrieving the replacement management information list 1000.

If the replacement management information 1010 which indicates the location specified by the recording instruction as original location is found, it is determined that the ECC cluster has been already replaced by the replacement cluster and the process proceeds to step S152A. Otherwise, the process proceeds to step S152B.

By holding the determination result of step S151 as a value of the internal variable, it is possible to refer to the value of the internal variable. By referring to the value of the internal variable, if necessary, in the steps other than step S151, it is possible to determine whether or not the ECC cluster including the location specified by the recording instruction has been already replaced by a replacement cluster. This makes it possible to avoid repeatedly performing the same process. For example, if the determination result of step S151 is "Yes", then the value of "1" may held as the value of the internal variable, and if the determination result of step S151 is "No", then the value of "0" may held as the value of the internal variable.

(Step S152A) The drive control section 311 determines whether or not the RMW process is required. For example, if the location and the size specified by the recording instruction matches a boundary of the ECC clusters, then drive control section 311 determines that the RMW process is not required. If the location and the size specified by the recording instruction do not match any boundary of the ECC clusters, then drive control section 311 determines that the RMW process is required.

If it is determined that the RMW process is required, then the process proceeds to step S153. Otherwise, the process proceeds to step S157.

Similar to step S151, by holding the determination result of step S152A as a value of the internal variable, it is possible to refer to the value of the internal variable. By referring to the value of the internal variable, if necessary, in the steps other than step S152A, it is possible to determine whether or not the RMW process is required.

(Step S152B) The drive control section 311 determines whether or not the RMW process is required. The process of step S152B is the same as the process of step S152A.

(Step S153) The drive control section 311 controls the recording/reproduction section 314 to reproduce the data recorded in the replacement cluster indicated by the replacement management information 1010 found in step S151, instead of the ECC cluster including the location specified by the recording instruction, and stores the reproduced data in the memory circuit 312.

(Step S154) The drive control section 311 controls the recording/reproduction section 314 to reproduce the data recorded in the ECC cluster including the location specified by the recording instruction, and stores the reproduced data in the memory circuit 312.

(Step S155) The drive control section 311 replaces the reproduced data by the data specified by the recording instruction so as to generate a modified data.

(Step S156) The drive control section 311 determines the modified data as the data to be recorded in the information recording medium 100.

(Step S157) The drive control section 311 determines the data specified by the recording instruction as the data to be recorded in the information recording medium 100.

Thus, the read process and the modify process are completed.

Thirdly, the drive control section 311 controls the recording/reproduction section 314 to record the data obtained as a result of the modify process (i.e. the data to be recorded in the replacement cluster) in a location of the original ECC cluster (i.e. "write" process). The drive control section 311 performs write process in step S112.

However, in the present invention, since the information recording medium is a write-once recording medium, it is not possible to actually record the data in a location of the original ECC cluster.

Accordingly, in the present invention, an unrecorded area in the spare area such as the inner spare area 106 or the user data area 108 is allocated as a replacement cluster, and the updated data is recorded in the replacement cluster.

Further, the drive control section 311 performs a verify process to determine whether or not the data recording has succeeded. When it is determined that the data recording has succeeded, the process proceeds to step S113.

When it is determined that the data recording has failed, an unrecorded area in the spare area such as the inner spare area 106 or the user data area 108 is allocated as a further replacement cluster, and the data is recorded in the further replacement cluster.

After the data recording has finally succeeded, the process proceeds to step S113.

When the area specified by the recording instruction corresponds to an entire ECC cluster, the entire ECC block is rewritten. In this case, the read process described above is not required.

(Step S113) The drive control section 311 generates replacement management information 1010 in accordance with the process in step S112, and stores the replacement management information 1010 in memory circuit 312. For example, in step S112, when the drive control section 311 controls the recording/reproduction section 314 to record data at a specific location in the user data area 108 wherein the specific location is any location other than the location indicated by the physical address corresponding to the logical address included in the recording instruction, the drive control section 311 generates replacement management information 1010 which maps the physical address corresponding to the logical address included in the recording instruction to a physical address indicating the specific location.

It is possible to determine whether or not the replacement management information 1010 having the original location information 1012, which indicates the same location as the physical address corresponding to the logical address included in the recording instruction, is found in the existing replacement management information list 1000 by retrieving the existing replacement management information list 1000.

If it is found, the drive control section 311 updates the replacement management information 1010 so as to set the physical address indication of the specific address as a new replacement location information 1013.

If it is not found, the drive control section 311 generates new replacement management information 1010 and adds the new replacement management information 1010 to the replacement management information list 1000.

Next, the drive control section 311 sorts the replacement management information list 1000. For example, the drive control section 311 sorts the replacement management information list 1000 by the status information 1011, and then sorts it by the physical address indicated by the original location information 1012.

Thus, a new replacement management information list 1000 including the replacement management information 1010 which maps the physical address corresponding to the logical address included in the recording instruction to the physical address indicating the specific location is generated.

(Step S114) The drive control section 311 updates the disc management information to reflect the recording process described above. For example, the drive control section 311 updates the last recorded address information 1107. In addition, the drive control section 311 updates the LRA 213 in each track management information 210 corresponding to the tracks in which data have been recorded to reflect the latest recording status.

Further, the drive control section 311 generates the new disc management information including the updated information such as the new replacement management information list 1000 and track management information 210. In addition, the drive control section 311 sets the replacement management information list location information 1102 and the session management information location information 1109 included in the new disc management information to indicate the latest recording location of the new replacement management information list 1000 and track management information 210 on the information recording medium 100.

The drive control section 311 controls the recording/reproduction section 314 to record the new disc management information in a predetermined area (e.g. a temporal disc management information area) on the information recording medium 100. Thus, the disc management information is updated to reflect the latest status.

When the data recording is completed, the drive apparatus 310 can notify the host apparatus 305 of the result of the recording process. The result of the recording process is, for example, information indicating that the data recording has succeeded or failed.

Such a notification can be sent to the host apparatus 305 at a predetermined timing. For example, it is possible to send this notification to the host apparatus 305 at the timing of the end of step S108 or at the timing when an error occurs in step S112. Alternatively, it is possible to send this notification before the data recording is actually completed. For example, it is possible to send a notification indicating that the data recording is completed to the host apparatus 305 at the timing when the interpretation of the received record instruction is completed correctly.

In the replacement recording process, it is possible to retrieve an unrecorded area in a direction along which the PSNs are increased from the location of the original ECC cluster. If the unrecorded area is found during the retrieval, the unrecorded area is allocated as a replacement cluster.

Alternatively, it is possible to first retrieve an unrecorded area in a track including the original ECC cluster, and then retrieve an unrecorded area for each track in a direction along which the PSNs are increased from the track.

When the retrieval for the unrecorded area reaches the end of the user data area 108 without finding any unrecorded area, it is possible to retrieve an unrecorded area in the outer spare area 107 following the user data area 108.

Further, the retrieval for the unrecorded area reaches the end of the outer spare area 107 without finding any unrecorded area, it is possible to retrieve an unrecorded area in a direction along which the PSNs are increased from a predetermined location at the inner side of the information recording medium 100 (e.g. a leading position of the inner spare area 106 or a leading position of the user data area 108 or a location apart from its leading position by a predetermined distance).

In steps S105 and S108 of the procedure of the recording process, it is determined whether the data recording is a pseudo-overwrite recording or an appending recording by comparing the physical address corresponding to the logical address included in the recording instruction with the NWA.

The reason why it is determined whether the data recording is a pseudo-overwrite recording or an appending recording based on such a comparison is that the information recording medium 100 is a write-once recording medium and that a sequential recording is performed for the write-once recording medium.

The replacement recording method using the user data area described above according to the present invention is applicable to any rewritable optical disc. However, in order to determine whether the data recording is a overwrite recording or an appending recording (or a new recording) for the rewritable optical disc, a more complex process is required. This is because, in the case of the rewritable optical disc, it is possible to randomly rewrite data at an arbitrary location on the optical disc.

When the drive apparatus manages an unrecorded area on the rewritable optical disc as described in the embodiment above, it is necessary to manage replacement management information corresponding to all ECC clusters on the rewritable optical disc using the SDL, as described in the background art of the present specification, for example. Further, in order to determine whether the data recording for recording data at a certain location in the user data area is an overwrite recording or a new recording, it is necessary to retrieve an entire replacement management information list 1000, for example. Similarly, in order to determine whether or not an ECC cluster is used as a replacement cluster, it is necessary to retrieve an entire replacement management information list 1000. The amount of such a retrieving process is increased as the size of the replacement management information list 1000 is increased. This should be a problem since the capacity of the optical disc is being increased more and more.

On the other hand, in the present invention, since the information recording medium 100 is a write-once recording medium, it is ensured that every area in a track which has an address less than the NWA is an unrecorded area.

Accordingly, by performing the comparison described in steps S105 and S108, it is possible to easily determine whether the data recording is a pseudo-overwrite recording or an appending recording, regardless of the size of the replacement management information list 1000. Further, it is possible to easily select a replacement cluster since the replacement cluster can be selected from any location after the NWA.

The pseudo-overwrite recording in a random recording method for a write-once optical disc is performed in a similar way as the rewritable optical disc.

Further, in order to perform the random recording method for the write-once optical disc, a special structure such as the space bitmap management information 220 is required. The management of the unrecorded area for the random recording method using the space bitmap management information 220 requires significantly greater processing load to the drive control section 311, compared to the management of the unrecorded area for the sequential recording method.

In particular, in the sequential recording method, it is possible to limit the number of open tracks to a predetermined number (for example, four at maximum) so that the utilization of a file system is not reduced.

In this case, the number of open tracks depends on the structure of the file system, and it is independent from the capacity of the optical disc. On the other hand, the size of the space bitmap management information 220 is increased as the capacity of the optical disc is increased. As a result, the processing load is also increased.

Thus, the effect of the present invention for performing a pseudo-overwrite in the sequential recording method is very significant for the optical disc, since the capacity of the optical disc is being increased more and more.

One feature of the present invention is to determine an NWA in accordance with LRA 213 included in the latest track management information 210 and expression (1) in order to determine whether the data recording is a pseudo-overwrite recording or an appending recording.

By recording the LRA 213, which has been updated as a result of the data recording, on the disc, it is possible to reduce the time required to find the latest LRA 213 when the information recording medium 100 is loaded into the drive apparatus 310.

By calculating the NWA using the LRA 213, it is not necessary to hold information on the NWA in the track information. As a result, it is possible to simplify the data structure of the track management information.

In order to determine whether the data recording is a pseudo-overwrite recording or an appending recording without using a method according to the present invention, the following procedure is required, for example.

Specifically, the procedure includes the steps of determining a track including a physical address corresponding to the logical address included in the recording instruction, sequentially checking ECC clusters from a leading position of the determined track, and determining whether or not each of the ECC clusters is recorded.

If the ECC cluster is in a recorded state at a location indicated by the recording instruction, then it is determined that the data recording is a pseudo-overwrite recording.

However, it is not preferable to perform such a procedure since the amount of the required processing is increased as the size of the track is increased.

On the other hand, according to the present Invention, it is possible to easily determine whether the data recording is a pseudo-overwrite recording or an appending recording, regardless of the size of the track.

Further, since LRA 213 is included in the track management information 210, it is possible to easily determine an NWA as well as the determination of a track in which the data is to be recorded when the drive apparatus 310 receives the recording instruction.

Figure 9:
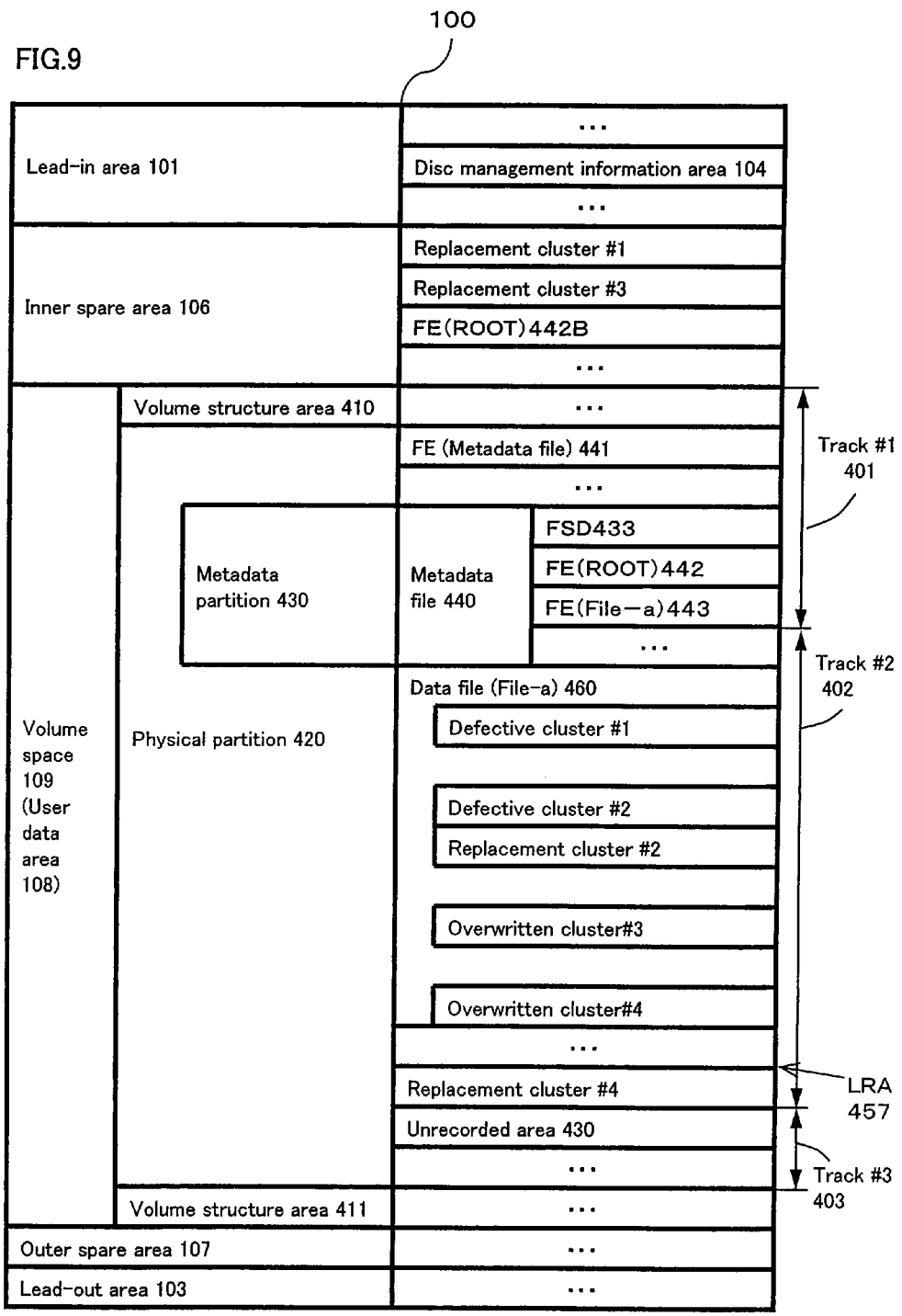
FIG. 9 is an illustrative diagram showing an exemplary data structure of the information recording medium after the recording process according to an embodiment of the present invention.

FIG. 9 shows a data structure on the information recording medium 100 after the data file has been recorded in accordance with the procedure of the data recording.

Referring to FIG. 9, data file (File-a) 460 is described as an example of the data file. It is assumed that a defective cluster #1 and a defective cluster #2 are detected in the data file (File-a) 460 in the procedure of the data recording.

The disc management information including replacement management information indicating a replacement of the defective cluster #1 with a replacement cluster #1 and a replacement management information indicating a replacement of the defective cluster #2 with a replacement cluster #2 is recorded in the disc management information area 104.

As shown in FIG. 9, the replacement cluster #1 is recorded in the inner spare area 106 and the replacement cluster #2 is recorded in the user data area 108.

The content of the data file (File-a) 460 is updated by the pseudo-overwrite recording. Specifically, an overwritten cluster #3 and an overwritten cluster #4 correspond to the updated portions of the data file (File-a) 460 according to the pseudo-overwrite recording.

The new data updated by the pseudo-overwrite recording is recorded in a replacement cluster #3 assigned as the substitute for the overwritten cluster #3 and is recorded in a replacement cluster #4 assigned as the substitute for the overwritten cluster #4. The corresponding replacement information is recorded in the disc management information area 104.

As shown in FIG. 9, the replacement cluster #3 is assigned in the inner spare area 106 and the replacement cluster #4 is assigned in the user data area 108.

1-5. Procedure of Reproduction Process (1)

Figure 10:
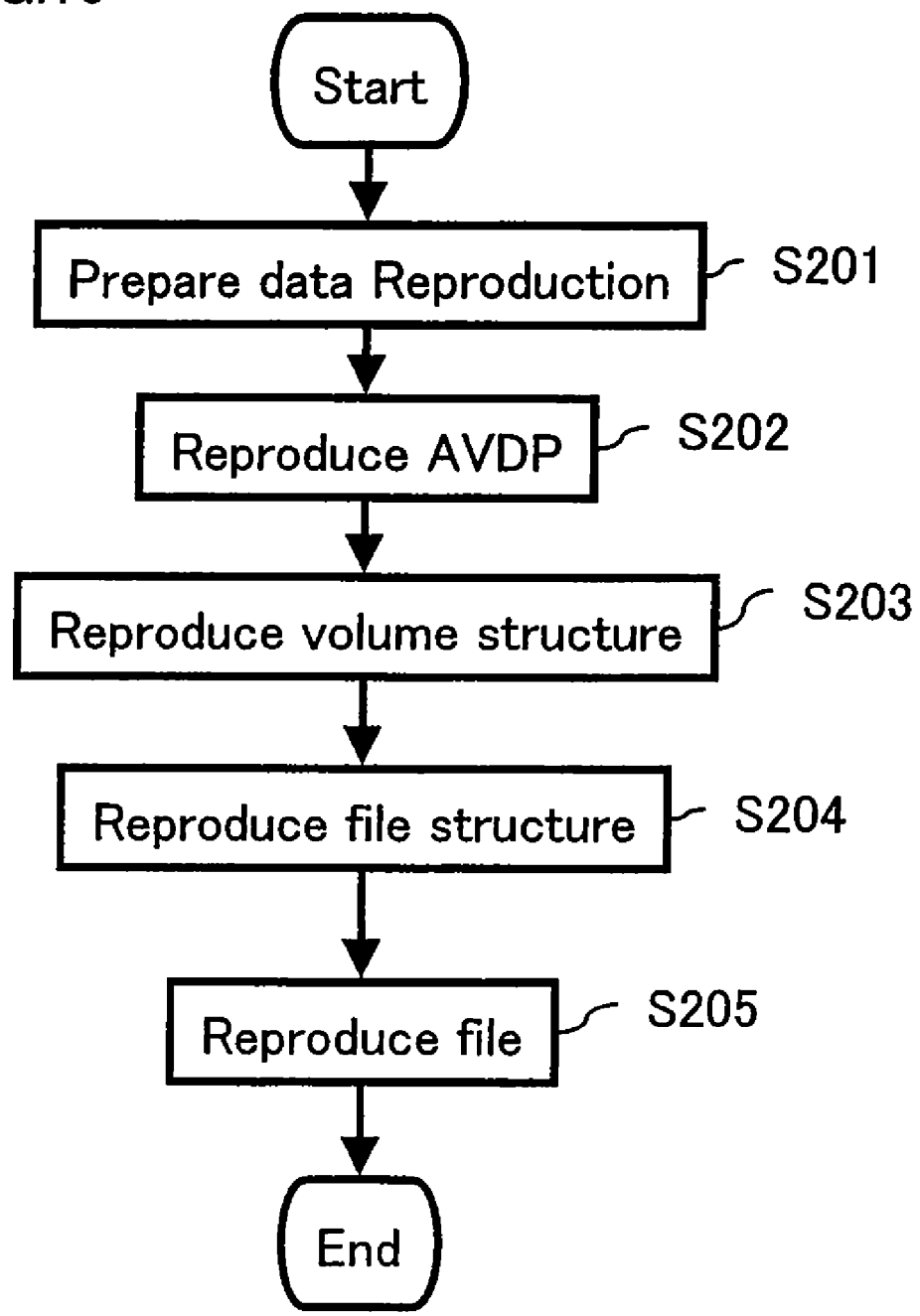
FIG. 10 is a flowchart showing a reproduction process according to an embodiment of the present invention.

With reference to a flowchart shown in FIG. 10, a reproduction process for a file is described. Herein, a reproduction process for the data file (File-a) 460 shown in FIG. 9 is described as an example.

(Step S201) Prior to performing a reproduction process, the drive control section 311 performs a preparation process for the data reproduction. Such a preparation process for the data reproduction is performed, for example, when the information recording medium 100 is loaded into the drive apparatus 310.

For example, the drive control section 311 reads disc management information from the disc management information area 104 (or the disc management information area 105) of the information recording medium 100.

The drive control section 311 obtains user area start location information 1103, user area end location information 1104, spare area information 1105 and like from the disc management information to generate a primary logical address-physical address mapping indicating the corresponding relationship between the plurality of logical addresses and the plurality of physical addresses assigned to the user data area 108.

Hereinafter, the drive apparatus 310 performs translation between the logical address and the primary physical address in accordance with primary logical address-physical address mapping.

(Step S202) The system control section 301 outputs a reproduction instruction to the drive apparatus 310 to reproduce an AVDP recorded at a predetermined location (e.g. LSN=256) of the information recording medium 100.

The AVDP is a data structure defined by the UDF specification as an anchor point of the file system information. The AVDP is recorded in the volume structure area 410 and the volume structure area 411.

(Step S203) The system control section 301 obtains location information of a main volume descriptor sequence 410A recorded in the volume structure area 410 from the AVDP. The system control section 301 outputs an instruction to the drive apparatus 310 to reproduce the main volume structure 410A.

Further, the system control section 301 obtains location information (LSN) of an FE (metadata file) 441 by retrieving the data structure from the reproduced main volume descriptor sequence 410A in steps.

(Step S204) The system control section 301 reproduces a file structure. In order to reproduce the file structure, the system control section 301 outputs a reproduction instruction to the drive apparatus 310 based on the obtained location information (LSN) of the FE (metadata file) 441 to reproduce the FE (metadata file) 441.

The system control section 301 obtains location information of a metadata file 440 from the reproduced FE (metadata file) 441. As a result, it is possible to access the metadata file 440.

(Step S205) In accordance with the procedure of the data reproduction based on the UDF specification, the FDS 433, the FE (ROOT) 442, the FE (File-a) 443 and the data file (File-a) 460 are reproduced in this order. The description of the reproduction of the directory file is omitted.

In each step in the reproduction process described above, a reproduction instruction is output from the host apparatus 305 to the drive apparatus 310. The drive control section 311 of the drive apparatus 310 receives the reproduction instruction from the host apparatus 305, and performs a reproduction process in accordance with the reproduction instruction.

The reproduction instruction includes a logical address indicating a location from which data is to be reproduced. The logical address is, for example, represented by a logical sector number (LSN). Alternatively, the logical address may be represented by a logical block address (LBA). The reproduction instruction is, for example, a READ command.

Figure 12:
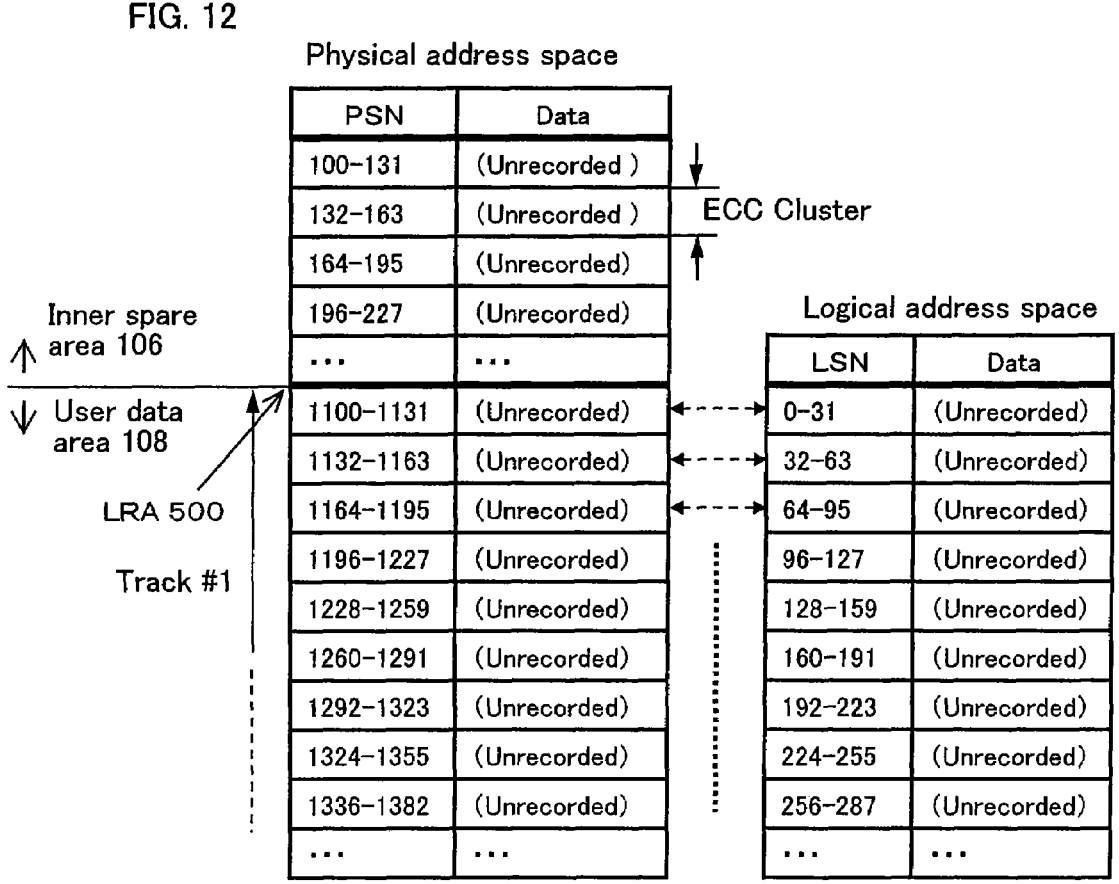
FIG. 12 is an illustrative diagram showing an exemplary data structure of the physical address space and the logical address space according to an embodiment of the present invention.

The drive control section 311 translates the logical address included in the reproduction instruction into a physical address in accordance with the primary logical address-physical address mapping (for example, see FIG. 12).

The drive control section 311 determines whether or not the replacement management information 1010 having the original location information 1012, which indicates the same location as the physical address corresponding to the logical address included in the reproduction instruction, is found in the replacement management information list 1000 by retrieving the replacement management information list 1000.

If it is found, the drive control section 311 refers to the replacement location information 1013 of the replacement management information 1010 and controls the recording/reproduction section 314 to reproduce data from the location indicated by the replacement location information 1013.

If it is not found, the drive control section 311 controls the recording/reproduction section 314 to reproduce data from the location indicated by the physical address corresponding to the logical address included in the reproduction instruction. The reproduced data is sent back to the host apparatus 305.

1-6. Procedure of Recording Process (2)

FIG. 11 shows a data structure of the replacement management information 1010B. The replacement management information 1010B is a different embodiment of the replacement management information 1010 shown in FIG. 5B.

As shown in FIG. 11, the status information 1011 of the replacement management information 1010B includes three information, i.e. Flag1, Flag2 and Flag3.

Flag1 is information for classifying the replacement management information 1010B. Flag1 includes information indicating whether the replacement information is for the purpose of the replacement recording or for the purpose of the designation of the defective cluster.

Flag2 is information on the recording location of the replacement cluster managed by the replacement management information 1010B. Flag2 includes information indicating whether the recording location of the replacement cluster is in the spare area (or there is no replacement cluster) or the recording location of the replacement cluster is in the user data area.

Flag3 is information on the number of the clusters managed by the replacement management information 1010B. Flag3 includes information indicating whether the replacement information corresponds to a single cluster or a plurality of contiguous clusters. When the replacement information corresponds to a plurality of contiguous clusters, Flag3 further includes information indicating whether the replacement information corresponds to a start location of the contiguous range or an end location of the contiguous range.

Hereinafter, with reference to FIG. 11, the procedure of the data recording according to the present invention will be described in detail.

The symbols at the right side of FIG. 11 represent the respective types of the replacement management information. These symbols are referred to in the description below, if necessary. For example, the replacement management information (type (1)) includes the status information 1011 such that Flag1=1 (for the purpose of the replacement recording), Flag2=0 (for the replacement in the spare area) and Flag3=00 (for a single cluster). This replacement management information (type (1)) may be denoted by the replacement management information (1).

FIG. 12 shows an example of the data structure of the physical address space and the logical address space on the information recording medium 100 according to the present invention.

FIG. 12 also shows a corresponding relationship between the logical sector number (LSN) and the physical sector number (PSN) in a primary state. The logical sector number (LSN) is a logical address indicating a location which is seen from the host apparatus 305 on the information recording medium 100. The physical sector number (PSN) is a physical address indicating an actual location on the information recording medium 100. This corresponding relationship is referred to as a primary logical address-physical address mapping. This mapping is represented by broken line arrows in FIG. 12 (or other figures).

Each row shown in FIG. 12 corresponds to one ECC cluster. In FIG. 12, a physical address (PSN) and a logical address (LSN) corresponding to the physical address (PSN) are shown in the same row.

In FIG. 12, the values of the PSNs and the LSNs are shown as the values of the PSNs and the LSNs from the first sector to the last sector in the corresponding ECC cluster.

Herein, it is assumed that one ECC cluster consists of 32 sectors. However, one ECC cluster may be any other configuration.

The PSNs are assigned to the inner spare area 106, the outer spare area 107 and the user data area 108.

The tracks are allocated from a leading position of the user data area 108. In the state shown in FIG. 12, since no data is recorded, the LRA 500 designates a leading position of the user data area 108.

The LSNs are assigned to only the user data area 108 (or the volume space 109).

The host apparatus 305 instructs a recording process or a reproduction process. These instructions specify a specific logical sector on the information recording medium 100 using the LSN.

The drive apparatus 310 translates the LSN received from the host apparatus 305 into a PSN using the primary logical address-physical address mapping, and accesses a physical sector or ECC cluster in accordance with the PSN.

In the replacement recording described hereinafter, the primary logical address-physical address mapping is basically used. When the logical address-physical address mapping other than the primary logical address-physical address mapping is required, the replacement management information 1010 is used.

The values of the PSNs and the LSNs are only examples for explanation. These values can be varied depending on the structure and the capacity of the information recording medium 100.

As described above, the size of the disc management information and the spare area can be changed. The size of these is determined at the time when the format process is performed in response to an instruction from the host apparatus 305. After the format process, the start location and the end location of the user data area 108 is not changed.

In this case, it is possible to determine a relationship of the primary logical address-physical address mapping uniquely (e.g. by a predetermined calculation) from information of the disc structure information 1100 (e.g. in more detail, user area start location information 1103, user area end location information 1104, spare area information 1105 and like) included in the disc management information.

With reference to FIGS. 12 to 17B, an exemplary use of the replacement management information 1010B shown in FIG. 11 will be described.

Firstly, the transition from the state shown in FIG. 12 to the state shown in FIG. 13A is described.

The host apparatus 305 instructs to record data "A" at a location of LSN=0.

Upon the receipt of the recording instruction, the drive apparatus 310 translates LSN=0 into PSN=1100 in accordance with the primary logical address-physical address mapping and records data "A" at a location of PSN=1100.

Next, the drive apparatus 310 performs a verify process for the recorded data. Herein, it is assumed that the recording of data "A" has succeeded.

The host apparatus 305 instructs to record data "A1" at a location of LSN=0.

Upon the receipt of the recording instruction, the drive apparatus 310 translates LSN=0 into PSN=1100 in accordance with the primary logical address-physical address mapping and performs a RMW process at a location of PSN=1100. Then, the drive apparatus 310 records data "A1" at a location of PSN=100 in the inner spare area 106.

The drive apparatus 310 generates replacement management information 511. The location of PSN=1100 at which data "A" is recorded is set to the original location of the replacement management information 511. The location of PSN=100 at which data "A1" is recorded is set to the replacement location of the replacement management information 511. The status information 1011 of the replacement management information 511 is set in accordance with FIG. 11.

The replacement management information 511 corresponds to solid line arrows shown in FIG. 13A. The tail of each arrow represents the original location of the replacement management information 511 and the head of each arrow represents the replacement location of the replacement management information 511. Hereinafter, a similar notation will be used.

In the state shown in FIG. 13A, the host apparatus 305 instructs to record data "B" at a location of LSN=2. Herein, it is assumed that the recording of data "B" has failed. Then, the data "B" is recorded at a location of PSN=132 in the inner spare area 106.

The replacement management information 512 is generated in response to this replacement recording. The location of PSN=1032 is set to the original location of the replacement management information 512. The location of PSN=132 is set to the replacement location of the replacement management information 512. The status information 1011 of the replacement management information 512 is set in accordance with FIG. 11.

The data allocation and the replacement management information list after the data recording described above is completed are shown in FIG. 13A and FIG. 13B, respectively. In the replacement management information list 1000A shown in FIG. 13B, the replacement management information (1) is used.

With reference to FIGS. 14A and 14B, the cases where the replacement management information (4) and (7) are used will be described.

The host apparatus 305 instructs to record data "C" at a location of LSN=64. In accordance with the recording instruction, the drive apparatus 310 records data "C" at a location of PSN=1164. Herein, it is assumed that the recording of data "C" has failed. Then, a recorded area in the user data area 108 (PSN=1196) is allocated and the data "C" is recorded at a location of PSN=1196 instead of the location of PSN=1164.

The replacement management information 513 is generated in response to this replacement recording.

The host apparatus 305 instructs to record data "D" at a location of LSN=128. Then, the host apparatus 305 instructs to record data "D1". Herein, it is assumed that the recording of data "D1" has failed. Then, the data "D1" is recorded at a location of PSN=1292.

The replacement management information 514 is generated in response to this replacement recording.

PSN=1260 indicates a location of a defective cluster, wherein there is no replacement cluster corresponding to the defective cluster. Then, the replacement management information 515 is generated.

The host apparatus 305 instructs to record data "D2" at a location of LSN=128. Then, the data "D2" is recorded at a location of PSN=1324.

The replacement management information 514A is generated in response to this replacement recording. The replacement management information 514 becomes unnecessary. Accordingly, the replacement management information 514 is deleted from the replacement management information list 1000.

After the recording process described above is completed, the location of the LRA is updated to a location indicated by 500B.

The replacement management information list 1000B (FIG. 14B) is sorted by Flag1 of the status information 1011, and then it is sorted by the value of PSN indicated by the original location information 1012.

Figures 15A, 15B:
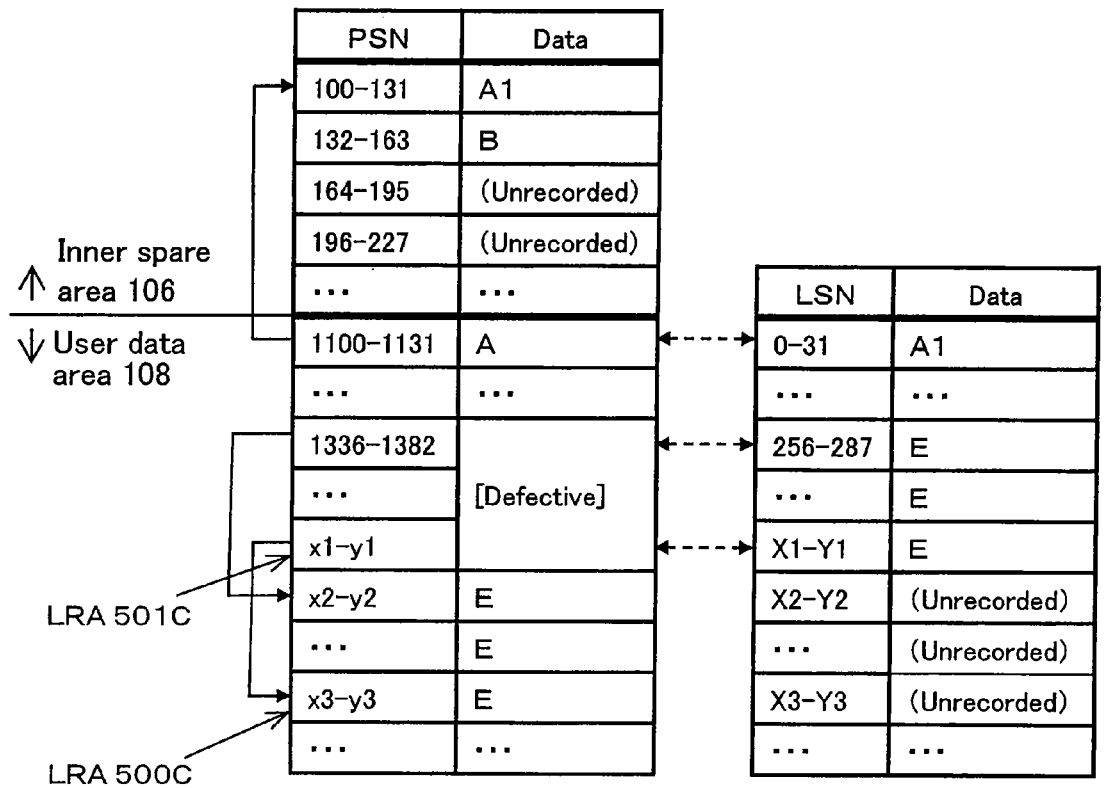
FIG. 15A is an illustrative diagram showing a replacement recording according to an embodiment of the present invention.
FIG. 15B is an illustrative diagram showing a replacement management information according to an embodiment of the present invention.

With reference to FIGS. 15A and 15B, the cases where the replacement management information (5) and (6) are used will be described.

The host apparatus 305 instructs to record data "E" at a location of LSN=256~X1. Herein, it is assumed that the recording of data "E" has failed. Then, the data "E" is recorded at a location of PSN=x2~x3. The replacement management information 516 and the replacement management information 517 are generated. Each of the replacement management information 516 and 517 indicates the first PSN of the ECC cluster corresponding to a start location of the replacement recording and the first PSN of the ECC cluster corresponding to an end location of the replacement recording.

Figures 16A, 16B:
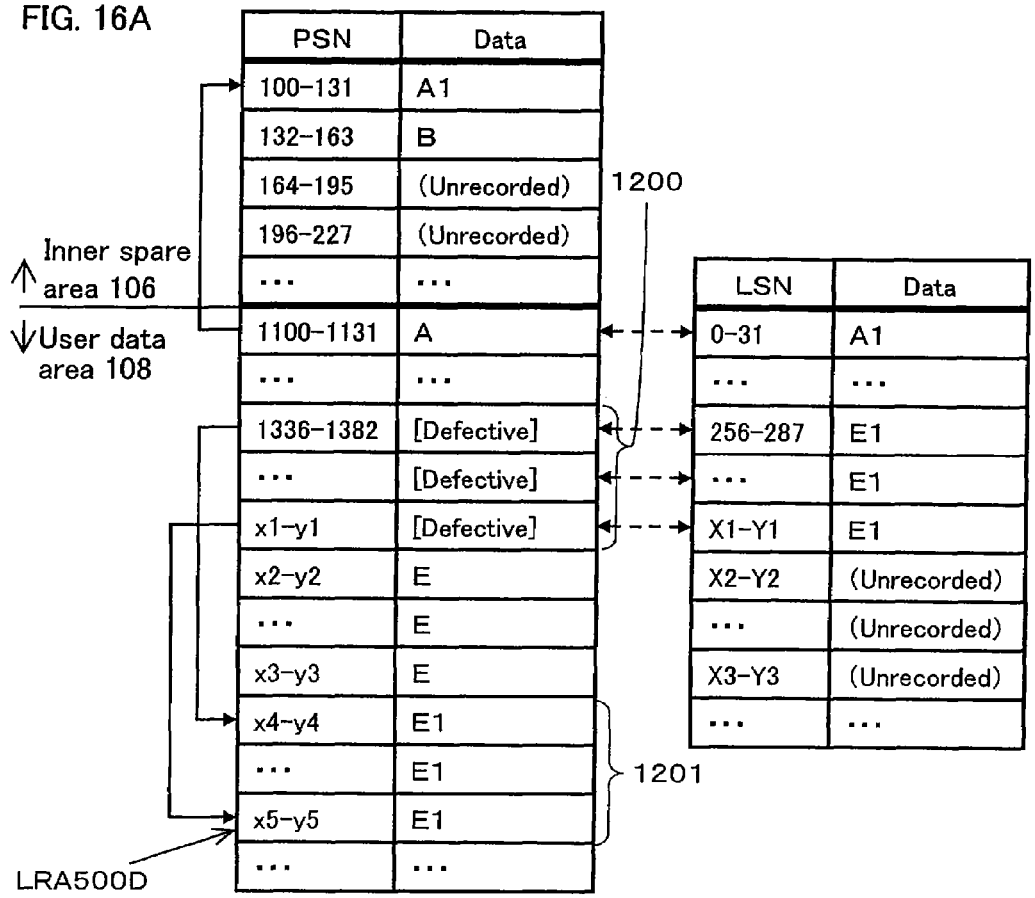
FIG. 16A is an illustrative diagram showing a replacement recording according to an embodiment of the present invention.
FIG. 16B is an illustrative diagram showing a replacement management information according to an embodiment of the present invention.

In the state shown in FIGS. 16A and 16B, the host apparatus 305 instructs to record data "E1" at a location of LSN=256~X1. Then, the data "E1" is recorded at a location of PSN=x4~x5, which are an recorded area in the state shown in FIG. 15A.

The replacement management information 516A is generated as information indicating a start point of the replacement recording. The replacement management information 517A is generated as information indicating an end point of the replacement recording.

At this time, the replacement management information 516 and 517 become unnecessary. Accordingly, the replacement management information 516 and 517 are deleted from the replacement management information list 1000.

In the examples shown in FIGS. 15A and 16A, all of data are recorded in the user data area 108 as a result of the replacement recording. However, it is possible to record these data in the inner spare area 106. In this case, the replacement management information (2) and (3) are used.

As described in reference with FIG. 8A, the updated replacement management information list is recorded in the disc management information area.

1-7. Procedure of Reproduction Process (2)

In order to reproduce the recorded data, the following reproduction process is performed.

Prior to performing a reproduction process, the drive control section 311 performs a preparation process for the data reproduction. Such a preparation process for the data reproduction is performed, for example, in a manner similar to step S201 described above.

For example, in the state shown in FIG. 13A, the host apparatus 305 outputs a reproduction instruction to the drive apparatus 310 to reproduce data "B" at a location of LSN=32. The drive apparatus 310 translates the location of LSN=32 into a location of PSN=1132 in accordance with the primary logical address-physical address mapping.

The drive apparatus 310 retrieves the replacement management information having a location of PSN=1132 as an original location in the latest replacement management information list 1000.

In this case, the replacement management information 512 is found, the drive apparatus 310 obtains a location of PSN=132 as a replacement location.

The drive apparatus 310 reproduces data "B" from the location of PSN=132 and sends the reproduced data back to the host apparatus 305.

Even if the LSN specified by the host apparatus 305 is changed, the drive apparatus 310 performs the same reproduction process. Specifically, the drive apparatus 310 translates the received LSN into a PSN in accordance with the primary logical address-physical address mapping, and determines whether or not the replacement management information corresponding to the PSN is found in the replacement management information list 1000. If it is found, then the data is reproduced from the replacement cluster. If it is not found, then the data is reproduced from the PSN.

As described above, it is possible to use the user data area 108 as an area for a replacement location without any loss in the pseudo-overwrite recording for the information recording medium 100.

1-8. Procedure of Recording Process (3)

FIG. 18 shows a data structure of a DFL entry 2010. The DFL entry 2010 is a different embodiment of the replacement management information 1010 and the replacement management information 1010B described above.

The DFL entry 2010 includes status 1 2011A, status 2 2011B, a defective cluster first PSN 2012 and a replacement cluster leading PSN 2013. The status 1 2011A and the status 2 2011B correspond to the status information 1011 described above. The defective cluster first PSN 2012 corresponds to the original location information 1012 described above. The replacement cluster first PSN 2013 corresponds to the replacement location information 1013 described above.

Herein, similar to the explanation with reference to FIG. 5B, the defective cluster first PNS 2012 and the replacement cluster first PSN 2013 may be represented by a physical address (e.g. PSN) of the first sector in the corresponding ECC cluster. This is because a mapping is performed as a unit of ECC cluster in the defective management and the pseudo-overwrite recording.

The status 1 2011A includes at least information corresponding to Flag1 and Flag2 in the replacement management information 1010B. For example, when the status 1 2011A has a value of "1000", it is determined that there is no replacement cluster for the replacement information. This corresponds to a case where Flag2=0 and there is no replacement cluster. In this case, a value of "0" is set to the replacement cluster first PSN 2013.

On the other hand, when there exists a replacement cluster, a value of "0000" is set to the status 1 2011A. This corresponds to a case where Flag2=0 and there is a replacement cluster.

The status 2 2011B includes at least information corresponding to Flag3 in the replacement management information 1010B. For example, when the status 2 2011B has a value of "0000", it is determined that the replacement information corresponds to a single cluster. This corresponds to a case where Flag3=00.

When the status 2 2011B has a value of "0001", it is determined that the replacement information corresponds to a location of the first sector of a start cluster of a contiguous range including a plurality of clusters. This corresponds to a case where Flag3=01. When the status 2 2011B has a value of "0010", it is determined that the replacement information corresponds to a location of the last sector of an end cluster of a contiguous range including a plurality of clusters. This corresponds to a case where Flag3=10.

The DFL entry 2010 can be applied to all embodiments.

With reference to the data structure of the DFL entry 2010 shown in FIG. 18 and the flowchart shown in FIG. 19A, an exemplary process for the replacement management information in step S113 of FIG. 8A will be described in detail.

Herein, it is assumed that the replacement recording for the pseudo-overwrite recording is performed in step S112 shown in FIG. 8A and then the process proceeds to step S113.

(Step S301) It is determined whether the pseudo-overwrite recording is a first time replacement recording or a second time or more replacement recording.

This determination is performed, for example, by retrieving a DFL entry 2010 having a value of the first PSN of the ECC cluster including the physical address corresponding to the logical address included in the recording instruction as a value of the defective cluster first PSN 2012 in the latest replacement management information list. The physical address corresponding to the logical address included in the recording instruction is obtained in step S103 shown in FIG. 8A.

This latest replacement management information list is reproduced from the disc management information area and is stored in the memory circuit 312 in step S101 (FIG. 8A), for example.

When the corresponding replacement management information (e.g. the DFL entry 2010) is not found in the replacement management information list, it is determined that the pseudo-overwrite recording is a first time replacement recording. As a result, the process proceeds to step S302.

When the corresponding replacement management information is found in the replacement management information list, it is determined that the pseudo-overwrite recording is a second time or more replacement recording. As a result, the process proceeds to step S304.

Whether the pseudo-overwrite recording is a first time replacement recording or a second time or more replacement recording may be predetermined in another step. For example, it may be predetermined in step S106. The determination result in step S106 may be held and may be used in step S301.

(Step S302) The first time replacement recording is performed as follows.

The drive control section 311 creates a new DFL entry 2010 and stores it in the memory circuit 312.

(Step S303) The drive control section 311 sets values to the DFL entry 2010.

An appropriate value is set to the status 1 2011A of the DFL entry 2010. For example, when the replacement recording is performed with the replacement cluster, the value of "0000" is set to the status 1 2011A of the DFL entry 2010.

A value of a first PSN of the ECC cluster located at the physical address corresponding to the logical address included in the recording instruction is set to the defective cluster first PSN 2012 of the DFL entry 2010.

A value of a first PSN of the replacement cluster in which the data is actually recorded in the replacement recording is set to the replacement cluster first PSN 2013 of the DFL entry 2010.

An appropriate value is set to the status 2 2011B of the DFL entry 2010. For example, when the replacement recording is performed for the single cluster, the value of "0000" is set to the status 2 2011B of the DFL entry 2010.

(Step S304) The second time or more replacement recording is performed as follows.

The process proceeds to step S305 in order to update the DFL entry 2010 which has been found in step S301.

(Step S305) The status 1 2011A of the DFL entry 2010 is updated to an appropriate value. For example, when the replacement recording is performed and there exists a replacement cluster, the value of "0000" is set to the status 1 2011A of the DFL entry 2010.

The replacement cluster first PSN 2013 of the DFL entry 2010 is updated to a value of a first PSN of the replacement cluster in which the data is actually recorded in the replacement recording. That is, the location of a new replacement cluster is set.

It is not necessary to update the defective cluster first PSN 2012 of the DFL entry 2010, since the second time or more replacement recording is performed for the same ECC cluster. The defective cluster first PSN 2012 of the DFL entry 2010 maintains the same value.

The status 2 2011B of the DFL entry 2010 is updated to an appropriate value. For example, when the replacement recording is performed for the single cluster, the value of "0000" is set to the status 2 2011B of the DFL entry 2010.

(Step S306) According to the process mentioned above, the replacement management information list is updated. That is, a new DFL entry 2010 is added to the replacement management information list or the existing DFL entry 2010 in the replacement management information list is updated.

Then, the replacement management information list is sorted. For example, the replacement management information list is sorted by the status 1 2011A. Further, the replacement management information list is sorted by the defective cluster first PSN 2012, the status 2 2011B and the replacement cluster first PSN 2013, in this order.

The process of step S113 shown in FIG. 8A is terminated. The latest replacement management information list obtained in the process is additionally recorded in the (temporary) disc management information area.

In the exemplary process, a case is described where the replacement recording for the pseudo-overwrite recording is performed. However, the process can be also applied to the replacement recording due to the occurrence of the defective cluster.

Figure 33A:
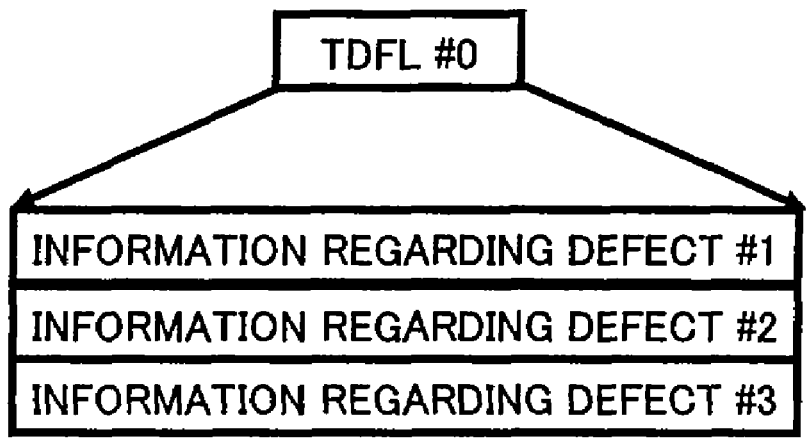
FIG. 33A is an illustrative diagram showing an exemplary data structure of the TDFL according to the conventional technique.
Figure 33B:
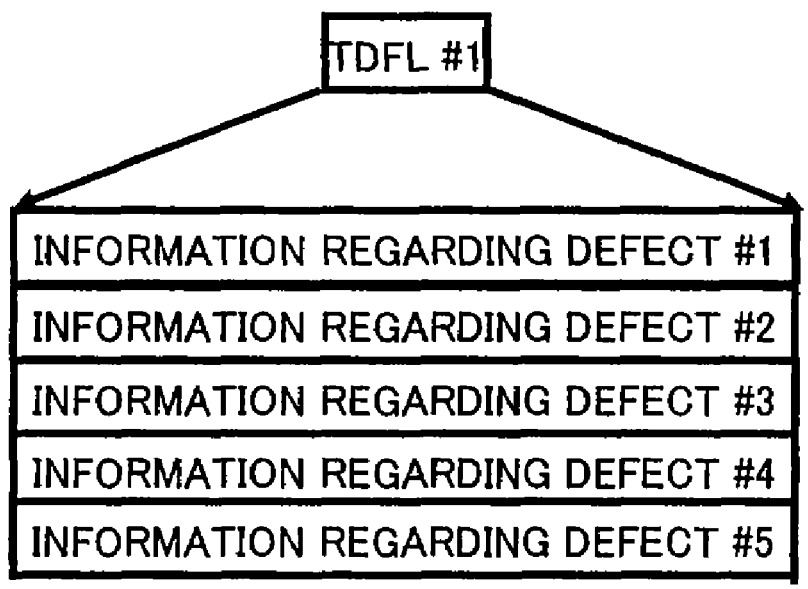
FIG. 33B is an illustrative diagram showing an exemplary data structure of the TDFL according to the conventional technique.

As described in the background art with reference to FIGS. 33A and 33B, in the conventional defective management for the write-once optical discs, new replacement management information is added to the replacement management information list each time the replacement recording is performed, while maintaining the existing replacement management information in the replacement management information list.

When such a method is applied to a recording method in which the user data area is used as an area for recording a replacement cluster as described in the present embodiment, the number of the replacement management information is increased each time the replacement recording is performed, and the size of the replacement management information list is increased each time the replacement recording is performed. This is not preferable in implementing the drive apparatus and the like.

In particular, in the conventional defective management for the write-once optical discs, the cluster which has been replaced with another cluster is not further replaced. However, in the pseudo-overwrite recording as described in the present embodiment, it is possible to further replace the cluster which has been replaced with another cluster. Accordingly, there is a possibility that the size of the replacement management information list is much increased.

Further, it is possible that there exists a plurality of replacement management information in the replacement management information list, wherein each of the plurality of replacement management information has the same value as the defective cluster first PSN 2012. Accordingly, an additional process and/or structure are required to obtain the latest replacement management information.

In the defective management for the rewritable optical discs, the replacement management information is provided for every replacement cluster, regardless of whether or not the replacement cluster is actually used.

When such a method is applied to a recording method in which the user data area is used as an area for recording a replacement cluster as described in the present embodiment, a large amount of replacement management information is required from an initial state. This is not preferable in implementing the drive apparatus and the like.

Figure 19A:
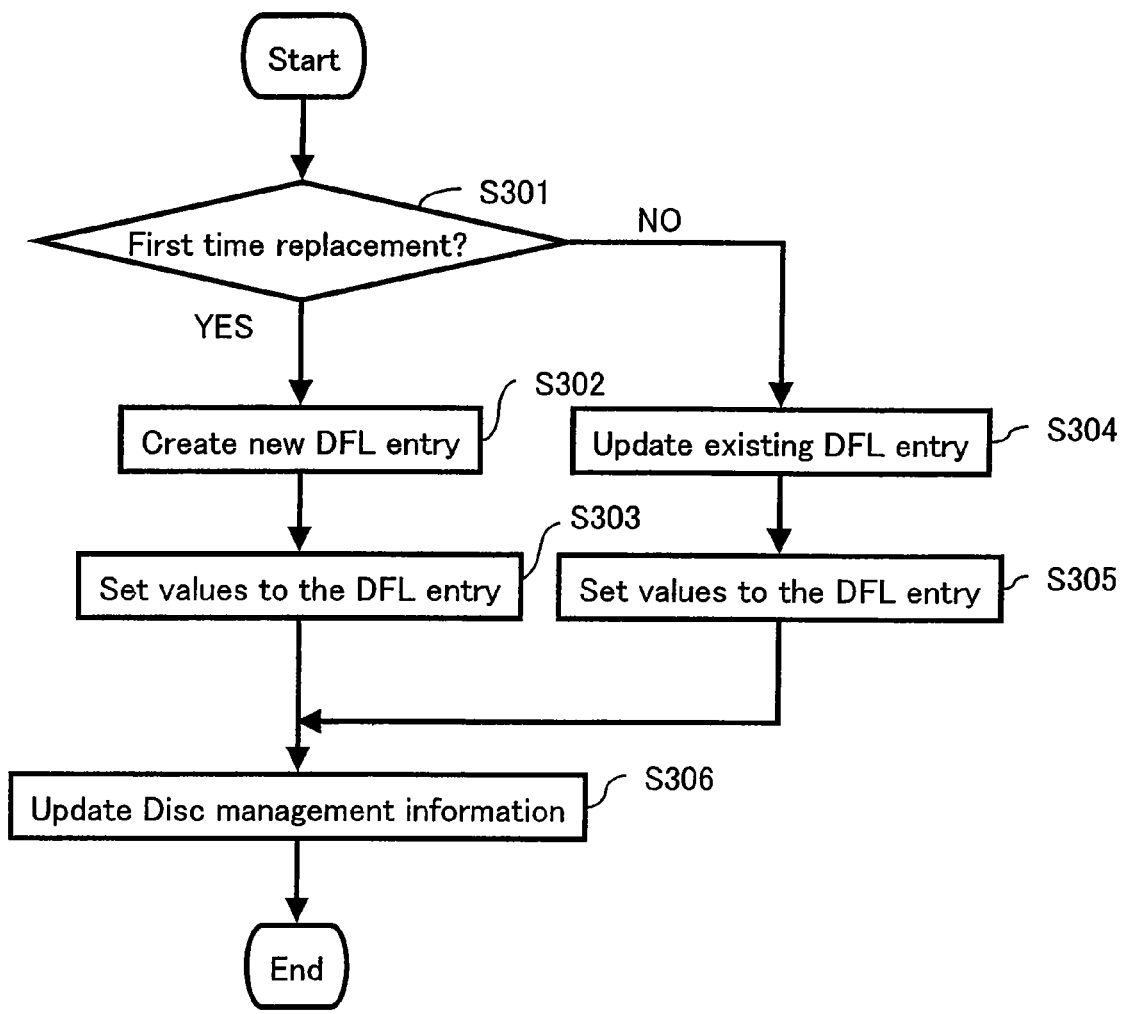
FIG. 19A is a flowchart showing a recording process according to an embodiment of the present invention.

According to the method shown in FIG. 19A, it is sufficient to generate and manage the minimum number of replacement management information. It is possible to easily find the latest replacement management information.

1-9. Procedure of Recording Process (4)

Figure 19B:
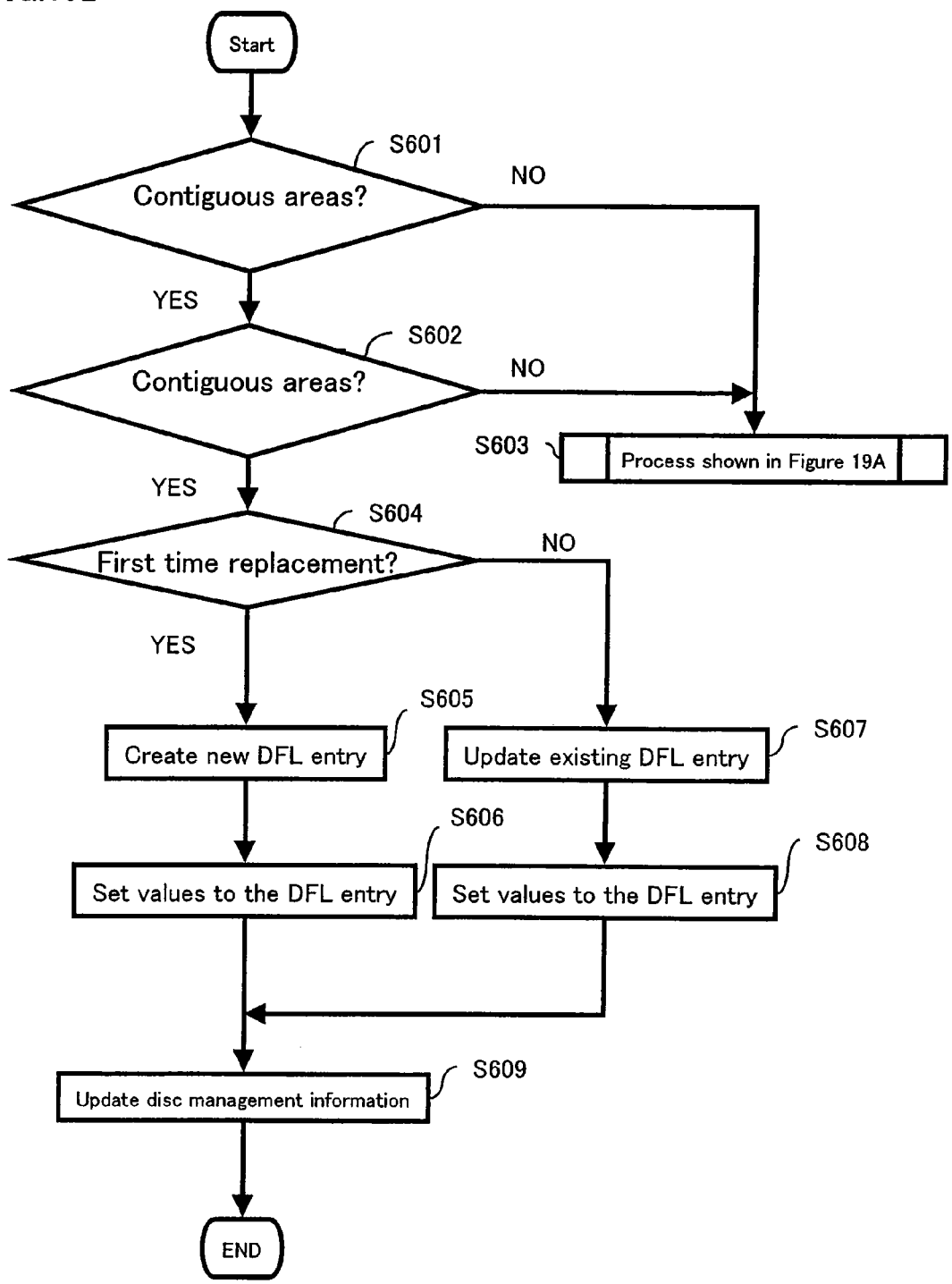
FIG. 19B is a flowchart showing a recording process according to an embodiment of the present invention.

With reference, to FIG. 19B, an exemplary process of the replacement management information in the procedure of the recording process will be described in more detail.

The respective steps shown in FIG. 19B are included in step S113 shown in FIG. 8A. The following description refers to a data structure of the DFL entry 2010 which is an example of the replacement management information shown in FIG. 18.

Herein, it is assumed that the replacement recording for the pseudo-overwrite recording is performed in step S112 shown in FIG. 8A and then the process proceeds to step S113.

(Step S601) The drive control section 311 determines whether or not the area specified by the recording instruction is a contiguous range in the physical address space.

For example, the drive control section 311 determines the size of the area on the physical address space based on the recording location specified by the recording instruction and the size of the data to be recorded specified by the recording instruction. When the size of the area on the physical address space which is thus determined is greater than the size of one ECC cluster, the drive control section 311 determines that the area specified by the recording instruction is a contiguous range in the physical address space.

If the determination result in step S601 is "Yes", then the process proceeds to step S602. If the determination result in step S601 is "No", then the process proceeds to step S603.

(Step S602) The drive control section 311 determines whether or not the area in which the data is actually recorded in step S112 is a contiguous range in the physical address space.

For example, the size of the area in which the data is actually recorded in step S112 is equal to the size of the area specified by the recording instruction, the drive control section 311 determines that the area in which the data is actually recorded in step S112 is a contiguous range in the physical address space.

If the determination result in step S602 is "Yes", then the process proceeds to step S604. If the determination result in step S602 is "No", then the process proceeds to step S603.

(Step S603) The drive control section 311 performs the process described with reference to FIG. 19A, for example.

(Step S604) The drive control section 311 determines whether the pseudo-overwrite recording is a first time replacement recording or a second time or replacement recording.

Such a determination is performed, for example, by retrieving the latest replacement management information list to determine whether or not a first DFL entry 2010 (status 2 2011B="0001") and a second DFL entry 2010 (status 2 2011B ="0010"), each of which having original location information indicating the same area as the contiguous range determined in step S601, are found in the replacement management information list.

When the first DFL entry 2010 and the second DFL entry 2010 are not found in the replacement management information list, it is determined that the pseudo-overwrite recording is a first time replacement recording. As a result, the process proceeds to step S605.

When the first DFL entry 2010 and the second DFL entry 2010 are found in the replacement management information list, it is determined that the pseudo-overwrite recording is a second time or more replacement recording. As a result, the process proceeds to step S607.

(Step S605) The drive control section 311 creates new first DFL entry 2010 and a new second DFL entry 2010 and stores them in the memory circuit 312.

(Step S606) The drive control section 311 sets values to the first DFL entry 2010 and the second DFL entry 2010.

A value of "0000" indicating that the replacement recording is performed and there exists a replacement cluster is set to the status 1 2011A of the first DFL entry 2010.

A value of a first PSN of the ECC cluster including a start location of the area specified by the recording instruction is set to the defective cluster first PSN 2012 of the first DFL entry 2010.

A value of a first PSN of the ECC cluster including a start location of the contiguous range in which the data is actually recorded is set to the replacement cluster first PSN 2013 of the first DFL entry 2010.

A value of "0001" indicating a start location of the contiguous range is set to the status 2 2011B of the first DFL entry 2010.

A value of "0000" indicating that the replacement recording is performed and there exists a replacement cluster is set to the status 1 2011A of the second DFL entry 2010.

A value of a first PSN of the ECC cluster including an end location of the area specified by the recording instruction is set to the defective cluster first PSN 2012 of the second DFL entry 2010. The end location of the area specified by the recording instruction is calculated, for example, by the physical address corresponding to the logical address and the length of the data to be recorded, which are specified by the recording instruction.

A value of a first PSN of the ECC cluster including an end location of the contiguous range in which the data is actually recorded is set to the replacement cluster first PSN 2013 of the second DFL entry 2010.

A value of "0010" indicating an end location of the contiguous range is set to the status 2 2011B of the second DFL entry 2010.

(Step S607) The drive control section 311 performs an update process for the first DFL entry 2010 and the second DFL entry 2010 found in step S604. Specifically, the update process is performed by setting values to the first DFL entry 2010 and the second DFL entry 2010 in step S608.

(Step S608) The drive control section 311 sets values to the first DFL entry 2010 and the second DFL entry 2010.

A value of a first PSN of the ECC cluster including a start location of the contiguous range in which the data is actually recorded is set to the replacement cluster first PSN 2013 of the first DFL entry 2010. That is, the start location of a new replacement range is set.

It is not necessary to update the defective cluster first PSN 2012 of the first DFL entry 2010, since the second time or more replacement recording is performed for the same ECC cluster. The defective cluster first PSN 2012 of the first DFL entry 2010 maintains the same value.

A value of a first PSN of the ECC cluster including an end location of the contiguous range in which the data is actually recorded is set to the replacement cluster first PSN 2013 of the second DFL entry 2010. That is, the end location of a new replacement range is set.

It is not necessary to update the defective cluster first PSN 2012 of the second DFL entry 2010, since the second time or more replacement recording is performed for the same ECC cluster. The defective cluster first PSN 2012 of the second DFL entry 2010 maintains the same value.

(Step S609) According to the process mentioned above, the replacement management information list is updated. That is, a new first DFL entry 2010 and a new second DFL entry 2010 are added to the replacement management information list or the existing first DFL entry 2010 and the existing second DFL entry 2010 in the replacement management information list are updated.

Then, the replacement management information list is sorted. For example, the replacement management information list is sorted by the status 1 2011A. Further, the replacement management information list may be sorted by the defective cluster first PSN 2012, the status 2 2011B and the replacement cluster first PSN 2013, in this order.

The process of step S113 shown in FIG. 8A is terminated. The latest replacement management information list obtained in the process is additionally recorded in the (temporary) disc management information area.

In the exemplary process, a case is described where the replacement recording for the pseudo-overwrite recording is performed. However, the process can be also applied to the replacement recording due to the occurrence of the defective cluster.

With reference to FIGS. 20A to 24B, the procedure of the data recording will be further described.

FIG. 20A shows a physical address space and a logical address space on the information recording medium 100, which is similar to FIG. 13A and the like. FIG. 20A shows a state in which data "A0" is recorded at the location of LSN=0 immediately after the formatting process. In the physical space, data "A0" is recorded in the location of PSN=1000.

The location of LSN=0 and the location of PSN=1000 maintain the relationship of the primary logical address-physical address mapping.

FIG. 20B shows a replacement management information list corresponding to FIG. 20A. The replacement management information list includes header information 1001 only and does not include any replacement management information.

In the state shown in FIG. 20A, it is assumed that the drive apparatus 310 is instructed by the host apparatus 305 to record data "A1" at the location of LSN=0.

FIG. 21A shows a state in which the recording of data "A1" is completed.

As shown in FIG. 21A, data "A1" is recorded at the location of PSN=1132 in the user data area 108 instead of the location of PSN=1000 in the user data area 108, for example. This is because the data has been already recorded at the location of PSN=1000.

This replacement recording is a first time replacement recording. Accordingly, in accordance with step S302 and the subsequent steps shown in FIG. 19A, the process for the first time replacement recording is performed. As a result, the DFL entry 2100A shown in FIG. 21B is added to the replacement management information list.

Next, in the state shown in FIG. 21A, it is assumed that the drive apparatus 310 is instructed by the host apparatus 305 to record data "A2" at the location of LSN=0.

FIG. 22A shows a state in which the recording of data "A2" is completed.

As shown in FIG. 22A, data "A2" is recorded at the location of PSN=1164 in the user data area 108 instead of the location of PSN=1000 in the user data area 108, for example. This is because the data has been already recorded at the location of PSN=1000.

This replacement recording is a second time or more replacement recording. Accordingly, in accordance with step S304 and the subsequent steps shown in FIG. 19A, the process for the second time or more replacement recording is performed. As a result, the DFL entry 2100A is updated to the DFL entry 2100B shown in FIG. 22B. That is, any DFL entry is not added to the replacement management information list.

Next, in the state shown in FIG. 22A, it is assumed that the drive apparatus 310 is instructed by the host apparatus 305 to record data "B0" at the location of LSN=96 and to record data "C0" at the location of LSNs=128 to 192.

FIG. 23A shows a state in which the recording of data "B0" and data "C0" is completed.

As shown in FIG. 23A, it is assumed that an error occurs during the verify process for verifying the recording of data "B0" at the location of PSN=1192.

In this case, data "B0" is recorded at the location of PSN=x10 in the outer spare area 107 instead of the location of PSN=1193 in the user data area 108, for example.

This replacement recording is a first time replacement recording. Accordingly, in accordance with step S302 and the subsequent steps shown in FIG. 19A, the process for the first time replacement recording is performed. As a result, the DFL entry 2101A shown in FIG. 23B is added to the replacement management information list.

It is assumed that the verify process for verifying the recording of data "C0" has been successfully completed. In this case, the replacement management information list is maintained without any change.

Next, in the state shown in FIG. 23A, it is assumed that the drive apparatus 310 is instructed by the host apparatus 305 to record data "C1" at the location of LSNs=128 to 192.

Figures 24A, 24B:
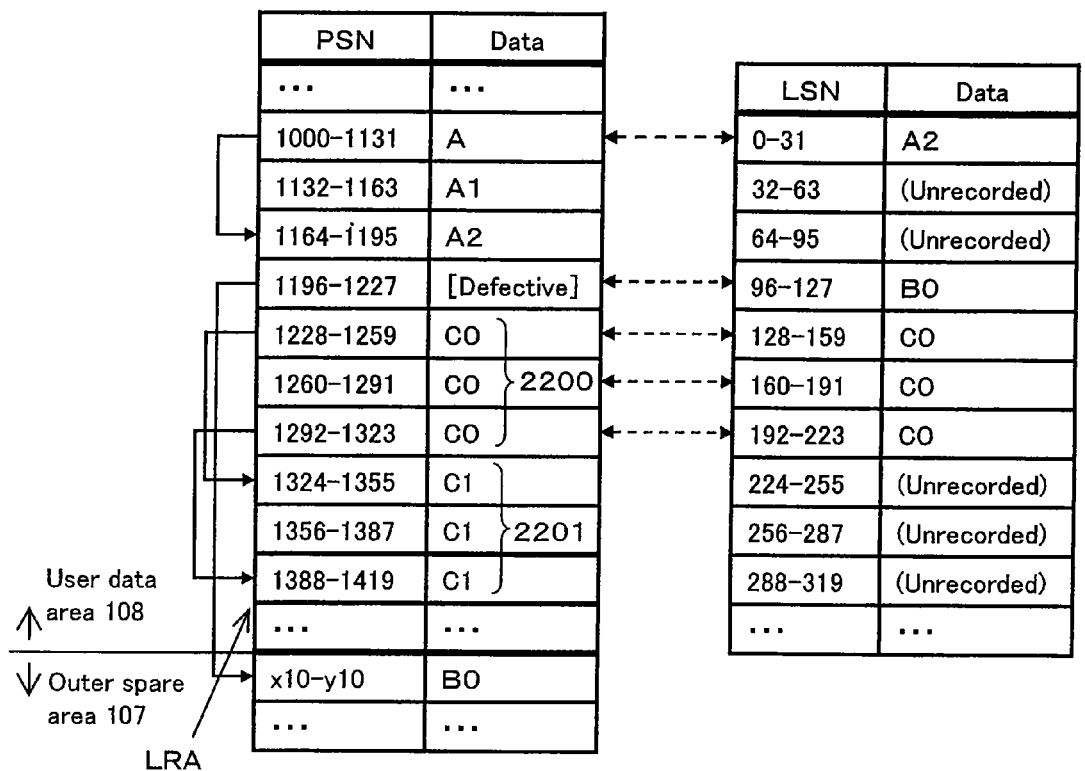
FIG. 24A is an illustrative diagram showing a replacement recording according to an embodiment of the present invention.
FIG. 24B is an illustrative diagram showing a replacement management information according to an embodiment of the present invention.

FIG. 24A shows a state in which the recording of data "C1" is completed.

As shown in FIG. 24A, data "C1" is recorded at the location of PSNs=1324 to 1388 in the user data area 108 instead of the location of PSNs=1288 to 1292 in the user data area 108, for example. This is because the data has been already recorded at the location of PSNs=1288 to 1292.

This replacement recording is a first time replacement recording. Accordingly, in accordance with step S302 and the subsequent steps shown in FIG. 19A, the process for the first time replacement recording is performed. As a result, the DFL entry 2102A and the DFL entry 2103A shown in FIG. 24B are added to the replacement management information list.

This replacement recording is based on a replacement of the contiguous range 2200 (PSNs=1228 to 1292) with the contiguous range 2201 (PSNs=1324 to 1388). The replacement is represented using the DFL entry 2012A indicating start location of the replacement range and the DFL entry 2103A indicating end location of the replacement range.

Thus, in the pseudo-overwrite recording which replaces the contiguous range 2200 with the contiguous range 2201 in the user data area 108, the drive apparatus 310 generates a first replacement management information (DFL entry 2102A) for mapping the start location of the contiguous range 2200 to the start location of the contiguous range 2201 and a second replacement management information (DFL entry 2103A) for mapping the end location of the contiguous range 2200 to the end location of the contiguous range 2201.

Although the replacement recording is performed for the contiguous range including three ECC clusters, only two DFL entries are added to the replacement management information list. This is an effect obtained by using the DFL entry 2102A and the DFL entry 2103A which map the contiguous range 2200 to the contiguous range 2201 in the user data area 108.

Regarding the replacement of the contiguous range, when the pseudo-overwrite recording is a second time or more replacement recording, it is needless to say that the existing DFL entries are updated.

Embodiment 2

2-1. Procedure of NWA Determining Process

Hereinafter, a method for determining a next writable address represented by a logical address (hereinafter, "logical NWA") will be described. The drive device 310 returns the logical NWA back to the host apparatus 305 in response to a request from the host apparatus 305.

The logical NWA is determined in accordance with the following procedure in the present invention.

An ECC cluster which is next to the ECC cluster including the physical sector indicated by the LRA is determined. This ECC cluster is a next writable ECC cluster. The first physical sector of the next writable ECC cluster is a next writable address. The next writable address represented by a physical address is the NWA described above.

The logical NWA has a value which is obtained by translating the value of the PSN indicated by the NWA into a value of the LSN in accordance with the primary logical address-physical address mapping.

Several specific examples will be described below.

In the state shown in FIG. 12, the LRA 500 indicates a leading position of the user data area 108. In this state, the NWA in the physical address space is PSN=1100. The LSN corresponding to PSN=1000 is LSN=0. Therefore, the logical NWA=0.

In FIG. 13A, the host apparatus 305 obtains the logical NWA from the drive apparatus 310 and instructs the drive apparatus 310 to record data "A" at the location of LSN=0.

In the state immediately after the recording of data "A" is completed, the LRA of the track #1 indicates an ECC cluster including the location of PSN=1132. In this state, the NWA is PSN=1132. Accordingly, the logical NWA is LSN=32. The host apparatus 305 can instruct the drive apparatus 310 to record data "B" at the logical NWA (i.e. LSN=32).

In the state immediately after the recording of data "B" is completed, the LRA of the track #1 indicates a physical sector within an ECC cluster including the location of PSN=1132. In this state, the NWA is PSN=1164. Accordingly, the logical NWA is LSN=64.

The feature of the method for determining a logical NWA described above is to determine the logical NWA to maintain the relationship of the primary logical address-physical address mapping. Specifically, the NWA is determined from the LRA within a track and then the logical NWA is obtained in accordance with the primary logical address-physical address mapping. As a result, the replacement management information 1010B is not required for the new data recording.

In FIG. 14A, it is possible that the host apparatus 305 erroneously holds a value corresponding to the LRA 501B as the logical NWA, even through the actual latest logical NWA should correspond to the LRA 500B.

For example, such a state may be caused when the drive apparatus 310 performs a recording operation for recording data at the location after PSN=1292 as an operation independent of the host apparatus 305 and the host apparatus 305 does not obtain the latest logical NWA from the drive apparatus 310.

In this state, when the host apparatus 305 instructs the drive apparatus 310 to record new data, the host apparatus 305 outputs a recording instruction for recording data at the logical NWA corresponding to the LRA 501B. However, the drive apparatus 310 records the data at the location of PSN=1336.

This recording causes a replacement recording. Accordingly, new replacement management information is required.

On the other hand, when the host apparatus 305 instructs the drive apparatus 310 to record new data, after it obtains the logical NWA corresponding to the latest LRA 500B from the drive apparatus 310, the recording does not cause any replacement recording. Accordingly, any new replacement management information is not required.

In FIGS. 15A and 16A, a similar state may be caused. In FIGS. 15A and 16A, it is possible that the host apparatus 305 erroneously holds a value corresponding to the LRA 501C as the logical NWA, even through the actual latest logical NWA should correspond to the LRA 5000 and the LRA 500D.

Therefore, it is desirable that the host apparatus 305 obtains the latest logical NWA before recording a new data.

In summary, when the host apparatus 305 instructs the drive apparatus 310 to record new data, the host apparatus 305 outputs a request to the drive apparatus 310 immediately before step S102 shown in FIG. 8A, for example, in order to obtain the latest logical NWA from the drive apparatus 310. Upon receipt of the request, the drive apparatus 310 determines the logical NWA from the LRA and the NWA in accordance with the process described above and returns the logical NWA back to the host apparatus 305.

Upon receipt of the logical NWA, the host apparatus 305 generates a next recording instruction based on the logical NWA and outputs the next recording instruction to the drive apparatus 310.

By performing the operations described above, the replacement management information 1010B is not required for recording new data. The replacement management information 1010B is required for performing the replacement recording only.

As a result, it is possible to restrict increasing the data amount of the replacement management information list 1000. This provides an effect such as the reduction of the amount of processing in the data recording/reproduction, the reduction of the size of the memory, the reduction of the data size on the information recording medium 100 and the like.

Embodiment 3

3-1. Procedure of Recording Process (1)

A method for determining NWA described in the embodiment 2 causes a state in which a particular LSN is not used.

For example, in FIG. 14A, the logical sector at the location of LSN=96 is a logical sector in which any data has not been recorded when it is seen from the host apparatus 305 or the file system.

Such a logical sector is referred to as an unrecorded logical sector or a unused logical sector, an orphan logical sector and the like.

A logical cluster consisting of the unrecorded logical sectors is referred to as an unrecorded logical cluster. For example, in FIG. 14A, the logical cluster corresponding to the location of LSNs=96 to 127 is an unrecorded logical cluster.

Similarly, in FIG. 15A, the logical sector corresponding to the location of LSN=X2 is an unrecorded logical sector.

As shown in FIG. 14A and the like, the LSNs are assigned to the unrecorded logical sectors in the same manner as other normal logical sectors. Further, it is the feature of the method for determining logical NWA according to the present embodiment that the LSNs of the logical sectors subsequent to the unrecorded logical sector are not changed.

When it is instructed to record data at the unrecorded logical sector, the pseudo-overwrite recording is performed in a similar manner as the embodiments described above. For example, the following process is performed.

Herein, in the state shown in FIG. 14A, it is assumed that it is instructed to record data "F" at the location of LSN=96.

In this case, the drive apparatus 310 translates LSN=96 into PSN=1196 in accordance with the primary logical address-physical address mapping.

By comparing the location of PSN=1196 with the location indicated by the NWA, it is recognized that the data is recorded at the location of PSN=1196.

Then, the pseudo-overwrite recording is performed in a similar manner as the other embodiments described above.

In this case, the drive apparatus 310 records data "F" at the location indicated by the NWA (e.g. the location of PSN=1336) and generates replacement management information 518.

Thus, the data recording is performed for the location of LSN=96. As a result, a logical cluster corresponding to the location of LSN=96 changes from the unrecorded logical cluster to the normal logical cluster.

A logical cluster corresponding to the location of LSNs=256 to 287 associated with the location of PSN=1336 in accordance with the primary logical address-physical address mapping newly becomes an unrecorded cluster.

Figures 17A, 17B:
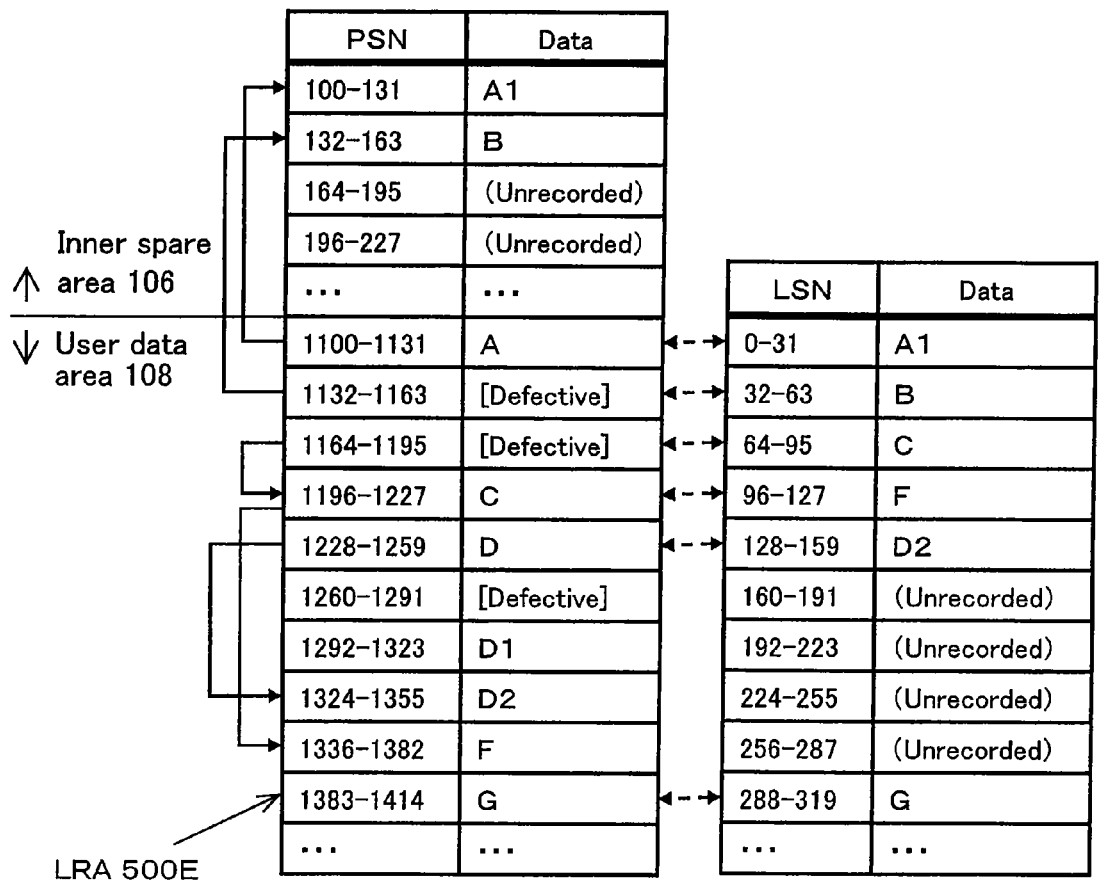
FIG. 17A is an illustrative diagram showing a replacement recording according to an embodiment of the present invention.
FIG. 17B is an illustrative diagram showing a replacement management information according to an embodiment of the present invention.

FIGS. 17A and 17B show a state after the recording of data "G" is completed.

3-2. Procedure of Reproduction Process (1)

In FIG. 14A, the logical cluster at the location of LSN=224 is an unrecorded logical cluster.

The physical cluster corresponding to the unrecorded logical cluster at the location of LSN=223 is a physical cluster at the location of PSN=1324. The relationship between the LSNs and the PSNs are predetermined in accordance with the primary logical address-physical address mapping.

The physical cluster at the location of PSN=1324 is related to the physical cluster at the location of PSN=1228 by the replacement management information 514.

The physical cluster at the location of PSN=1228 is mapped to the logical cluster at the location of LSN=128 in accordance with the primary logical address-physical address mapping.

Thus, the physical cluster at the location of PSN=1228 is assigned to the logical cluster at the location of LSN=128 and the unrecorded logical cluster at the location of LSN=224.

The procedure of the reproduction process will be described in a case where two logical clusters are assigned to one physical cluster.

The host apparatus 305 outputs a reproduction instruction for the location of LSN=128 to the drive apparatus 310. Upon the receipt of the reproduction instruction, the drive apparatus 310 translates the LSN into the PSN in accordance with the primary logical address-physical address mapping. The PSN is referred to as a reproduction PSN.

In this case, the reproduction PSN is PSN=1228. Replacement management information having the location of PSN=1228 as the replacement location is retrieved in the replacement management information list. As a result, the replacement management information 514A is found.

The replacement cluster indicated by the replacement management information 514A is a physical cluster at the location of PSN=1324. The data recorded in the physical cluster at the location of PSN=1324 is reproduced.

The host apparatus 305 outputs a reproduction instruction for the location of LSN=224 to the drive apparatus 310. Upon the receipt of the reproduction instruction, the drive apparatus 310 translates the LSN into the reproduction PSN in accordance with the primary logical address-physical address mapping.

In this case, the reproduction PSN is PSN=1324. Replacement management information having the location of PSN=1324 as the replacement location is retrieved in the replacement management information list. However, such replacement management information is not found.

The drive apparatus 310 reproduces data recorded in the physical cluster at the location of PSN=1324.

According to the reproduction process described above, when the host apparatus 305 outputs a reproduction instruction for the location of an unrecorded logical sector in which any data has not been logically recorded, it is possible to reproduce data recorded in the physical sector corresponding to the unrecorded logical sector.

As a result, it is seen from the file system and the like at the side of the host apparatus 305 that there is no exceptional area on the information recording medium 100. Further, it is not necessary to implement a complex error process in the system structure. It is possible to configure the system with a simplified implementation.

Upon the receipt of a reproduction instruction for an unrecorded logical sector, if the drive apparatus 310 reproduces data recorded in the physical cluster corresponding to the unrecorded logical sector, then the data which should not be essentially reproduced is reproduced. If such a reproduction is inconvenient for the system configuration, it is possible to adopt the following procedure for the reproduction process.

The drive apparatus 310 translates the LSN specified by the reproduction instruction into a PSN in accordance with the primary logical address-physical address mapping, and retrieves the replacement management information 1010B having the original location information 1012 corresponding to the translated PSN in the replacement management information list 1000.

If the replacement management information 1010B having the original location information 1012 corresponding to the translated PSN is found, the data is reproduced from the ECC cluster at the replacement location indicated by the replacement location information 1013 of the replacement management information 1010B in a similar manner as the other embodiments described above.

If it is not found, the drive apparatus 310 retrieves the replacement management information 1010B having the replacement location information 1013 corresponding to the translated PSN in the replacement management information list 1000.

If the replacement management information 1010B having the replacement location information 1013 corresponding to the translated PSN is found, the ECC cluster indicated by the replacement location information 1013 is determined as the replacement cluster in which the data has been already recorded.

Then, the drive apparatus 310 does not reproduce the data from the replacement cluster. Instead, the drive apparatus 310 returns a predetermined data (e.g. data having a value of "00 ... 0.") as the reproduced data back to the host apparatus 305.

According to the reproduction process described above, when it is instructed to reproduce data from the unrecorded logical sector, the data can be reproduced appropriately from the physical sector corresponding to the unrecorded logical sector.

Such a reproduction process can be performed when the drive apparatus 310 receives the reproduction instruction from the host apparatus 305 in each step of the reproduction process described with reference to FIG. 10.

3-3. Comparison Between Procedures of NWA Determining Process

Unlike the embodiment described above, a method for determining a logical NWA will be described. In this method, any unrecorded logical sector does not occur.

In this method, the logical LRA is managed, and a new data is recorded at the logical NWA which is adjacent to the logical LRA.

The LSN indicating the logical NWA is translated into a PSN in accordance with the primary logical address-physical address mapping. The translated PSN is referred to as "PSN-1".

The data is actually recorded at the NWA within an ECC cluster which is next to the ECC cluster including the PSN indicated by the LRA 213. The PSN indicated by the NWA is referred to as "PSN-2".

The replacement recording is performed with the original location of PSN-1 and the replacement location of PSN-2.

Figure 25:
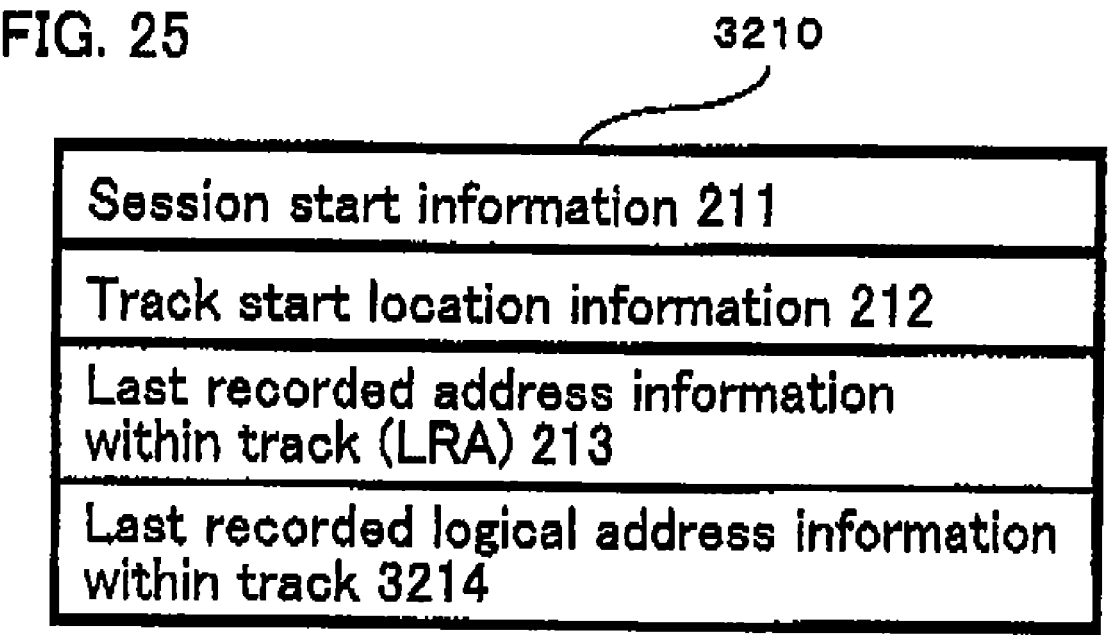
FIG. 25 is an illustrative diagram showing an exemplary data structure of the track management information according to an embodiment of the present invention.

FIG. 25 shows a data structure of the track management information 3210 according to the present embodiment. The track management information 3210 is used to manage the logical NWA.

In the track management information 3210 shown in FIG. 25, last recorded logical address information within track 3214 is newly defined.

The last recorded logical address information within track 3214 is used to manage the last recorded address represented by LSN in the logical address space, whereas the last recorded address information within track (LRA) 213 is used to manage the last recorded address represented by PSN in the physical address space.

The drive apparatus 310 can determine the logical NWA for each track by referring to the last recorded logical address information within track 3214.

The last recorded logical address information within track 3214 is updated in the following manner.

The value of "0" is set to the last recorded logical address information within track 3214 as an initial value. The drive apparatus 310 receives a recording instruction including a LSN. When the LSN in the recording instruction is greater than the last recorded logical address information within track 3214, the drive apparatus 310 updates the last recorded logical address information within track 3214 to the LSN.

According to the update process described above, it is possible to maintain the last recorded logical address information within track 3214 as being a maximum value.

Figure 26:
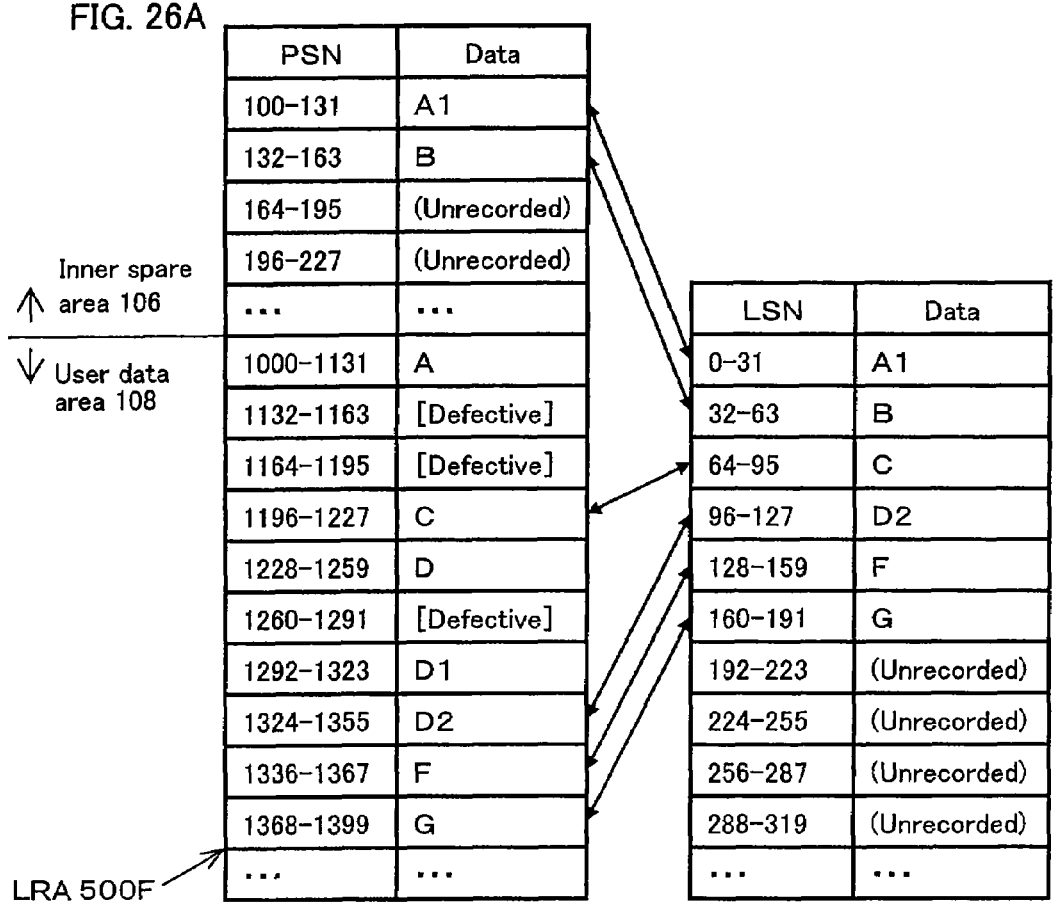
FIG. 26A is an illustrative diagram showing a replacement recording according to an embodiment of the present invention.
FIG. 26B is an illustrative diagram showing a replacement management information according to an embodiment of the present invention.

FIG. 26A shows a data structure after the recording of data "A", "B", "C", "D", "F" and "G" are completed in the same order as in FIGS. 13A, 14A and 17A in accordance with the procedure of NWA determining process described above.

In FIG. 26B, all of defective clusters are registered as the replacement management information (7). However, it is possible to delete these replacement management information (7) from the replacement management information list 1000F. By deleting these, the size of the replacement management information list 1000F can be reduced.

By comparing the replacement management information list 1000E shown in FIG. 17B with the replacement management information list 1000F shown in FIG. 26B, it is understood that the number of the replacement management information in the replacement management information list 1000E is smaller than the number of the replacement management Information in the replacement management information list 1000F.

By comparing these lists after deleting replacement management information (7), it is also understood that the number of the replacement management information in the replacement management information list 1000E is much smaller than the number of the replacement management information in the replacement management information list 1000F.

Accordingly, the method for determining NWA while allowing the occurrence of the unrecorded logical sector as described in embodiment 1 and embodiment 2 is more desirable rather than the method which refers to FIG. 26A while not allowing the occurrence of the unrecorded logical sector in that the size of replacement management information list can be reduced.

By maintaining the replacement management information (7) in the replacement management information list 1000F, it is possible to recognize the distribution of the defective clusters on the information recording medium 100. The distribution of the defective clusters can be used to optimize the reproduction process. Such an optimization is made, for example, by reading data in advance without reading data from the defective sectors.

Embodiment 4

The procedure of the data recording according to the present embodiment will be described.

Figure 27:
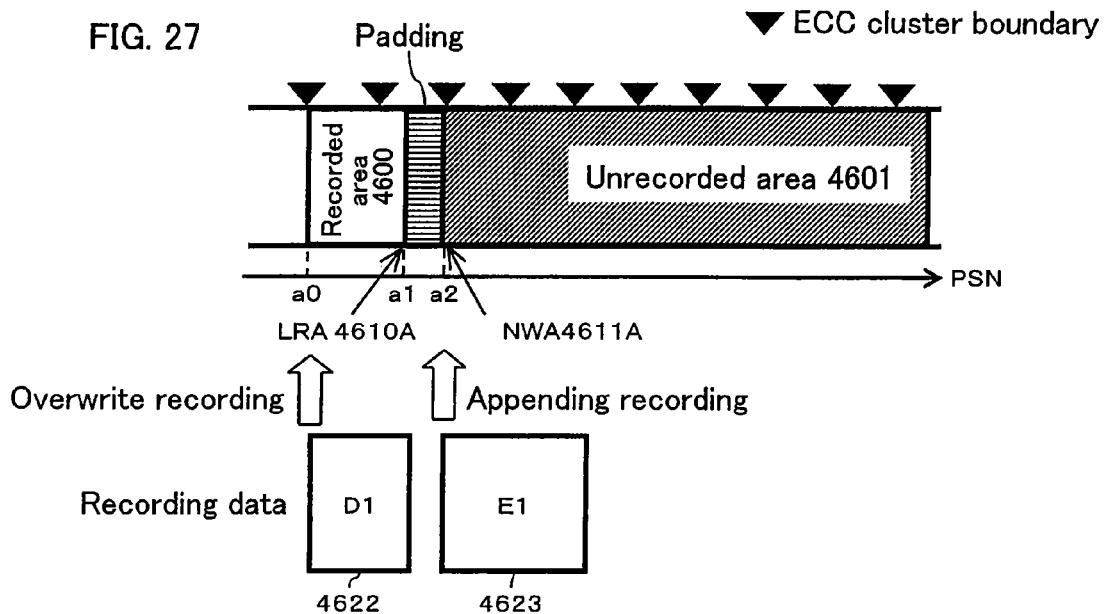
FIG. 27 is an illustrative diagram showing a replacement recording according to an embodiment of the present invention.

FIG. 27 shows an exemplary data structure of the Information recording medium 100 before performing the data recording according to the present embodiment. In FIG. 27, each symbol of triangle indicates a boarder between the ECC clusters. Hereinafter, even in other figures, each symbol of triangle has the same meaning.

In the state shown in FIG. 27, it is assumed that the host apparatus 305 outputs a recording instruction for data "D1" 4622 and data "E1" 4623 to the drive apparatus 310. In this case, the procedure of the recording process will be described.

The data recording for data "D1" 4622 is determined as the pseudo-overwrite recording at the location of PSN=a0 in the recorded area 4600, for example.

Prior to outputting the recording instruction, the host apparatus 305 outputs a request for the logical NWA to the drive apparatus 310.

Upon the receipt of the request for the logical NWA, the drive apparatus 310 determines NWA 4611A from LRA 4610A and returns the logical NWA corresponding to the NWA 4611A back to the host apparatus 305.

The host apparatus 305 outputs a recording instruction for recording data "D1" 4622 at the location of LSN=A0 corresponding to PSN=a0 to the drive apparatus 310, and then outputs a recording instruction for recording data "E1" 4623 at the location of LSN=A2 corresponding to NWA 4611A (PSN=a2) to the drive apparatus 310.

Figure 28:
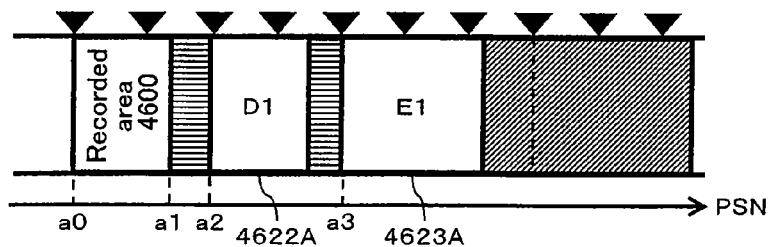
FIG. 28 is an illustrative diagram showing a replacement recording according to an embodiment of the present invention.

FIG. 28 shows a recording result after the drive apparatus 310 performs a recording process for data "D1" 4622 and a recording process for data "E1" 4623 in accordance with the order of the recording instructions as instructed by the host apparatus 305.

In this case, the data recording for data "D1" 4622 is determined as the pseudo-overwrite recording for the recorded area 4600. As a result, data "D1" 4622 is recorded at the location of NWA 4611A (PSN=a2) instead of the location of PSN=a0. Then, the NWA 4611A is updated to the NWA 4611B (PSN=a3).

As a result of this replacement recording, data "D1" 4622 is recorded at the location of PSN=a2. As a result, data "E1" 4623 is recorded at the location of NWA 4611B (PSN=a3) instead of the location of PSN=a2.

Thus, although the host apparatus 305 outputs a recording instruction for recording data "E1" 4623 at the location of LSN=A2 corresponding to NWA 4611A (PSN=a2) as described above, data "E1" 4623 is recorded at the location of PSN=a3 which is deferent from the location as instructed.

In this case, the replacement management information 1010 for data "D1" 4622 is generated, and the replacement management information 1010 for data "E1" 4623 is also generated. This causes a problem that the size of the replacement management information list 1000 is increased.

This problem is caused by the drive apparatus 310 performing the replacement recording which is not expected by the host apparatus 305.

After performing the replacement recording by the drive apparatus 310, it is necessary to perform further replacement recording as the host apparatus 305 outputs a recording instruction. This results in increasing the size of the replacement management information list 1000.

Hereinafter, a method according to the present embodiment will be described. In this method, the replacement management information 1010 for data "E1" 4623 is not generated during the recording process.

In the present embodiment, in the state shown in FIG. 27, the host apparatus 305 first outputs a recording instruction for the appending recording. Then, the host apparatus 305 outputs a recording instruction for the pseudo-overwrite recording after outputting the recording instruction for the appending recording.

Figure 29:
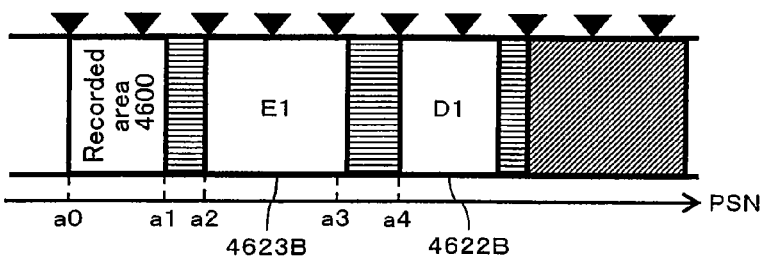
FIG. 29 is an illustrative diagram showing a replacement recording according to an embodiment of the present invention.

FIG. 29 shows a recording result after the drive apparatus 310 performs recording processes in accordance with the order of the recording instructions as instructed by the host apparatus 305.

The file system operating on the host apparatus 305 can determine the order of the recording instructions, since it manages updating all existing files and creating new files.

In FIG. 29, data "E1" 4623B is recorded at the location of NWA 4611A (PSN=a2), and data "D1" 4622B is recorded at the location of PSN=a4.

The host apparatus 305 outputs a recording instruction for recording data "E1" 4623B at the location of NWA 4611A (PSN=a2) as described above. In the present embodiment, data "E1" 4623B is recorded at the location of PSN=a2 which is the same as the location as instructed. This data recording is not a replacement recording.

Thus, the replacement management information 1010 for data "E1" 4623B is not generated. As a result, it is possible to avoid increasing the size of the replacement management information list 1000.

In either case shown in FIG. 28 or the case shown in FIG. 29, the same number of the replacement management information 1010 is required in order to record data "D1" 4622. Although the recording location (i.e. replacement location) of data "D1" 4622 are different from each other in FIGS. 28 and 29, the required number of the replacement management information 1010 is maintained.

As described above, when the host apparatus 305 instructs the drive apparatus 310 to perform both of the pseudo-overwrite recording and the appending recording, the host apparatus 305 outputs a recording instruction for the appending recording to the drive apparatus 310 prior to outputting a recording instruction for the pseudo-overwrite recording to the drive apparatus 310. This makes it possible to avoid generating the replacement management information 1010, thereby reducing the size of the replacement management information list 1000.

Embodiment 5

Herein, it is assumed the host apparatus 305 divides data having a size into a plurality of portions, such that each of the plurality of portions has a size of one ECC cluster. It is also assumed that the host apparatus 305 sequentially outputs a recording instruction for each portion of the data as a recording unit to the drive apparatus 310.

The drive apparatus 310 records the respective portions of the data contiguously. It is assumed that a defective cluster including the recording location is detected, and a cluster which is adjacent to the defective cluster is used as a replacement cluster in order to replace the defective cluster with the replacement cluster.

In this case, the replacement recording is required for each recording unit after the recording location. In the replacement recording, each cluster is replaced by an adjacent cluster which is located in a direction along which the PSNs increase.

In this case, the replacement management information is required for each recording unit. Accordingly, when the size of data to be recorded is very large, the large number of replacement management information is required, thereby increasing the size of the replacement management information list 1000.

Hereinafter, a method according to the present embodiment will be described with reference to FIG. 30. This method is effective to reduce the size of the replacement management information list 1000.

Figure 30:
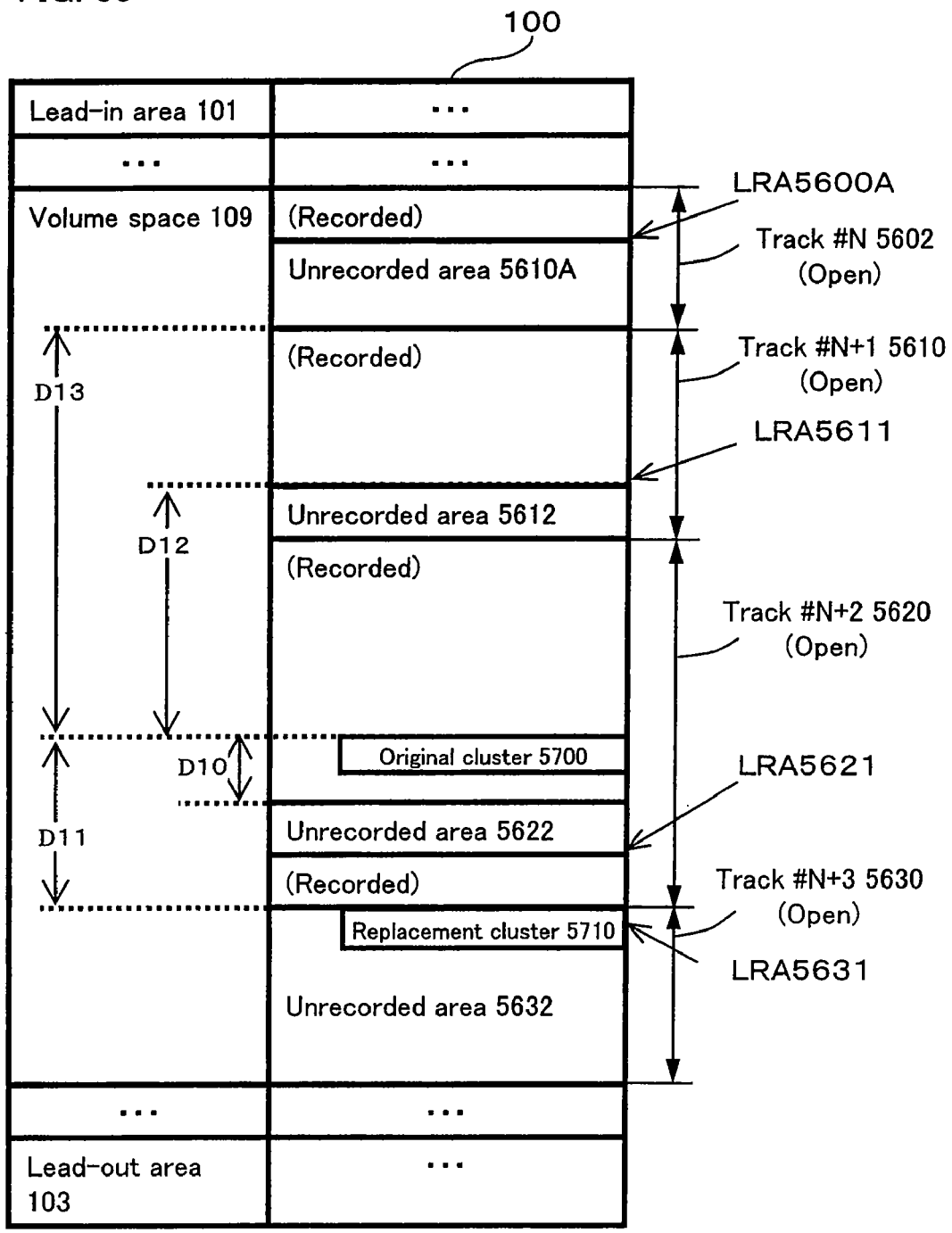
FIG. 30 is an illustrative diagram showing a replacement recording according to an embodiment of the present invention.
Figure 31:
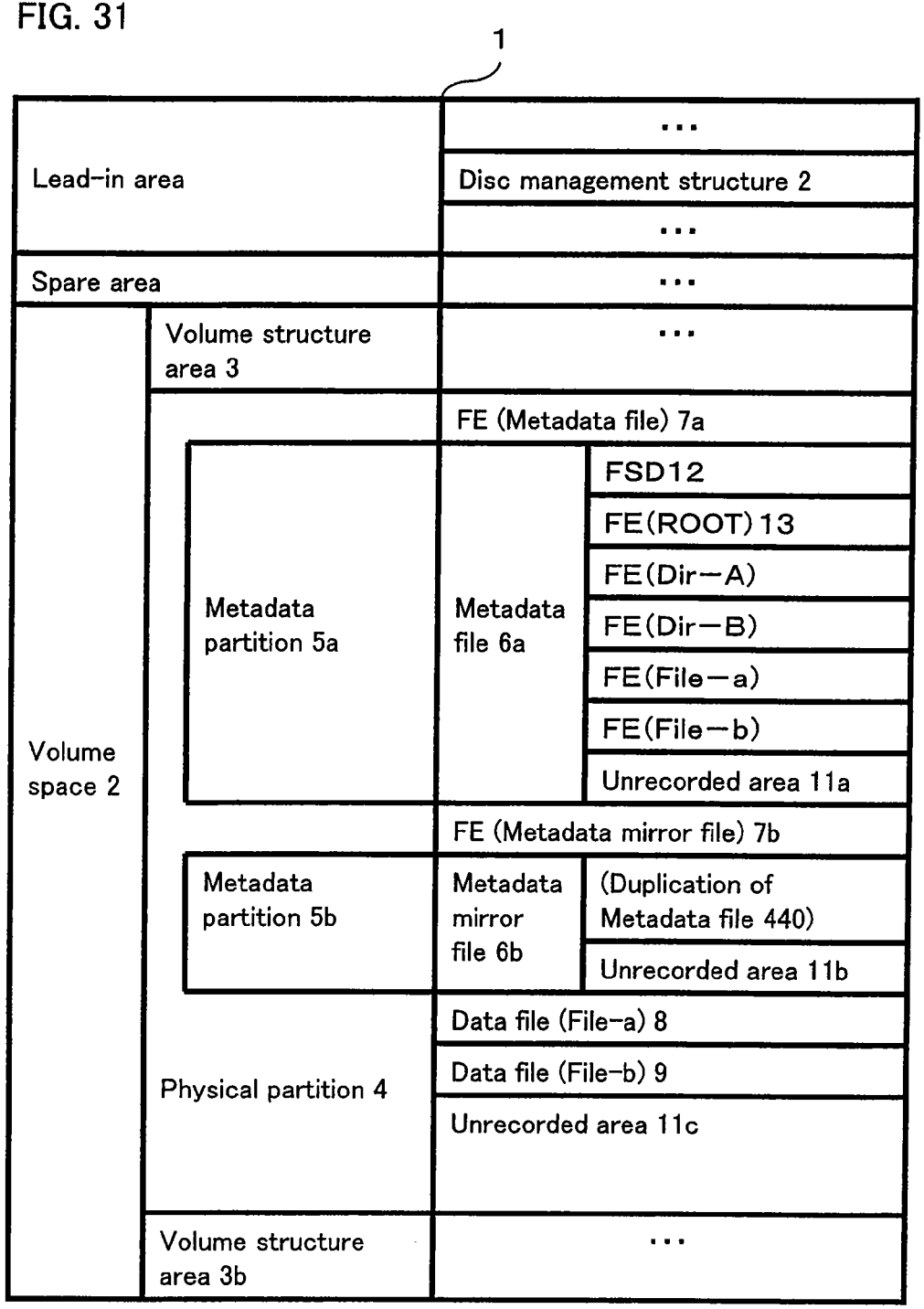
FIG. 31 is an illustrative diagram showing an exemplary data structure of the information recording medium according to the conventional technique.
Figure 32:
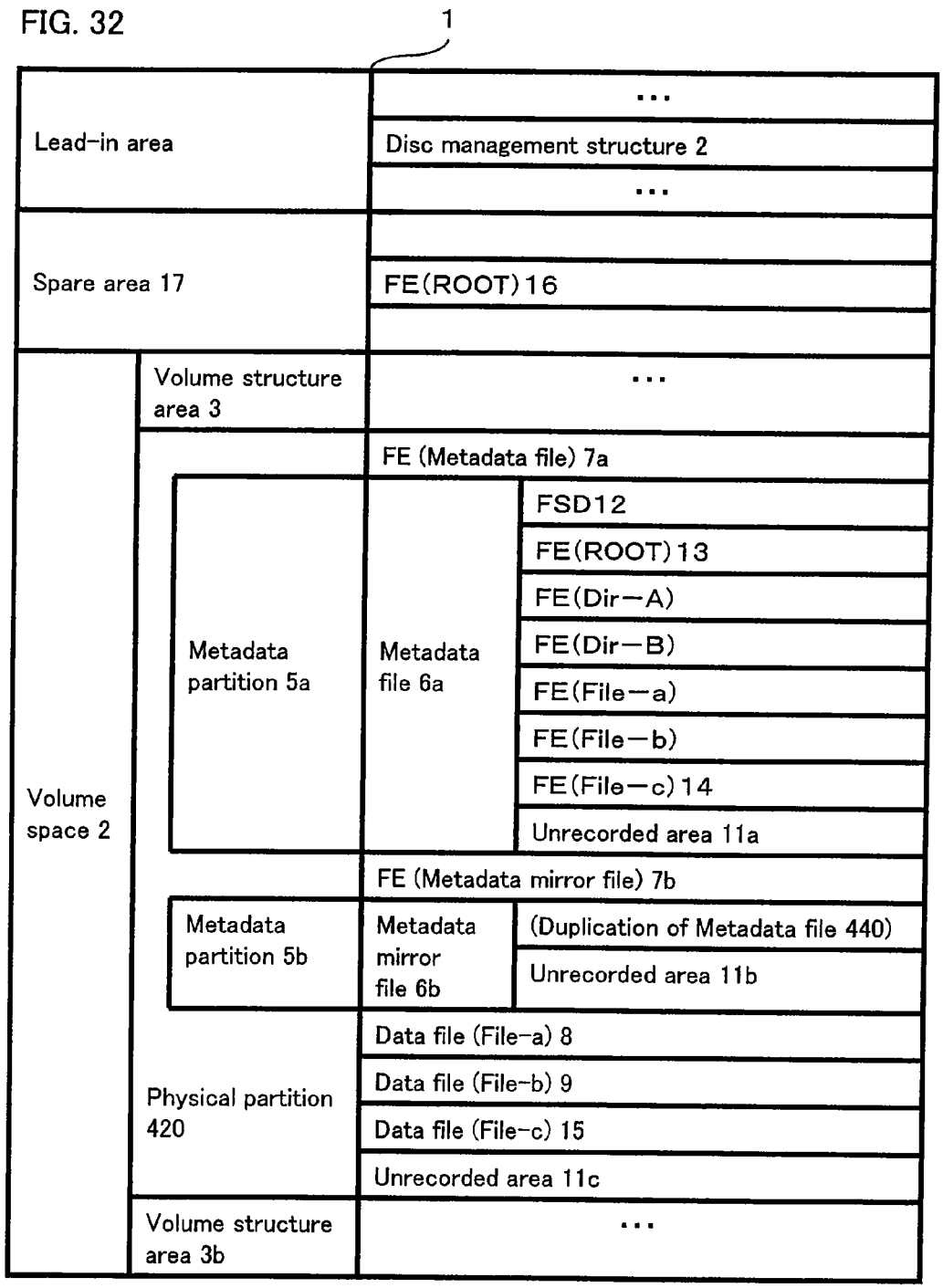
FIG. 32 is an illustrative diagram showing an exemplary data structure of the information recording medium after the file recording process according to the conventional technique.

In FIG. 30, a replacement recording is performed in accordance with the recording instruction from the host apparatus 305. In the replacement recording, it is assumed that the original location is original cluster 5700.

The replacement location of the replacement recording is determined in the following manner.

In FIG. 30, the replacement cluster may be allocated in one of the unrecorded area 5601A (in track #N 5602), the unrecorded area 5612 (in track #N+1 5610), the unrecorded area 5622 (in track #N+2 5620) and the unrecorded area 5632 (in track #N+3 5630). Each of these unrecorded areas is a candidate area for the replacement cluster.

Herein, a distance between the location of the original cluster 5700 (e.g. the location of the first physical sector in the original cluster 5700) and the location of the candidate area for the replacement cluster (e.g. the location of the NWA in the open track) is evaluated. The respective distances with respect to the respective candidate areas for the replacement cluster are D13, D12, D10 and D11, as shown in FIG. 30.

It is assumed that the respective distances satisfy the relationship of D13>D12>D11>D10.

By selecting the unrecorded area 5622 which has a minimum distance D10 as an area for the replacement cluster, it is possible to minimize a distance between the original cluster and the replacement cluster. As a result, it is possible to minimize an access time in the data reproduction.

However, the unrecorded area 5622 is included in the same track #N+2 5620 as the original cluster 5700. Accordingly, when the unrecorded area 5622 is selected as an area for the replacement cluster, it may cause a problem that the size of the replacement management information list 1000 is increased in the case where the drive apparatus 310 sequentially receives a plurality of recording instructions from the host apparatus 305 as described above.

According to the present embodiment, an unrecorded area which has a minimum distance from the original cluster is selected as an area for the replacement cluster. However, during the selection process, an unrecorded area included in the same track as the original cluster is excluded from the selection.

In FIG. 30, the unrecorded area 5622 which has a minimum distance D10 is excluded from the selection. The unrecorded area 5632 which has the next minimum distance D11 is selected as an area for the replacement cluster.

Thus, upon receipt of the recording instruction for the original cluster 5700 from the host apparatus 305, the drive apparatus 310 allocates the replacement cluster 5710 at the location of NWA in the unrecorded area 5632 and records data in the replacement cluster 5710.

The drive apparatus 310 generates the replacement management information which maps the original cluster 5700 to the replacement cluster 5710 and records the replacement management information.

As described in steps S107 and S112 (FIG. 8A), when the drive control section 311 according to the present invention performs the pseudo-overwrite recording, it controls the recording/reproduction section 314 to record data at a specific location in the user data area 108, which is other than the location indicated by the physical address corresponding to the logical address included in the received recording instruction.

In the present embodiment, the specific location is the NWA within an open track which is different from the track determined in step S104 (FIG. 8A).

Further, the NWA within the open track indicates a location which is the closest to the location indicated by the physical address corresponding to the logical address included in the recording instruction.

According to the procedure of the recording process, even if the host apparatus 305 further outputs a recording instruction to the drive apparatus 310, the data recording for the unrecorded area 5622 does not cause any replacement recording. The addition of the replacement management information is not required.

A distance between the original location and the replacement location becomes minimum, except for a case where the original location and the replacement location are included in the same track. As a result, it is possible to reduce an access time in the data reproduction.

The drive apparatus 310 may determine the location of the replacement cluster by evaluating a distance between the original cluster and an unrecorded area which has PSNs greater than the PSNs of the original cluster. In the write-once recording mediums, a sequential recording is performed in a direction along which the PSNs increase. Accordingly, it is possible to efficiently access data by replacing the original cluster with the replacement cluster which has PSNs greater than the PSNs of the original cluster.

In this case, if there is no remaining unrecorded area which has PSNs greater than the PSNs of the original cluster, then the drive apparatus 310 may determine the location of the replacement cluster by evaluating a distance between the original cluster and an unrecorded area which has PSNs smaller than the PSNs of the original cluster.

When there are a plurality of unrecorded areas which have the same distance from the original cluster, it is desirable to select one of the plurality of unrecorded areas, which has PSNs greater than the PSNs of the original cluster. In the write-once recording mediums, a sequential recording is performed in a direction along which the PSNs increase. Accordingly, it is possible to efficiently access data by replacing the original cluster with the replacement cluster which has PSNs greater than the PSNs of the original cluster.

The distance between the original location and the replacement location may be determined from a difference between a PSN indicating the original location and a PSN indicating the replacement location. Alternatively, the distance may be determined from a physical distance between the original location and the replacement location. This is because the difference between the PSNs does not necessarily correspond to the physical distance, since the PSNs increase from the inner side to the outer side in a spiral manner in the information recording medium 100. For example, with respect to ECC clusters which are adjacent to each other in a radius direction, even if the physical distance is close to zero, the difference between the PSNs does not become minimum.

Embodiment 6

In the present embodiment of the invention, a data structure and a method for reproducing data efficiently from the information recording medium 100 will be described. The replacement recording is performed for the information recording medium 100.

Figure 34:
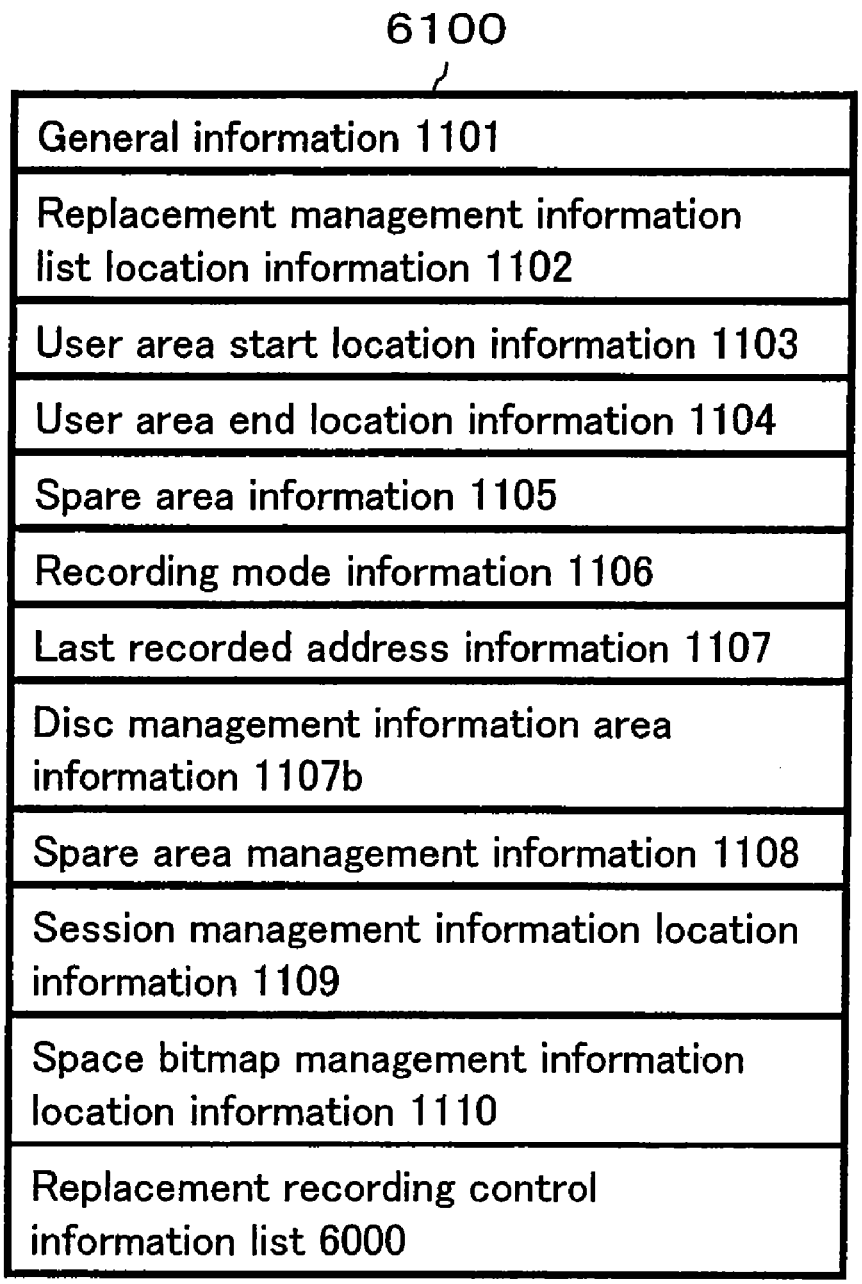
FIG. 34 is an illustrative diagram showing an exemplary data structure of disc structure information 1100 according to an embodiment of the present invention.

FIG. 34 shows a data structure of disc structure information 6100 according to the present embodiment of the invention. The disc structure information 6100 is an alternative example of the disc structure information 1100.

In the disc structure information 6100, replacement recording control information 6000 is newly defined.

Figure 35A:
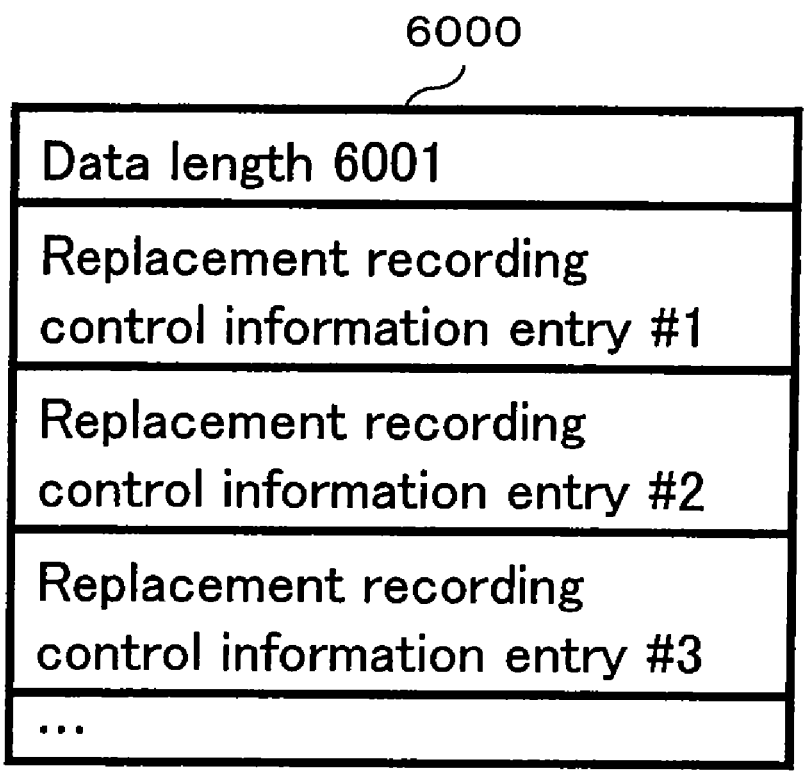
FIG. 35A is an illustrative diagram showing an exemplary data structure of replacement recording control information list according to an embodiment of the present invention.

FIG. 35A shows a data structure of the replacement recording control information 6000. The replacement recording control information 6000 includes a data length 6001 and a replacement recording control information entry #1 and the like.

The data length 6001 indicates a data length of the entire replacement recording control information 6000 or the total number of the replacement recording control information entries included in the replacement recording control information 6000.

Each replacement recording control information entry is related to each track on the information recording medium 100. For example, such a relation is made by conforming the order of the replacement recording control information entries in the list to the track number.

Each replacement recording control information entry includes information indicating whether or not the replacement management information list 1000 must be referred to in order to reproduce a data from a corresponding track.

For example, when there is no physical cluster (or a physical sector) on track #1 which is referred to by the replacement management information included in the replacement management information list 1000, a predetermined value (e.g. "1") indicating the state is set to the replacement recording control information entry #1.

When there is a physical cluster (or a physical sector) on track #1 which is referred to by the replacement management information included in the replacement management information list 1000, or it is unknown whether or not there is a physical cluster on track #1 which is referred to by the replacement management information, a predetermined value (e.g. "0") indicating the state is set to the replacement recording control information entry #1.

When data is reproduced from a specific track on the information recording medium 100, the replacement recording control information entry corresponding to the specific track is referred to. When it is determined that there is no physical cluster on the specific track which is referred to by the replacement management information, a process for retrieving the replacement information list can be omitted during the subsequent reproduction process. This makes it possible to improve a reproduction performance.

When there is physical cluster on the specific track which is referred to by the replacement management information or it is unknown whether or not there is physical cluster on the specific track which is referred to by the replacement management information, a process for retrieving the replacement information list is performed to reproduce data, like other embodiments described above.

Figure 35B:
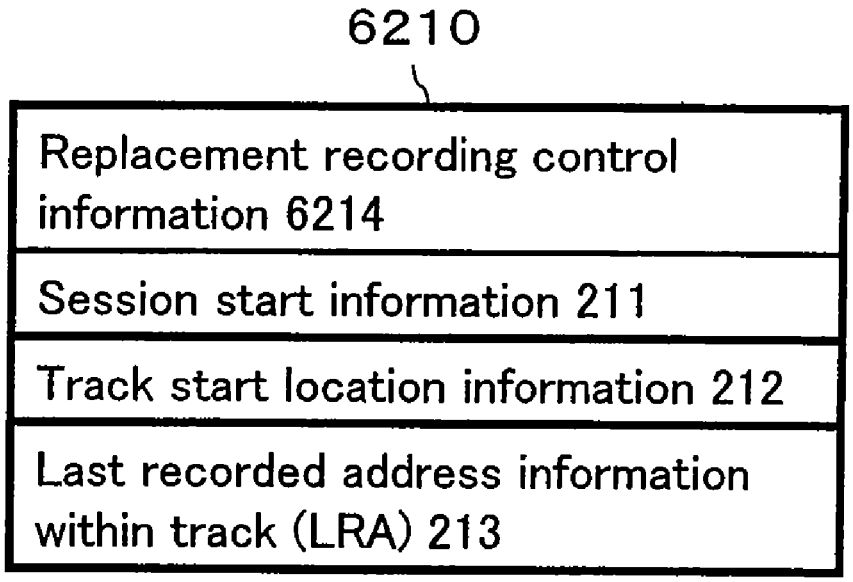
FIG. 35B is an illustrative diagram showing an exemplary data structure of track management information 6210 according to an embodiment of the present invention.

FIG. 35B shows a data structure of the track management information 6210. The track management information 6210 has a function which is similar to the replacement recording control information 6000 shown in FIG. 35A.

In the track management information 6210, replacement recording control information 6214 is newly defined.

The replacement recording control information 6214 includes information indicating whether or not there is physical cluster on a corresponding track which is referred to by the replacement management information. This information has a function which is similar to the replacement recording control information entry shown in FIG. 35A.

By using the track management information 6210, it is possible to omit a process for retrieving the replacement information list in a similar manner described above. This makes it possible to improve a reproduction performance.

Embodiment 7

In the present embodiment, a procedure of data recording will be further described.

Herein, a procedure of data recording in which a specific track in the user data area for allocating the replacement cluster will be described.

Further, the track management information for managing a track used for allocating the replacement cluster will be described.

It is described a case where a closed track is used for allocating the replacement cluster.

As described above, a closed track is a track whose track number is not included in the header information 201. An addition of a new data to the closed track is inhibited.

In the present embodiment, it is possible to allocate a replacement cluster in an unrecorded area of the closed track.

FIG. 36A shows an exemplary data structure on the information recording medium 100 before a recording process according to the present embodiment is performed.

In this example, track #M 7000 is a closed track. Data "A" 7001 is recorded in track #M 7000, for example. Track #M 7000 includes an unrecorded area 7002. However, it is impossible to perform appending recording of a new data in the unrecorded area 7002.

Track #N 7010 is an open track. Track #N 7010 includes an unrecorded area 7012. It is possible to perform appending recording of a new data in the unrecorded area 7012.

In the state shown in FIG. 36A, it is assumed that the host apparatus 305 outputs a recording instruction to the drive apparatus 310 to pseudo-overwrite data "A1" 7020 on data "A" 7001.

According to the procedure of data recording described above, the data "A1" 7020 is recorded at a location indicated by the NWA 7014A in the track #N 7010, for example, and the replacement management information corresponding to the recording is provided.

However, in the present embodiment, as shown in FIG. 37A, the data "A1" 7020 is recorded at a location of PSN=a2 indicated by the NWA 7004A in an unrecorded area of track #M 7000 (i.e. closed track).

Then, replacement management information 7030 having an original location of PSN=a1 and a replacement location of PSN=a2 is provided as the replacement management information corresponding to this pseudo-overwrite recording, as shown in the replacement management information list shown in FIG. 37B.

Further, it is possible to provide replacement management information 7031 having an original location of PSN=a2 and a replacement location of PSN=0, like the embodiments described above.

The LRA 7003A is updated to the LRA 7003B.

By performing such a pseudo-overwrite recording, while maintaining a function of the closed track that the recording of a new data is prohibited, it is possible to use an unrecorded area in the closed track as an area for a replacement cluster.

As a result, the data area can be utilized effectively without any loss in the write-once information recording medium having a track structure.

Further, when it is desired that only data for replacement clusters is recorded in a specific area on the information recording medium 100, the specific area may be set as a closed track according to the present embodiment. Thus, the specific area in which data for replacement clusters can be recorded while inhibiting the recording of a new data from the host apparatus 305 can be realized.

Such an area can be used, for example, as an area for recording only data after update when metadata file 440 is updated using the pseudo-overwrite recording.

In the state shown in FIG. 37A, it is possible to reproduce data by referring to the replacement management information 7030, according to a procedure similar to the procedure in other embodiments described above.

FIG. 38A shows another exemplary data structure on the information recording medium 100 before a recording process according to the present embodiment is performed.

In this example, track #M 7100 is a closed track. In track #M 7100, data is recorded up to a location indicated by the LRA 7103A. However, it is impossible to perform appending recording of a new data in track #M 7100.

Track #N 7110 is an open track. Data "B" 7111 is recorded in track #N 7110. It is possible to perform appending recording of a new data in track #N 7110.

In the state shown in FIG. 38A, it is assumed that the host apparatus 305 outputs a recording instruction to the drive apparatus 310 to pseudo-overwrite data "B1" 7120 on data "B" 7111.

According to the procedure of data recording described above, the data "B1" 7120 is recorded at a location indicated by the NWA 7114A in the track #N 7110, for example, and the replacement management information corresponding to the recording is provided.

However, in the present embodiment, as shown in FIG. 39A, the data "B1" 7120 is recorded at a location of PSN=b2 indicated by the NWA 7104A in an unrecorded area of track #M 7100 (i.e. closed track).

Then, replacement management information 7130 having an original location of PSN=b1 and a replacement location of PSN=b2 is provided as the replacement management information corresponding to this pseudo-overwrite recording, as shown in the replacement management information list shown in FIG. 39B.

Further, it is possible to provide replacement management information 7131 having an original location of PSN=b2 and a replacement location of PSN=0, like the embodiments described above.

The LRA 7103A is updated to the LRA 7103B. On the other hand, the LRA 7113A in the track #N 7110 is not updated.

By performing such a pseudo-overwrite recording, it is possible to utilize the data area effectively without any loss. It is further possible not to provide replacement management information when a new data is recorded in the track #N 7110. As a result, it is possible to restrict the size of the replacement management information list.

In view of such an effect, when there are a plurality of unrecorded areas on the information recording medium 100, it is possible to use an unrecorded area in a closed track with higher priority.

In the state shown in FIG. 39A, it is possible to reproduce data by referring to the replacement management information 7130, according to a procedure similar to the procedure in other embodiments described above.

Figure 40:
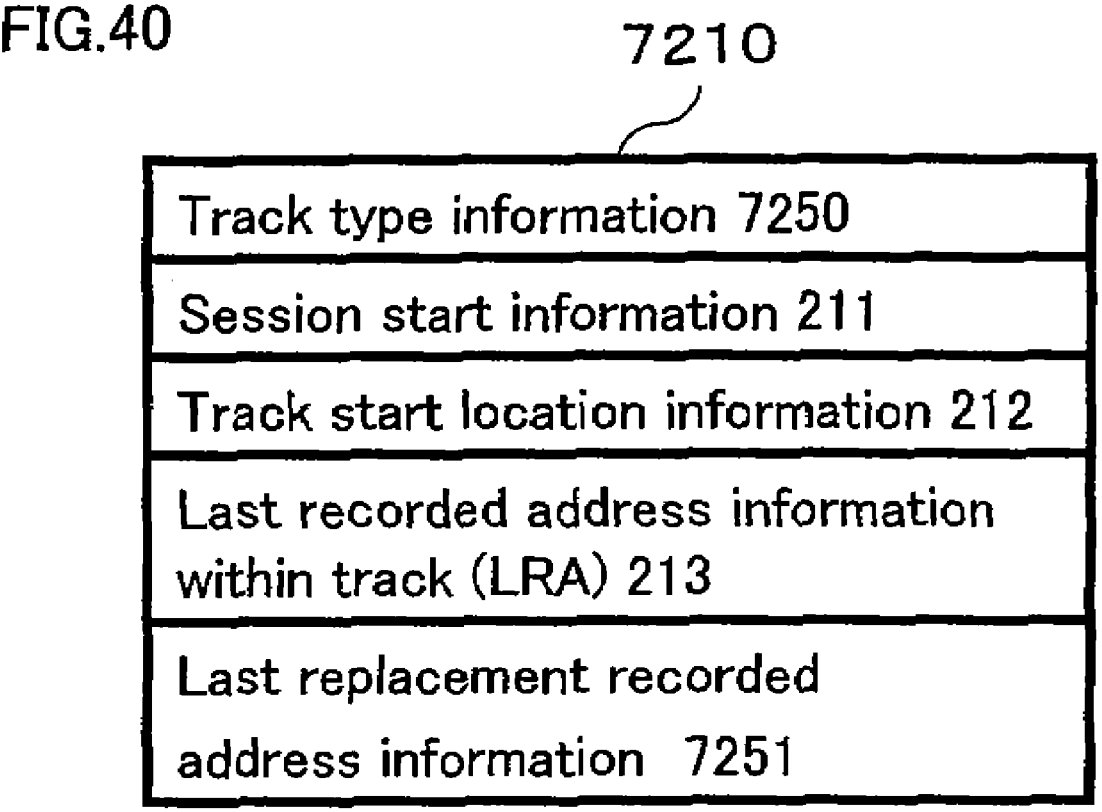
FIG. 40 is an illustrative diagram showing an exemplary data structure of the track management information according to an embodiment of the present invention.

When a replacement recording is performed for a closed track, it is possible to use track management information 7210 as shown in FIG. 40.

In the track management information 7210, track type information 7250 and last replacement recorded address information 7251 are newly defined, compared to the track management information 210. The tracktype information 7250 is described later.

The last replacement recorded address information 7251 is described below.

As described above, according to the present embodiment, data for a replacement cluster is recorded in a closed track and the LRA in the closed track is updated.

When the last replacement recorded address information 7251 is used, after a track is closed, the LRA in the closed track is not updated. Instead, the last replacement recorded address information 7251 is updated.

At the time immediately after a track is closed, the LRA in the closed track and the last replacement recorded address information 7251 indicate the same location. Each time data for a replacement cluster is recorded in the closed track, the last replacement recorded address information 7251 is updated.

The next replacement recording for the closed track is performed from a location indicated by the last replacement recorded address information 7251.

Thus, by independently managing the LRA in the closed track and the last replacement recorded address information 7251, it is possible to manage the last recorded address before and after the track is closed.

In order to facilitate the management of the closed tracks available for replacement recording, it is possible to newly provide a list of the track number of the closed tracks in the header information 201.

This list is independent of a list of the track number of the open tracks included in the header information 201.

Further, it is possible to hold information indicating a replacement cluster at which data is recorded after a track is closed.

For example, it is possible to provide a new flag Flag 4 in the replacement management information 1010B described above. In this case, if data is recorded in a track when the track is open, then a value of "0" is set to Flag 4 (i.e. Flag4=0). If data is recorded in a track when the track is closed, then a value of "1" is set to Flag4 (i.e. Flag4=1).

In the replacement management information 730 and 780, a value of "1" is set to Flag4.

There exists an area for storing attribute information in each ECC cluster. In the area for storing the attribute information, it is possible to hold information (e.g. information similar to Flag4 described above) indicating a replacement cluster at which data is recorded after a track is closed.

Next, it is described a case where a dedicated track in the user data area is used for allocating the replacement cluster.

FIG. 41A shows an exemplary data structure on the information recording medium 100 before a recording process according to the present embodiment is performed.

Herein, track #M 7300 is a track, like other embodiments described above. For example, data "A" 7301 is recorded in track #M 7300. Hereinafter, such a track is referred to as a user data track.

Track #N 7310 is a track which is specific in the present embodiment. Track #N 7310 includes an extended spare area 7312.

Track #N 7310 is a dedicated track for recording data for replacement clusters, unlike the conventional user data track. The dedicated track is defined as a specific area in the user data area 108, wherein the specific area has a function similar to the spare area 106 or 107. Hereinafter, such a track is referred to as an extended spare track.

FIG. 42A shows an exemplary data structure on the information recording medium 100 after pesto-overwriting data "A1" 7320 on data "A" 7301 shown in FIG. 41A.

As shown in FIG. 42A, data "A1" 7310 is recorded in track #N 7310. Then, replacement management information 7330 having an original location of PSN=a1 and a replacement location of PSN=a2 is generated as shown in FIG. 42B.

The LRA in the track #N 7310 is managed by the track management information, like other tracks. The LRA 7312A is updated to the LRA 7302B.

Figure 43:
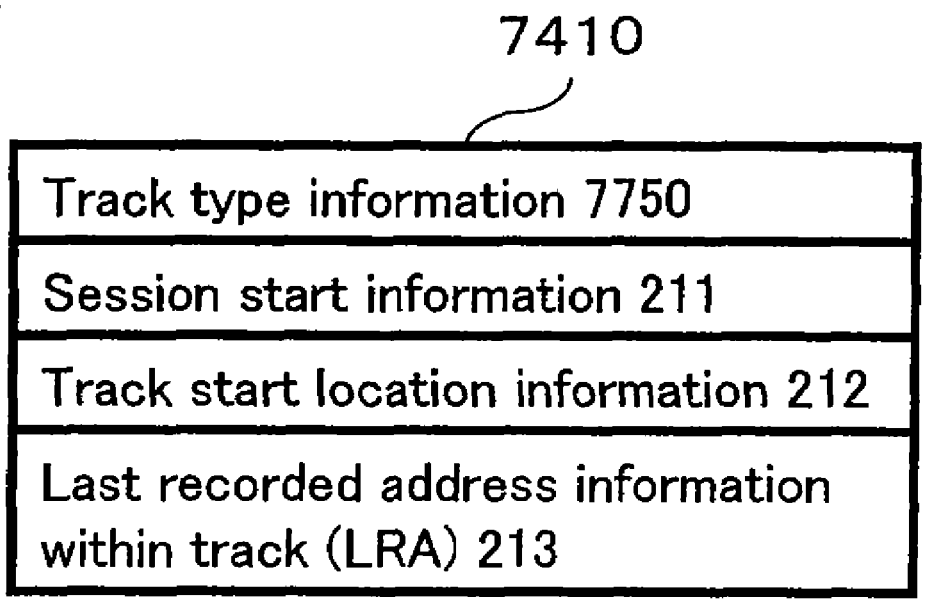
FIG. 43 is an illustrative diagram showing an exemplary data structure of track management information according to an embodiment of the present invention.

FIG. 43 shows an exemplary data structure of track management information 7410 according to the present embodiment.

In the track management information 7410, track type information 7750 is newly defined, compared to the track management information 210.

The track type information 7750 includes information identifying a user data track and an extended spare track described above. For example, if the track is a user data track, then a value of "0" is set to the information. If the track is an extended spare track, then a value of "1" is set to the information.

It is possible to further provide a flag indicating the presence/absence of an unrecorded area in the extended spare area 7310 and the like, compared to the track management information 210A.

In the state shown in FIG. 42A, it is possible to reproduce data by referring to the replacement management information 7330, according to a procedure similar to the procedure in other embodiments described above.

As described above, by defining an extended spare track as a recording location of the replacement cluster, it is possible to perform a replacement recording within the user data area. Further, it is possible to locate replacement clusters in a specific area in a concentrated manner, thereby performing data access at higher speed.

The user data track and the extended spare track can be managed by the same session management information 200. Alternatively, it is possible to provide new session management information for managing the extended spare track only.

In order to facilitate the management of the extended spare area, it is possible to add information to the spare area information 1105 or the spare area management information 1108 in the disc structure information 1100.

It is possible to add information for managing the extended spare area to information for managing the spare area 106.

For example, the information for managing the extended spare area may include a flag indicating the presence/absence of the extended spare area, a size of the extended spare area, a flag indicating the presence/absence of an unrecorded area in the extended spare area, information indicating a location at which data is to be recorded next in the extended spare area, and the like.

Conventionally, it is only possible to add a new track to a track located at the end of the user data area. However, it may be possible to add the extended spare track within an open track having an unrecorded area. This makes it possible to improve flexibility for allocating the extended spare area.

Since the extended spare area has a similar function as the spare area, it is possible to use the extended spare area as a temporal disc management information area for recording the disc management information such as the latest disc structure information 1110, the session management information 200 and the replacement management information list 1000. Since the session management information 200 and the replacement management information list 1000 are data having a variable length, it is possible to use the extended spare area when an unrecorded area in the temporal disc management information area provided in the lead-in area 101, the inner spare area 106 or the outer spare area 107 is insufficient. In this case, it is preferable to record a recording location of the temporal disc management information in the lead-in area 101, for example.

Embodiment 8

With reference to FIG. 43, track type information 7750 in the track management information 7410 will be described.

The track type information 7750 includes information for identifying a track available as a recording location of the replacement cluster. For example, if the track is available, then a value of "0" is set to the information. If the track is not available, then a value of "1" is set to the information.

The non-available track is, for example, a closed track having no unrecorded area, or any track which cannot be used as a replacement location for some reason regardless of the presence/absence of the unrecorded area.

It may be possible to set an open track as the non-available track.

By referring to the track type information 7750, the drive apparatus 310 can easily recognize a track available as a replacement location.

Figure 44:
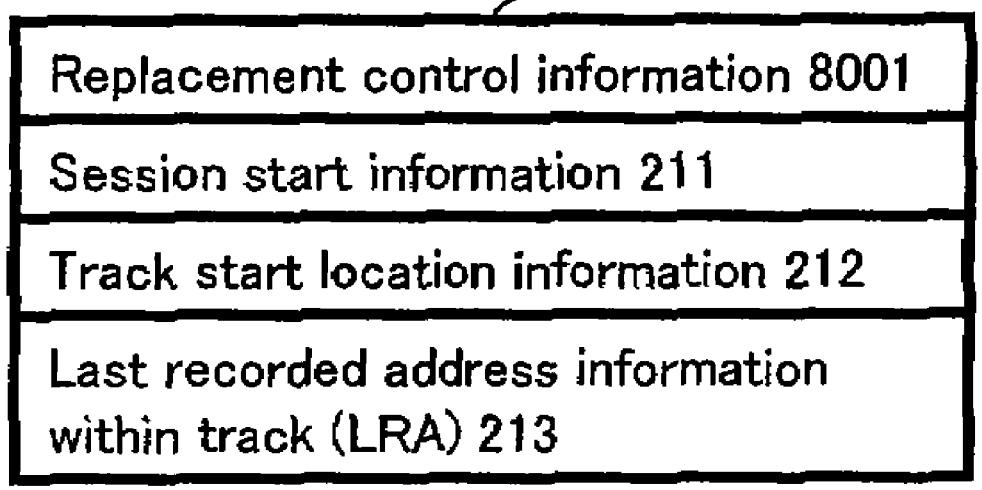
FIG. 44 is an illustrative diagram showing an exemplary data structure of track management information according to an embodiment of the present invention.

FIG. 44 shows an exemplary data structure of track management information 8210 according to the present embodiment.

In the track management information 8210, replacement control information 8001 is newly defined, compared to the track management information 210.

The replacement control information 8001 provides information for controlling a replacement location with respect to the tracks managed by the track management information 8210.

Specifically, the replacement control information 8001 makes it possible to specify a spear area, the same track, a different track and the like as a replacement location. The values (e.g. "0", "1" and "2") are assigned to the respective replacement locations. The replacement location can be specified by selectively setting the value to the replacement control information 8001.

By referring to the replacement control information 8001, the drive apparatus 310 determines a recording location of the replacement cluster in a replacement recording in which an original cluster in a track is specified.

When the replacement control information 8001 indicates a spare area as a replacement location, data for the replacement cluster is recorded in the spare area. Similarly, the replacement control information 8001 indicates a different track as a replacement location, data is recorded in an unrecorded area in a track which is different from the original track.

As described above, by providing information for controlling a replacement location such as the track type information 7750 or the replacement control information 8001 in the track management information, it is possible to realize an excellent implementation which can be reflected by the intent of the information recording/reproduction apparatus or a user with respect to the replacement recording.

INDUSTRIAL APPLICABILITY

The present invention is useful, since it provides a drive apparatus and the like capable of utilizing the user data area without any loss in the pseudo-overwrite recording for the write-once optical disc.

The invention claimed is:

1. A drive apparatus for performing a sequential recording for a write-once recording medium, wherein
 the write-once recording medium includes a data area and a disc management information area,
 the data area includes a spare area and a user data area,
 disc management information for managing the write-once recording medium is recorded in the disc management information area,
 a plurality of physical addresses are assigned to the data area,
 a plurality of logical addresses are assigned to the user data area,
 at least one track is allocated in the user data area,
 the disc management information includes track management information for managing the at least one track, and
 the track management information includes a last recorded address indicating a location at which data is last recorded in a track,
 the drive apparatus comprising:
 a recording/reproduction section for performing a recording operation or a reproduction operation for the write-once recording medium; and
 a drive control section for controlling the recording/reproduction section,
 wherein the drive control section performs a process including:
 reading the disc management information from the disc management information area;
 determining a primary logical address-physical address mapping indicating a corresponding relationship between the plurality of logical addresses and the plurality of physical addresses based on the disc management information;
 receiving a recording instruction including a logical address indicating location at which data is to be recorded;

translating the logical address included in the recording instruction into a physical address in accordance with the primary logical address-physical address mapping;

determining a track of the at least one track based on the physical address corresponding to the logical address included in the recording instruction and the track management information;

determining a physical address indicating a location at which data can be recorded next in the determined track as a next writable address, based on the last recorded address in the determined track;

comparing the physical address corresponding to the logical address included in the recording instruction with the next writable address;

when the physical address corresponding to the logical address included in the recording instruction is smaller than the next writable address, performing a process including:

controlling the recording/reproduction section to record the data at a specific location in the user data area, the specific location being a location other than the location indicated by the physical address corresponding to the logical address included in the recording instruction;

generating new disc management information including replacement management information for mapping the physical address corresponding to the logical address included in the recording instruction to the physical address indicating the specific location and the last recorded address updated by recording of the data; and controlling the recording/reproduction section to record the new disc management information in the disc management information area;

when the physical address corresponding to the logical address included in the recording instruction is equal to the next writable address, performing a process including:

controlling the recording/reproduction section to record the data at location indicated by the physical address corresponding to the logical address included in the recording instruction;

generating new disc management information including the last recorded address updated by recording of the data; and controlling the recording/reproduction section to record the new disc management information in the disc management information area.

2. A write-once recording medium comprising:

a data area and a disc management information area, the data area includes a spare area and a user data area, disc management information for managing the write-once recording medium is recorded in the disc management information area, a plurality of physical addresses are assigned to the data area, a plurality of logical addresses are assigned to the user data area, at least one track is allocated in the user data area, the disc management information includes track management information for managing the at least one track, and the track management information includes a last recorded address indicating a location at which data is last recorded in a track, wherein the write-once recording medium is recordable by a drive apparatus performing a process comprising the steps:

reading the disc management information from the disc management information area;

determining a primary logical address-physical address mapping indicating a corresponding relationship between the plurality of logical addresses and the plurality of physical addresses based on the disc management information;

receiving a recording instruction including a logical address indicating location at which data is to be recorded;

translating the logical address included in the recording instruction into a physical address in accordance with the primary logical address-physical address mapping;

determining a track of the at least one track based on the physical address corresponding to the logical address included in the recording instruction and the track management information:

determining a physical address indicating a location at which data can be recorded next in the determined track as a next writable address, based on the last recorded address in the determined track;

comparing the physical address corresponding to the logical address included in the recording instruction with the next writable address;

when the physical address corresponding to the logical address included in the recording instruction is smaller than the next writable address, performing a process including:

recording the data at a specific location in the user data area, the specific location being a location other than the location indicated by the physical address corresponding to the logical address included in the recording instruction;

generating new disc management information including replacement management information for mapping the physical address corresponding to the logical address included in the recording instruction to the physical address indicating the specific location and the last recorded address updated by recording of the data; and recording the new disc management information in the disc management information area;

when the physical address corresponding to the logical address included in the recording instruction is equal to the next writable address, performing a process including:

recording the data at location indicated by the physical address corresponding to the logical address included in the recording instruction;

generating new disc management information including the last recorded address updated by recording of the data; and recording the new disc management information in the disc management information area.

3. A method for reproducing the write-once recording medium according to claim 2, comprising at least one of:

a step of reproducing the disc management information from the disc management information area; and a step of reproducing a user data from the space area or the user data area based on the replacement management information.

* * * * *